(12) United States Patent
Takada

(10) Patent No.: US 6,917,527 B2
(45) Date of Patent: Jul. 12, 2005

(54) SWITCHING POWER SUPPLY

(75) Inventor: Koji Takada, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 25 days.

(21) Appl. No.: 10/751,641

(22) Filed: Jan. 6, 2004

(65) Prior Publication Data
US 2004/0145928 A1 Jul. 29, 2004

(30) Foreign Application Priority Data

Jan. 23, 2003 (JP) ........................... 2003-014284
Jul. 1, 2003 (JP) ........................... 2003-270034

(51) Int. Cl.[7] ........................................... H02M 3/335
(52) U.S. Cl. ............................. 363/16; 363/71; 363/95
(58) Field of Search ..................... 363/16, 17, 20–26, 363/65, 71, 95, 97, 131

(56) References Cited

U.S. PATENT DOCUMENTS

| 3,046,495 | A | * | 7/1962 | Faries et al. | ............. 331/113 A |
| 3,056,094 | A | * | 9/1962 | Crawford | ............. 331/113 A |
| 4,685,039 | A | | 8/1987 | Inou et al. | |
| 5,351,175 | A | * | 9/1994 | Blankenship | ............. 363/16 |
| 5,946,206 | A | * | 8/1999 | Shimizu et al. | ............. 363/65 |
| 6,674,654 | B2 | * | 1/2004 | Winick et al. | ............. 363/16 |
| 2002/0136029 | A1 | * | 9/2002 | Ledenev et al. | ............. 363/16 |

FOREIGN PATENT DOCUMENTS

| JP | 6-5390 | 1/1994 |
| JP | 2591056 | 12/1998 |

* cited by examiner

Primary Examiner—Adolf Berhane
(74) Attorney, Agent, or Firm—Westerman, Hattori, Daniels & Adrian, LLP

(57) ABSTRACT

A low-cost, easily-miniaturized switching power supply restrains voltage stress on first and second main switches. The switching power supply has small loss and low noise, enables setting of duty factors over a broad range, and has reduced thickness. The first main switch has one end connected with a negative electrode of an input voltage, and the second main switch has one end connected with a positive electrode of the input voltage. A first magnetic element is connected to the first main switch, and a second magnetic element is connected to the second main switch and the first magnetic element. The switching power supply has: a first diode connected to the first main switch, the first magnetic element, and the second magnetic element; a second diode connected to the first diode, the second main switch, and the second magnetic element; and an auxiliary switch between the diodes.

16 Claims, 29 Drawing Sheets

SWITCHING POWER SUPPLY

BACKGROUND OF THE INVENTION

1. Field of the Invention

This invention relates to a switching power supply having a first main switch, a second main switch and plural magnetic elements connected in series on their primary sides.

This invention also relates to a switching power supply having a first converter and a second converter connected in series.

2. Description of the Prior Art

In a conventional switching power supply, primary sides of two one-transistor-type converters are connected in series and their secondary sides are connected in parallel (for example, see Patent Literature 1). This structure is suitable for increase in output and reduction in breakdown voltage of main switches.

The conventional switching power supply also has a first main switch and a second main switch for dividing a voltage, and a series circuit formed by a capacitor and an auxiliary switch for resetting magnetic fluxes of transformers (for example, see Patent Literature 2 and Patent Literature 3). This structure enables small voltage stress on the main switches and setting of a duty factor in a broad range.

A specific example of this will now be described. FIG. 1 is a structural view showing an example of the conventional switching power supply.

In FIG. 1, an input voltage Vin, a second main switch Q2, an inductor L4, a primary winding N12 of a transformer T2, an inductor L2, a primary winding N11 of a transformer T1, a first main switch Q1, and a resistor Rsen, which is a current detector unit, are connected in series.

More specifically, the first main switch Q1 has its one end (source) connected with a common potential COM from a negative electrode of the input voltage Vin via the resistor Rsen.

The second main switch Q2 has its one end (drain) connected with a positive electrode of the input voltage Vin.

The inductor L2 and the transformer T1 form a first magnetic element (inductor L2 and transformer T1).

One end of the first magnetic element (inductor L2 and transformer T1) is connected with the other end (drain) of the first main switch Q1.

The first magnetic element (inductor L2 and transformer T1) induces a voltage to be an output Vout by turning on/off of the first main switch Q1 and the second main switch Q2.

The inductor L4 and the transformer T2 form a second magnetic element (inductor L4 and transformer T2).

One end of the second magnetic element (inductor L4 and transformer T2) is connected with the other end (source) of the second main switch Q2, and its other end is connected with the other end of the first magnetic element (inductor L2 and transformer T1).

The second magnetic element (inductor L4 and transformer T2) induces a voltage to be an output Vout by turning on/off of the first main switch Q1 and the second main switch Q2.

Therefore, the first magnetic element (inductor L2 and transformer T1) and the second magnetic element (inductor L4 and transformer T2) are connected in series via a potential point Vm as their connection point.

Parallel to the series circuit formed by the first magnetic element (inductor L2 and transformer T1) and the second magnetic element (inductor L4 and transformer T2), a series circuit formed by a capacitor C8 and an auxiliary switch Q4 is connected.

A secondary winding N21 of the transformer T1 is connected with a diode D1 and a diode D2 and is further connected with an inductor L1, a capacitor C1 and a load Load.

A secondary winding N22 of the transformer T2 is connected with a diode D5 and a diode D6 and is further connected with an inductor L3, the capacitor C1 and the load Load.

Therefore, an output of the secondary winding N21 of the transformer T1 in the first magnetic element (inductor L2 and transformer T1) and an output of the secondary winding N22 of the transformer T2 in the second magnetic element (inductor L4 and transformer T2) are connected in parallel.

The first main switch Q1 and the second main switch Q2 are turned on/off in phase. The first main switch Q1 and the auxiliary switch Q4 are turned on/off in a complementary manner, and the second main switch Q2 and the auxiliary switch Q4 are turned on/off in a complementary manner.

The inductor L2 is a leakage inductance component of the transformer T1 or an external inductor. The inductor L4 is a leakage inductor component of the transformer T2 or an external inductor.

The inductor L2 and the inductor L4 have substantially the same electric properties. The transformer T1 and the transformer T2 have substantially the same electric properties.

In this structure, the transformer T1 and the transformer T2 share the load almost evenly. Therefore, this structure is suitable for an application with a large load.

As the thickness of the transformer T1 and the transformer T2 is reduced, the structure is suitable for an application in which thickness of the whole switching power supply is to be reduced.

The first main switch Q1, the second main switch Q2 and the auxiliary switch Q4 form a MOSFET. A parasitic body diode is provided between the drain and source of the MOSFET.

The capacitor C2 is connected parallel to the first main switch Q1. The capacitor C3 is connected parallel to the second main switch Q2. The capacitor C2 is a parasitic capacity of the first main switch Q1 or an external capacitor. The capacitor C3 is a parasitic capacity of the second main switch Q2 or an external capacitor.

The first main switch Q1 and the second main switch Q2 have substantially the same electric properties. The capacitor C2 and the capacitor C3 have substantially the same electric properties.

With this structure, since the first main switch and the second main switch share voltage stress, an element having a low breakdown voltage can be used. The element having a low breakdown voltage has a low ON-state resistance and is made at a low cost.

Moreover, since the first main switch Q1 and the second main switch Q2 are in phase, a control circuit for them is simple and is made at a low cost.

A voltage generated in the resistor Rsen is utilized for current feedback and for control or protection such as restraint of an excess current. To simplify the circuit structure, the resistor Rsen has its one end connected with the common potential COM.

Thus, in general, because of the arrangement of the resistor Rsen, the arrangement of the series circuit formed by the first main switch, the second main switch, the first magnetic element and the second magnetic element becomes asymmetrical.

The operation in this conventional example of FIG. 1 will now be described.

First, an operating state where the first main switch Q1 is on, the second main switch Q2 is on and the auxiliary switch Q4 is off will be described.

In this case, the series circuit formed by the first magnetic element (inductor L2 and transformer T1) and the second magnetic element (inductor L4 and transformer T2) is excited by the input voltage Vin. The diode D1 and the diode D5 are turned on and the diode D2 and the diode D6 are turned off. The inductor L1 and the inductor L3 are excited.

Then, as the first main switch Q1 and the second main switch Q2 are turned off together, the operating state shifts to an operating state which will be described later.

Next, an operating state where the first main switch Q1 is off, the second main switch Q2 is off and the auxiliary switch Q4 is on will be described.

In this case, the series circuit formed by the first magnetic element (inductor L2 and transformer T1) and the second magnetic element (inductor L4 and transformer T2) is reset by a voltage of the capacitor C8. The diode D1 and the diode D5 are turned off and the diode D2 and the diode D6 are turned on. The inductor L1 and the inductor L3 are reset.

Then, as the auxiliary switch Q4 is turned off, the operating state shifts to the above-described operating state.

In this manner, the transformer T1, the inductor L2, the transformer T2 and the inductor L4 repeat excitation and reset without being magnetically saturated.

Both a charging current and a discharging current of the capacitor C8 flow through a circuit formed by the second magnetic element (inductor L4 and transformer T2), the first magnetic element (inductor L2 and transformer T1), the auxiliary switch Q4 and the capacitor C8.

A voltage induced in the secondary winding N21 of the transformer T1 in the first magnetic element (inductor L2 and transformer T1) is rectified at the diode D1 and the diode D2, then smoothed at the inductor L1 and the capacitor C1, and supplies power to the load Load.

Similarly, a voltage induced in the secondary winding N22 of the transformer T2 in the second magnetic element (inductor L4 and transformer T2) is rectified at the diode D5 and the diode D6, then smoothed at the inductor L3 and the capacitor C1, and supplies power to the load Load.

At the capacitor C1, an output voltage Vout is generated on the basis of a common potential GND as a reference.

In the conventional example of FIG. 1, the input voltage Vin is thus converted to the output voltage Vout. If the ratio of on-time to off-time (duty factor) increases, the output voltage Vout rises. If the ratio of on-time to off-time (duty factor) decreases, the output voltage Vout falls.

In the conventional example of FIG. 1, since the auxiliary switch Q4 and the capacitor C8 suitably reset the first magnetic element (inductor L2 and transformer T1) and the second magnetic element (inductor L4 and transformer T2), the duty factors of the first main switch Q1 and the second main switch Q2 can be set in a broad range.

Moreover, the inductor L2, the inductor L4, the capacitor C2 and the capacitor C3 act to restrain the loss when switching the first main switch Q1, the second main switch Q2 and the auxiliary switch Q4. Particularly, they restrain the loss when turning on the switches.

The characteristics of the conventional example of FIG. 1 will now be described with reference to FIG. 2. FIG. 2 shows operating waveforms of a voltage (Vds_Q1) between the drain and source of the first main switch Q1 and a voltage (Vds_Q2) between the drain and source of the second main switch Q2 in the conventional example of FIG. 1.

As seen from FIG. 2, the stress of the voltage (Vds_Q1) and the stress of the voltage (Vds_Q2) are not balanced with each other. This is affected by the transformer T1, the inductor L2, the transformer T2, the inductor L4 and other parasitic elements, or variations in the on/off timing.

Particularly, the conventional example of FIG. 1 has a characteristic that the symmetry is significantly broken by even a very small resistance Rsen and therefore the voltage (Vds_Q1) and the voltage (Vds_Q2) largely vary from each other.

If the balance between the stress of the voltage (Vds_Q1) and the stress of the voltage (Vds_Q2) is broken, problems arise such as lower efficiency and lower reliability.

Another conventional example will now be described. FIG. 3 is a structural view showing an example of a second conventional switching power supply. The same elements as those of the conventional example shown FIG. 1 are denoted by the same symbols and numerals and will not be described further in detail.

In the conventional example of FIG. 3, with respect to a potential point Vm, which is a connection point between a first magnetic element (inductor L2 and transformer T1) and a second magnetic element (inductor L4 and transformer T2), a bulk capacitor C6 is arranged between the potential point Vm and a common potential COM, which is from a negative electrode of an input voltage Vin, and a bulk capacitor C7 is arranged between the potential point Vm and a positive electrode of the input voltage Vin.

The schematic operation in this conventional example of FIG. 3 converts the input voltage Vin to an output voltage Vout, substantially similarly to the operation in the conventional example of FIG. 1.

The bulk capacitor C6 and the bulk capacitor C7 smooth the potential point Vm. Therefore, these bulk capacitors act to balance a voltage (Vds_Q1) between the drain and source of a first main switch Q1 and a voltage (Vds_Q2) between the drain and source of a second main switch Q2.

The characteristics of the conventional example of FIG. 3 will now be described with reference to FIG. 4. FIG. 4 shows operating waveforms of the voltage (Vds_Q1) between the drain and source of the first main switch Q1 and the voltage (Vds_Q2) between the drain and source of the second main switch Q2 in the conventional example of FIG. 3.

As seen from FIG. 4, the voltage (Vds_Q1) and the voltage (Vds_Q2) are balanced as a whole, but ringing is superimposed thereon.

This is because a ringing path is generated by the addition of the bulk capacitor C6 and the bulk capacitor C7.

As ringing is superimposed on the voltage (Vds_Q1) and the voltage (Vds_Q2), not only the loss of the first main switch Q1 and the second main switch Q2 increases but also the reliability of the entire switching power supply is lowered.

Moreover, the noise characteristic of the switching power supply deteriorates. If the capacitance of the bulk capacitor C6 and the bulk capacitor C7 is increased excessively, the switching power supply is increased in size.

In this manner, there is a tradeoff in reducing the loss, reducing the noise, or restraining the stress on the elements such as the transformer T1, the transformer T2, the first main switch Q1 and the second main switch Q2. It is difficult to realize all these features.

Still another conventional example will now be described. FIG. 5 is a structural view showing an example of a third conventional switching power supply. The same elements as those of the conventional example shown in FIG. 3 are denoted by the same symbols and numerals and will not be described further in detail.

In the conventional example of FIG. 5, primary sides of two converters are connected in series and their secondary sides are connected in parallel.

Specifically, a first magnetic element (inductor L2 and transformer T1), a first main switch Q1, a capacitor C2, a resistor Rsen, a first auxiliary switch Q5, a first capacitor C5, a diode D1, a diode D2, an inductor L1 and a capacitor C1 form a first converter.

More specifically, the first converter has the first magnetic element (inductor L2 and transformer T1) which is connected in series with the first main switch Q1 and induces a voltage to be output by turning on/off of the first main switch Q1.

A second magnetic element (inductor L4 and transformer T2), a second main switch Q2, a capacitor C3, a second auxiliary switch Q6, a second capacitor C4, a diode D5, a diode D6, an inductor L3 and the capacitor C1 form a second converter.

More specifically, the second converter has the second magnetic element (inductor L4 and transformer T2) which is connected in series with the second main switch Q2 and induces a voltage to be an output by turning on/off of the second main switch Q2.

An input voltage Vin, the first converter and the second converter are connected in series.

A bulk capacitor C6 and the first converter, and a bulk capacitor C7 and the second converter are connected in series at a potential point Vm as their connection point on the primary side of the switching power supply.

An output from the transformer T1 and output from the transformer T2 are connected in parallel on the secondary side of the switching power supply. The capacitor C1 is shared by the first converter and the second converter.

Moreover, the first converter and the second converter have substantially the same electrical properties.

Therefore, the first converter and the second converter share the load almost evenly.

The first converter is turned on/off in a complementary manner with the first main switch Q1 and the first auxiliary switch Q5 on the basis of feedback from an output voltage Vout.

The second converter is turned on/off in a complementary manner with the second main switch Q2 and the second auxiliary switch Q6 on the basis of feedback from the output voltage Vout.

The schematic operation of the first converter in this conventional example of FIG. 5 converts the input voltage Vin to the output voltage Vout, substantially similarly to the operation in the conventional example of FIG. 1.

Also the schematic operation of the second converter in the conventional example of FIG. 5 converts the input voltage Vin to the output voltage Vout, substantially similarly to the operation in the conventional example of FIG. 1.

The bulk capacitor C6 and the bulk capacitor C7 act to smooth the potential point Vm and stabilize the potential point Vm.

In the conventional example of FIG. 5, since the first converter and the second converter are independent of each other as described above, there is an advantage that these converters can be easily designed.

However, in the conventional example of FIG. 5, the four active switches, that is, the first main switch Q1, the second main switch Q2, the first auxiliary switch Q5 and the second auxiliary switch Q6, are necessary. Therefore, the structure is complicated, expensive, and hard to miniaturize.

Patent Literature 1: Specification of U.S. Pat. No. 4,685,039

Patent Literature 2: JP-UM-A-6-5390

Patent Literature 3: Japanese Utility Model Registration No.2,591,056

Therefore, such a conventional switching power supply has a problem that the voltage stress on the first main switch Q1 and the voltage stress on the second main switch Q2 largely vary depending on the parasitic elements, the resistor Rsen and the like in the minute circuit.

Moreover, there is a tradeoff in reducing the loss, reducing the noise, or restraining the stress on the elements such as the transformer T1, the transformer T2, the first main switch Q1 and the second main switch Q2. It is difficult to realize all these features.

There is also a problem that the structure of the switching power supply is complicated and hard to miniaturize.

SUMMARY OF THE INVENTION

It is an object of this invention to solve the above-described problems and to provide a switching power supply that suitably restrains the voltage stress on the first main switch and the second main switch and that can be manufactured at a low cost and can be easily miniaturized.

It is another object of this invention to provide a switching power supply suitable for a thin structure that has little loss and low noise and enables setting of a duty factor in a broad range.

DETAILED DESCRIPTION OF THE PREFERRED EMBODIMENTS

Figure 5:
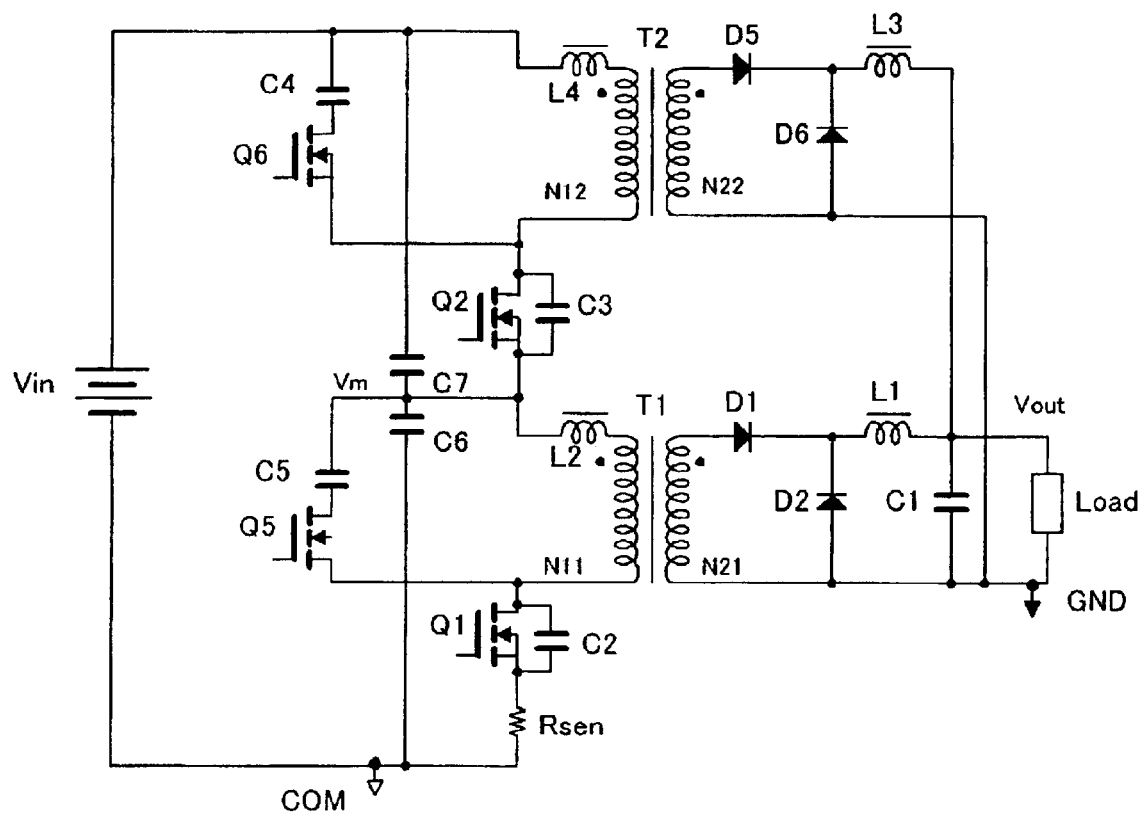
FIG. 5 is a structural view showing an example of a third conventional switching power supply.
Figure 6:
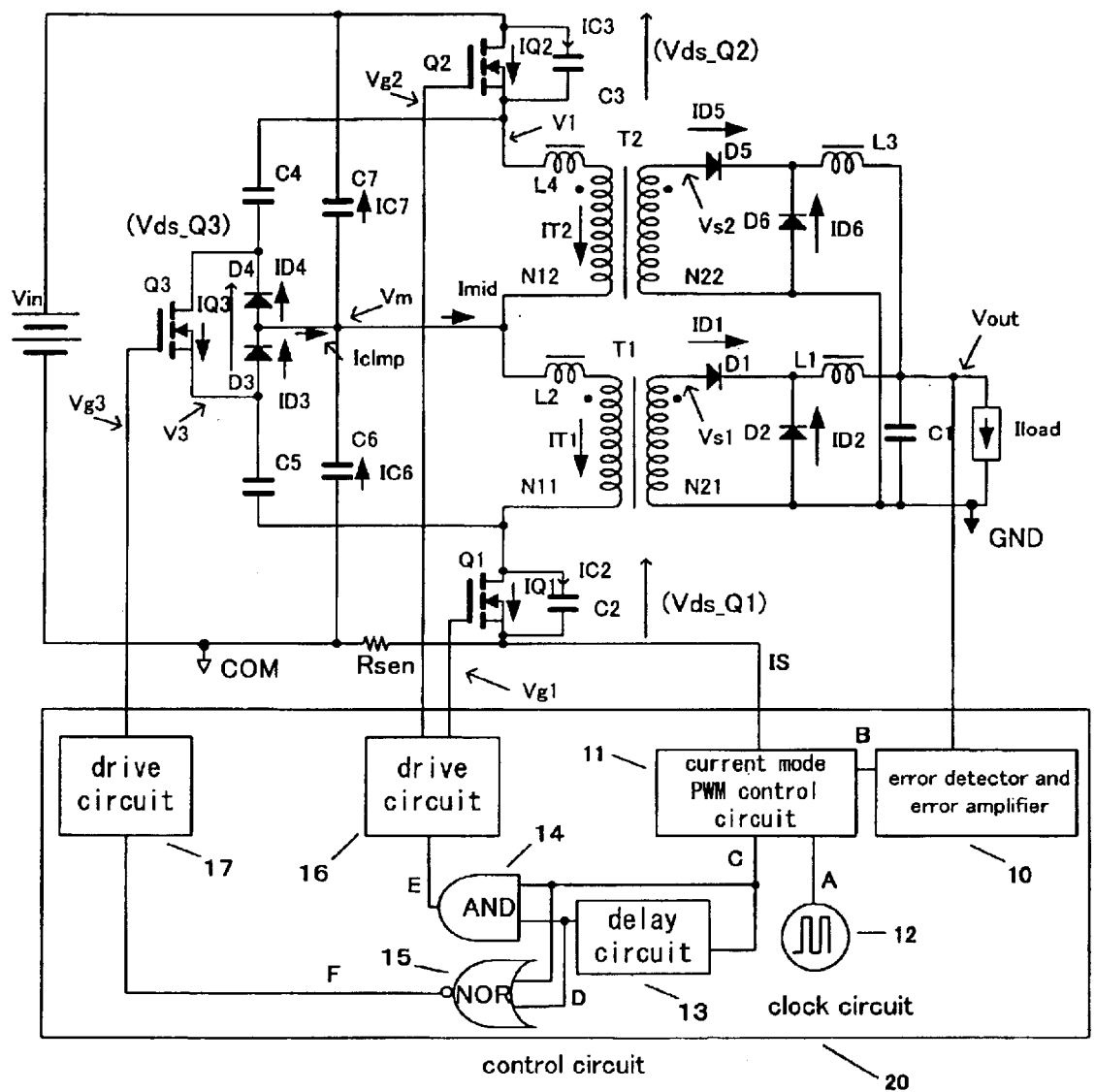
FIG. 6 is a structural view showing an embodiment of this invention.

Hereinafter, this invention will be described in detail with reference to FIG. 6. FIG. 6 is a structural view showing an embodiment of a switching power supply according to this invention. The same elements as those of the conventional example shown in FIG. 5 are denoted by the same symbols and numerals and will not be described further in detail.

A characteristic feature of the embodiment shown in FIG. 6 is that a first diode D3, a second diode D4 and an auxiliary switch Q3 are provided.

Specifically, the first diode D3 has its anode connected to a connection point between a drain of a first main switch Q1 and a first magnetic element (inductor L2 and transformer T1) via a first capacitor C5 and has its cathode connected to a potential point Vm, which is a connection point between the first magnetic element (inductor L2 and transformer T1) and a second magnetic element (inductor L4 and transformer T2).

The second diode D4 has its anode connected to the cathode of the first diode D3 and has its cathode connected to a connection point between a source of a second main switch Q2 and the second magnetic element (inductor L4 and transformer T2) via a second capacitor C4.

The auxiliary switch Q3 is arranged between the cathode of the second diode D4 and the anode of the first diode D3 and is turned on when both the first main switch Q1 and the second main switch Q2 are off.

A bulk capacitor C6 is arranged between the potential point Vm, which is the connection point between the cathode of the first diode D3 and the anode of the second diode D4, and a common potential COM, which is a negative electrode of an input voltage Vin.

Moreover, a bulk capacitor C7 is arranged between the potential point Vm and a positive electrode of the input voltage Vin.

As a result, the cathode of the first diode D3, the anode of the second diode D4, the connection point between the first magnetic element (inductor L2 and transformer T1) and the second magnetic element (inductor L4 and transformer T2), the capacitor C6, and the capacitor C7 are connected to the potential point Vm.

An output voltage Vout is connected to a load Iload and supplies power. The output voltage Vout gives feedback to the on/off-states of the first main switch Q1, the second main switch Q2 and the auxiliary switch Q3 via a control circuit 20.

The control circuit 20 inputs the output voltage Vout and a voltage IS generated at a resistor Rsen, and outputs a driving signal Vg1 for the first main switch Q1, a driving signal (Vg2-V1) for the second main switch Q2 and a driving signal (Vg3-V3) for the auxiliary switch Q3.

The driving signal Vg1 is applied between the gate and source of the first main switch Q1. The driving signal (Vg2-V1) is applied between the gate and source of the second main switch Q2. The driving signal (Vg3-V3) is supplied between the gate and source of the auxiliary switch Q3.

The internal structure of this control circuit 20 will now be described.

The output voltage Vout is inputted to an error detector and error amplifier 10. An output signal B from the error detector and error amplifier 10, a voltage signal IS generated at the resistor Rsen and an output signal A from a clock circuit 12 are inputted to a current mode PWM control circuit 11.

An output signal C from the current mode PWM control circuit 11 is inputted to a delay circuit 12, an AND circuit 14 and a NOR circuit 15. An output signal D from the delay circuit 13 is inputted to the AND circuit 14 and the NOR circuit 15.

An output signal E from the AND circuit 14 is inputted to a drive circuit 16. An output signal F from the NOR circuit 15 is inputted to a drive circuit 17.

The drive circuit 16 outputs the driving signal Vg1 and the driving signal (Vg2-V1). The drive circuit 17 outputs the driving signal (Vg3-V3).

The driving signal Vg1 and the driving signal (Vg2-V1) are in phase, and the first main switch Q1 and the second main switch Q2 are turned on/off in phase.

In this manner, the control circuit 20 is constructed simply and at a low cost.

Figure 7:
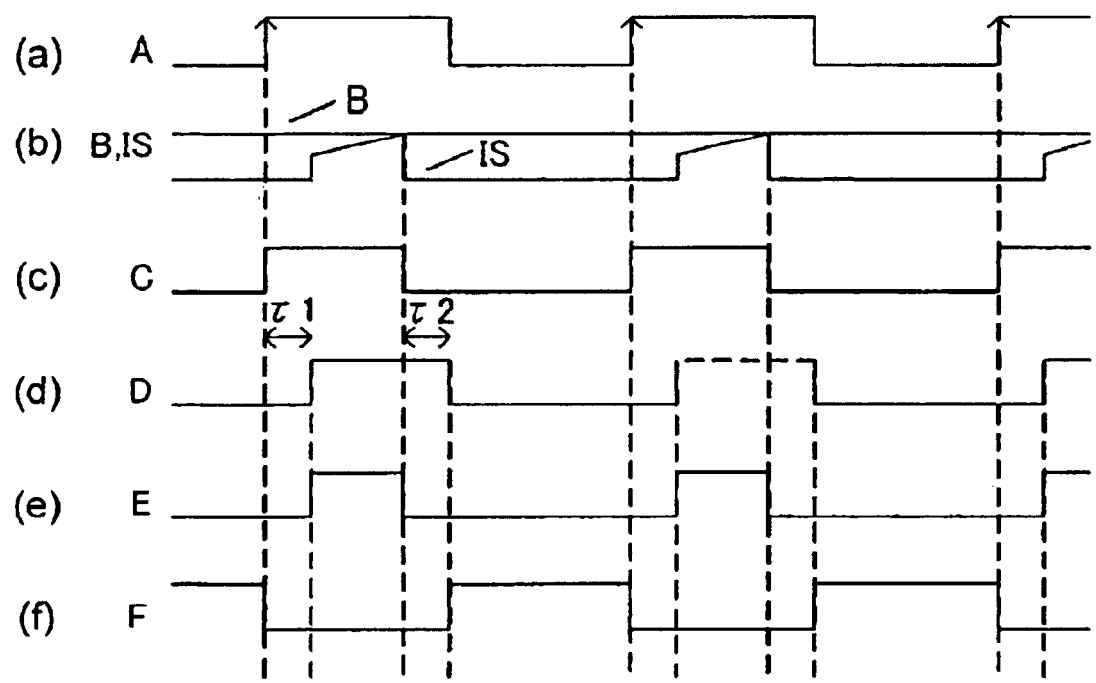
FIG. 7 shows operating waveforms in the embodiment of FIG. 6.

Next, the operation inside the control circuit 20 will be described with reference to FIG. 7. FIG. 7 shows operating waveforms in the embodiment of FIG. 6. In FIG. 7, the signal A indicated by (a) is the output from the clock circuit 12. The signal B indicated by (b) is the output from the error detector and error amplifier 10, and the signal IS also indicated by (b) is the voltage generated at the resistor Rsen. The signal C indicated by (c) is the output from the current mode PWM control circuit 11. The signal D indicated by (d) is the output from the delay circuit 13. The signal E indicated by (e) is the output from the AND circuit 14. The signal F indicated by (f) is the output from the NOR circuit 15.

The error detector and error amplifier 10 amplifies a difference between the output voltage Vout and a reference voltage and delivers its output signal B to the current mode PWM control circuit 11.

The current mode PWM control circuit 11 generates the signal C for on/off control having timing of turning on, controlled by the signal A from the clock circuit 12, and timing of turning off when the voltage IS and the signal B coincide with each other.

When the output voltage Vout is lower than the reference voltage in the error detector and error amplifier 10, the signal B increases and the ratio of on-time to off-time (duty factor) of the first main switch Q1 and the second main switch Q2 increases, too.

When the output voltage Vout is higher than the reference voltage in the error detector and error amplifier 10, the signal B decreases and the ratio of on-time to off-time (duty factor) of the first main switch Q1 and the second main switch Q2 decreases, too.

In this manner, the output voltage Vout has a value equal to that of the reference voltage in the error detector and error amplifier 10.

The delay circuit 13 generates the signal D that delays the rise timing of the signal C by a period $\tau 1$ and delays its fall timing by a period $\tau 2$.

The AND circuit 14 generates the signal E having rise timing coincident with the rise timing of the signal D and fall timing coincident with the fall timing of the signal C.

The NOR circuit 15 generates the signal F having rise timing coincident with the fall timing of the signal D and fall timing coincident with the rise timing of the signal C.

The drive circuit 16 generates the driving signal Vg1 and the driving signal (Vg2-V1) that are in phase with the signal E. The drive circuit 17 generates the driving signal (Vg3-V3) that is in phase with the signal F.

Therefore, the signal E and the signal F are turned on/off in a complementary manner. The first main switch Q1 and the second main switch Q2, and the auxiliary switch Q3 are turned on/off in a complementary manner.

Between the fall timing of the signal F and the rise timing of the signal E, there is a period $\tau 1$ when both of these signals are off. Between the timing of turning off the auxiliary switch Q3 and the timing of turning on the first main switch Q1, there is a period $\tau 1$ when both of these switches are off. Between the timing of turning off the auxiliary switch Q3 and the timing of turning on the second main switch Q2, there is a period $\tau 1$ when both of these switches are off.

Between the fall timing of the signal E and the rise timing of the signal F, there is a period $\tau 2$ when both of these signals are off. Between the timing of turning off the first main switch Q1 and the timing of turning on the auxiliary switch Q3, there is a period $\tau 2$ when both of these switches are off. Between the timing of turning off the second main switch Q2 and the timing of turning on the auxiliary switch Q3, there is a period $\tau 2$ when both of these switches are off.

That is, the first main switch Q1 and the auxiliary switch Q3 are turned on/off in a complementary manner via the period when both of these switches are off. The second main switch Q2 and the auxiliary switch Q3 are turned on/off in a complementary manner via the period when both of these switches are off.

When both the first main switch Q1 and the second main switch Q2 are off, the auxiliary switch Q3 is turned on.

The overall operation in the embodiment of FIG. 6 will now be described. FIGS. 8A to 8G are schematic diagrams showing operations of periods 1 to 7. In FIGS. 8A to 8G, the operating state sequentially shifts from the period 1 to the period 7 and then returns to the period 1. This operation is repeated.

Figure 9:
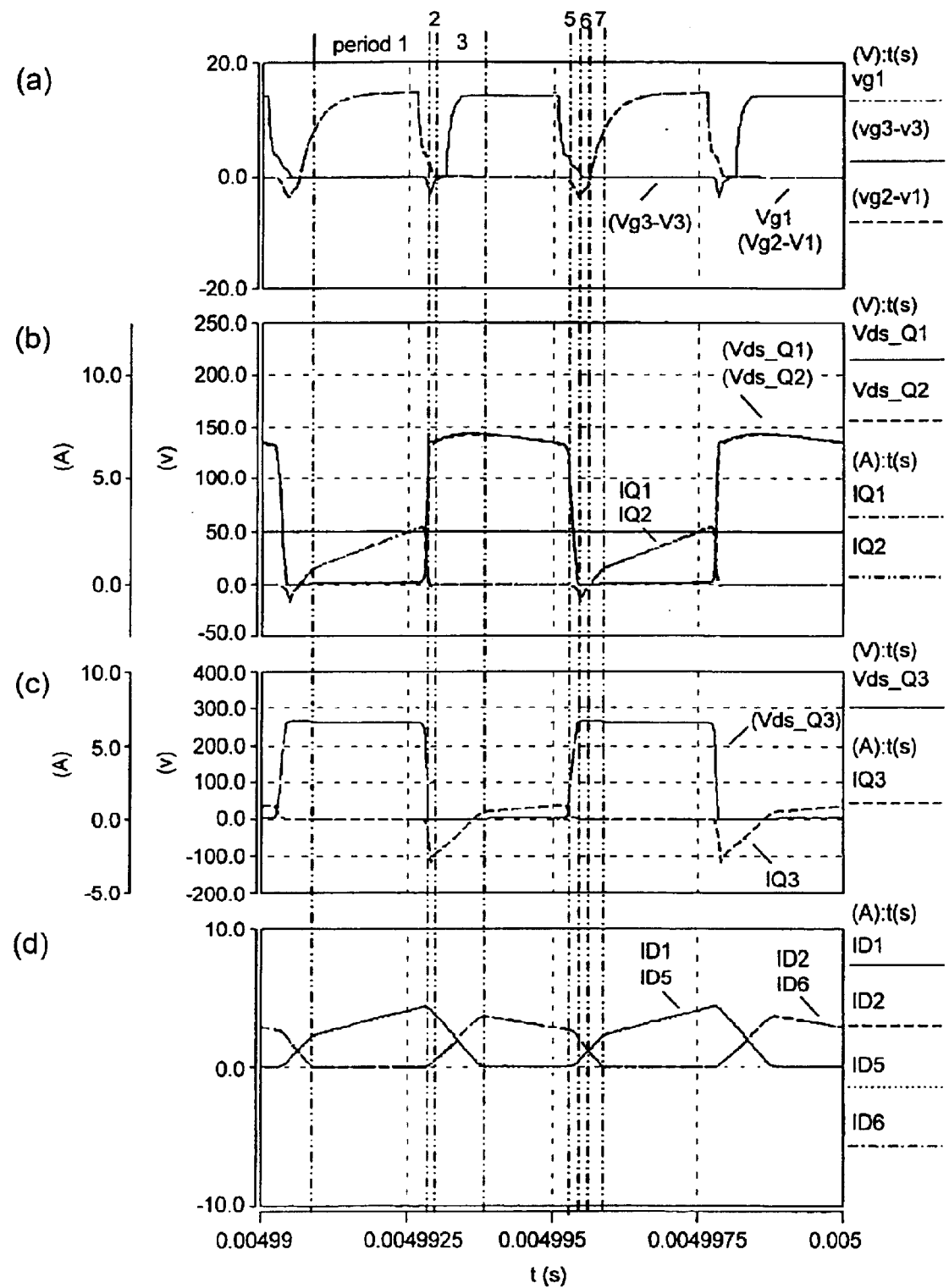
FIG. 9 shows operating waveforms of respective parts in the embodiment of FIG. 6.
Figure 10:
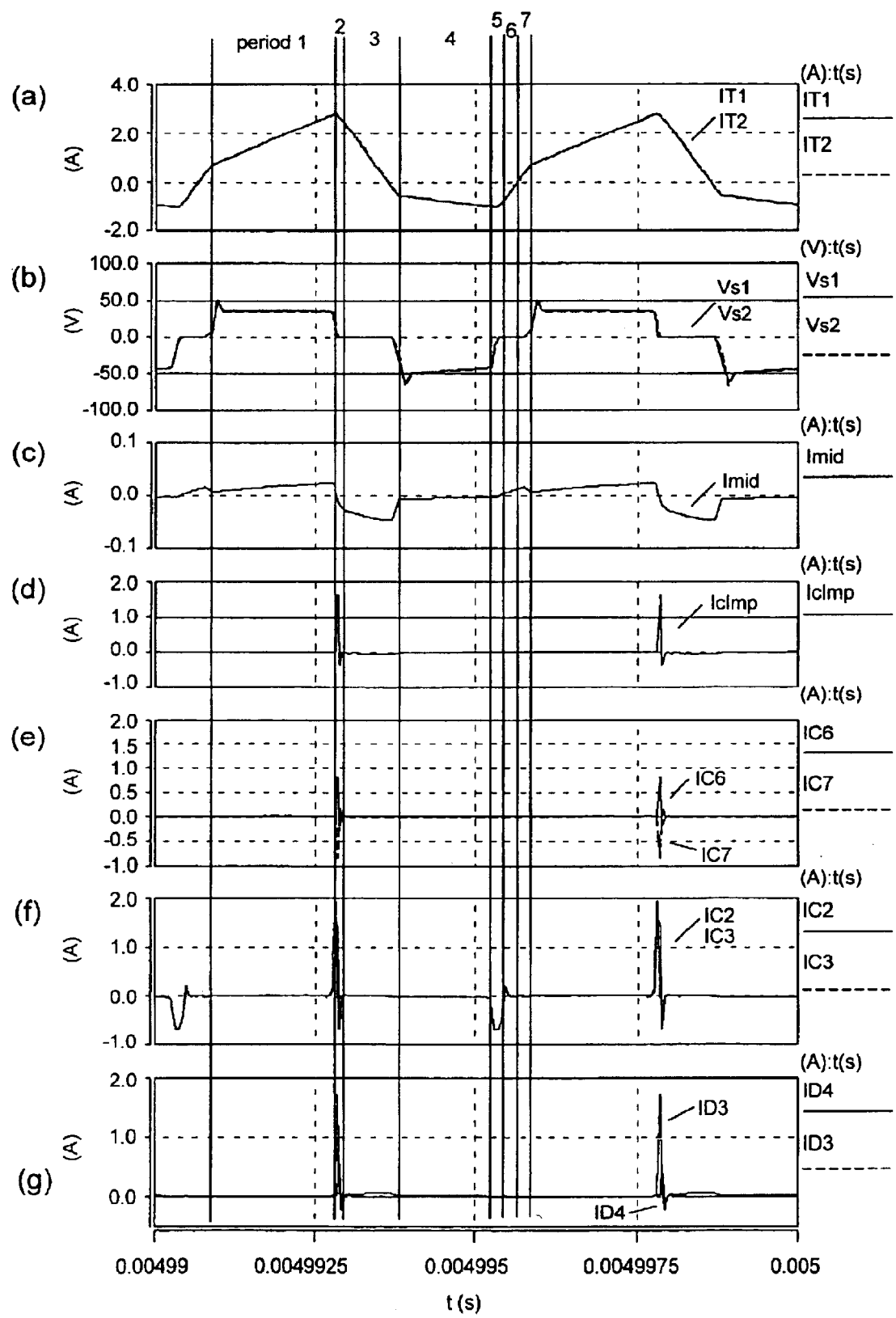
FIG. 10 shows operating waveforms of respective parts in the embodiment of FIG. 6.

FIGS. 9 and 10 show operating waveforms of respective parts in the embodiment of FIG. 6.

In (a) of FIG. 9, Vg1 represents the driving signal for the first main switch Q1. (Vg3-V3) represents the driving signal for the auxiliary switch Q3. (Vg2-V1) represents the driving signal for the second main switch Q2.

As seen from (a) of FIG. 9, the driving signal Vg1 and the driving signal (Vg2-V1) are substantially equal. The driving signal Vg1 and the driving signal (Vg2-V1), and the driving signal (Vg3-V3) are complementary.

In (b) of FIG. 9, a voltage (Vds_Q1) is a voltage between the drain and source of the first main switch Q1. A voltage (Vds_Q2) is a voltage between the drain and source of the second main switch Q2. A current IQ1 is a drain current of the first main switch Q1. A current IQ2 is a drain current of the second main switch Q2.

As seen from (b) of FIG. 9, the voltage (Vds_Q1) and the voltage (Vds_Q2) are substantially equal. The current IQ1 and the current IQ2 are substantially equal.

There is a period when the current IQ1 and the current IQ2 flow in the backward direction.

In (c) of FIG. 9, a voltage (Vds_Q3) is a voltage between the drain and source of the auxiliary switch Q3. A current IQ3 is a drain current of the auxiliary switch Q3.

There is a period when the current IQ3 flows in the backward direction.

In (d) of FIG. 9, a current ID1 is a current of a diode D1. A current ID2 is a current of a diode D2. A current ID5 is a current of a diode D5. A current ID6 is a current of a diode D6.

As seen from (d) of FIG. 9, the current ID1 and the current ID5 are substantially equal. The current ID2 and the current ID6 are substantially equal.

In (a) of FIG. 10, a current IT1 is a current flowing through the first magnetic element (inductor L2 and transformer T1). A current IT2 is a current flowing through the second magnetic element (inductor L4 and transformer T2).

As seen from (a) of FIG. 10, the current IT1 and the current IT2 are substantially equal.

In (b) of FIG. 10, a voltage Vs1 is a voltage generated in a secondary winding N21 of the transformer T1. A voltage Vs2 is a voltage generated in a secondary winding N22 of the transformer T2.

As seen from (b) of FIG. 10, the voltage Vs1 and the voltage Vs2 are substantially equal.

In (c) of FIG. 10, a current Imid is a current flowing from the connection point between the bulk capacitor C6 and the bulk capacitor 7 to the connection point between the first magnetic element (inductor L2 and transformer T1) and the second magnetic element (inductor L4 and transformer T2).

In (d) of FIG. 10, a current Iclmp is a current flowing from the connection point between the cathode of the first diode D3 and the anode of the second diode D4 to the connection point between the bulk capacitor C6 and the bulk capacitor C7.

In (e) of FIG. 10, a current IC6 is a current of the bulk capacitor C6. A current IC7 is a current of the bulk capacitor C7.

In (f) of FIG. 10, a current IC2 is acurrent of a capacitor C2. A current IC3 is a current of a capacitor C3.

In (g) of FIG. 10, a current ID4 is a current of the second diode D4. A current ID3 is a current of the first diode D3.

Hereinafter, the periods 1 to 7 will be sequentially described with reference to FIGS. 8A to 8G, FIG. 9 and FIG. 10.

In the period 1, the first main switch Q1 is on and the second main switch Q2 is on. The auxiliary switch Q3 is off. The diode D1 and the diode D5 are on. The diode D2 and the diode D6 are off. Both the first diode D3 and the second diode D4 are off.

In this case, the current IQ1, the current IQ2, the current IT1 and the current IT2 flow. Then, as both the first main switch Q1 and the second main switch Q2 are turned off, the period 1 ends and shifts to the period 2.

In the period 2, the first main switch Q1 is off and the second main switch Q2 is off. The auxiliary switch Q3 is on (with its channel being off) as its body diode is biased in the forward direction. The diode D1, the diode D5, the diode D2 and the diode D6 are on. The first diode D3 and the second diode D4 are on.

In this case, the current ID3 flows and the current IC2 flows. The voltage (Vds_Q1) rises to a predetermined voltage. Also the current ID4 flows and the current IC3 flows. The voltage (Vds_Q2) rises to a predetermined voltage. The voltage (Vds_Q3) falls. Then, as the charging of the capacitor C2 and the capacitor C3 is completed and the current of the capacitor C2 and the capacitor C3 becomes zero, the period 2 ends and shifts to the period 3.

In the period 3, the first main switch Q1 is off and the second main switch Q2 is off. The auxiliary switch Q3 is on. The diode D1, the diode D5, the diode D2 and the diode D6 are on.

In this case, the current IT1 and the current IT2 decrease. The current ID1 and the current ID5 decrease. The current ID2 and the current ID6 increase. The current IQ3 for resetting the inductor L2 and the inductor L4 flows. Then, as the current ID1 and the current ID5 become zero, the period 3 ends and shifts to the period 4.

When the auxiliary switch Q3 is on as its body diode is biased in the forward direction, the auxiliary switch Q3 is provided with the driving signal (Vg3-V3) for turning on the channel and it is turned on with a low loss.

In the period 4, the first main switch Q1 is off and the second main switch Q2 is off. The auxiliary switch Q3 is on. The diode D1 and the diode D5 are off. The diode D2 and the diode D6 are on.

In this case, the current IQ3 for resetting the magnetizing inductance of the transformer T1 and the magnetizing inductance of the transformer T2 flows. Then, as the auxiliary switch Q3 is turned off, the period 4 ends and shifts to the period 5.

In the period 5, the first main switch Q1 is off and the second main switch Q2 is off. The auxiliary switch Q3 is off. The diode D1, the diode D5, the diode D2 and the diode D6 are on.

In this case, the current IC2 flows and the voltage (Vds_Q1) falls. The current IC3 flows and the voltage (Vds_Q2) falls. Then, as the discharging of the capacitor C2 and the capacitor C3 is completed and the voltage (Vds_Q1) and the voltage (Vds_Q2) become zero, the period 5 ends and shifts to the period 6.

In the period 6, the first main switch Q1 is on (with its channel being off) as its body diode is biased in the forward direction. The second main switch Q2 is on (with its channel being off) as its body diode is biased in the forward direction. The auxiliary switch Q3 is off. The diode D1, the diode D5, the diode D2 and the diode D6 are on.

In this case, the current IQ1 and the current IQ2 flow in the backward direction. During such a period, that is, when these switches are on as their body diodes are biased in the forward direction, the first main switch Q1 and the second main switch Q2 are provided with the driving signal Vg1 and the driving signal (Vg2-V1) for turning on their channels, and the channels are thus turned on with a low loss.

Then, as the current IQ1 and the current IQ2 become zero, the period 6 ends and shifts to the period 7.

In the period 7, the first main switch Q1 is on and the second main switch Q2 is on. The auxiliary switch Q3 is off. The diode D1, the diode D5, the diode D2 and the diode D6 are on.

The current ID2 and the current ID6 decrease. The current IQ1 and the current IQ2 increase.

Then, as the current ID2 and the current ID6 become zero, the period 7 ends and shifts to the period 1.

Figure 1:
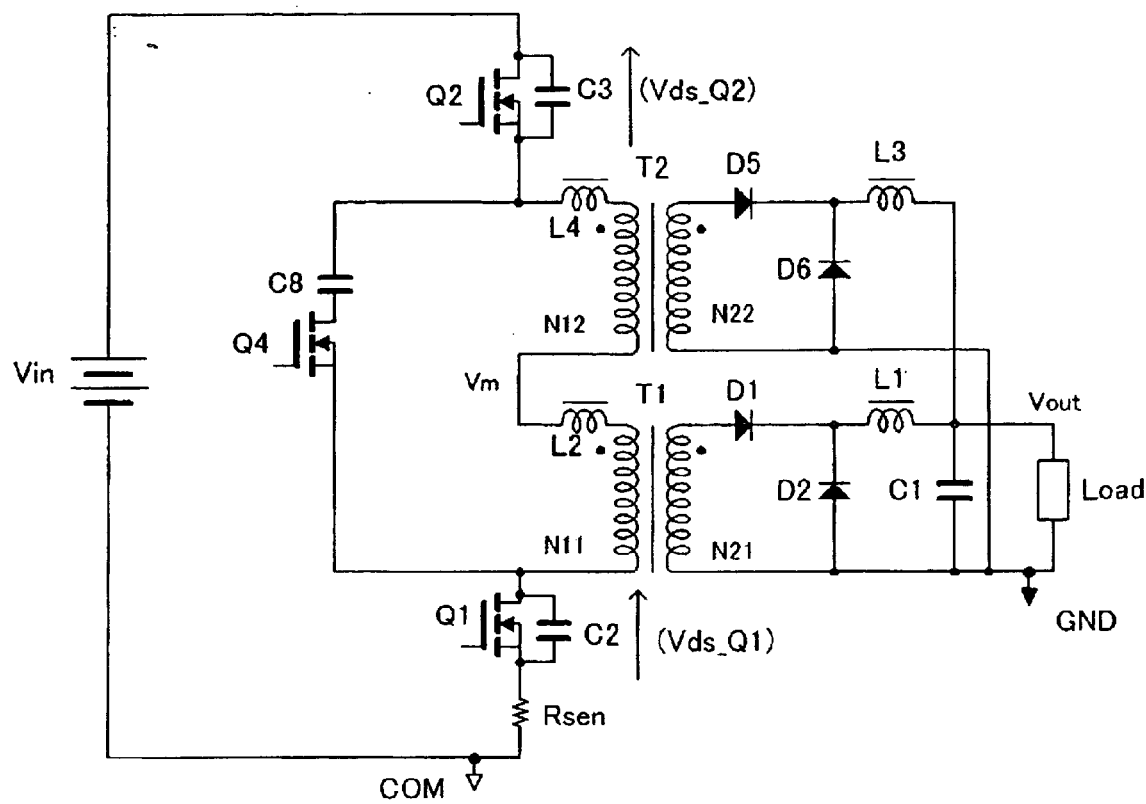
FIG. 1 is a structural view showing an example of a conventional switching power supply.
Figure 2:
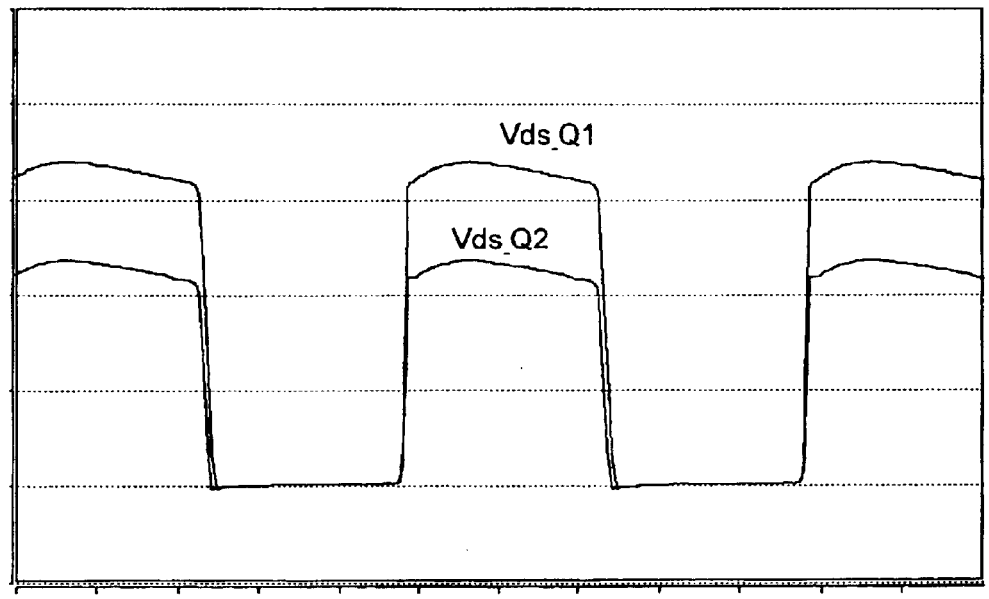
FIG. 2 shows operating waveforms in the conventional example of FIG. 1.
Figure 3:
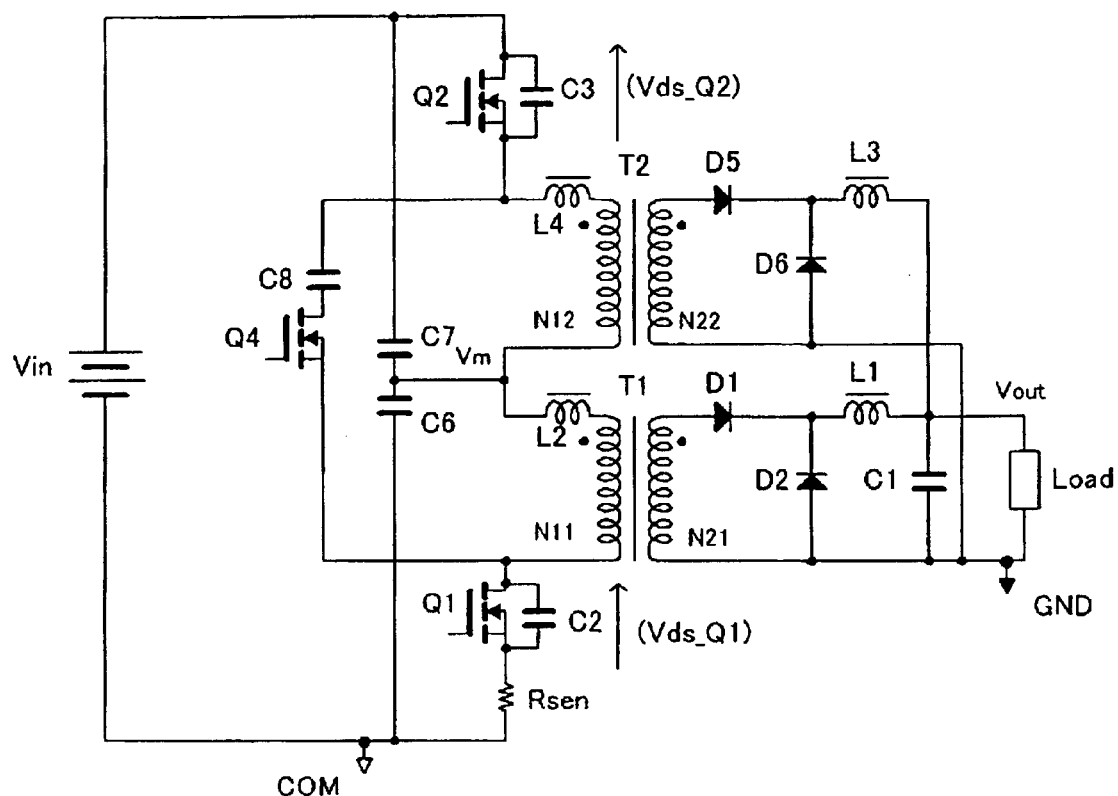
FIG. 3 is a structural view showing an example of a second conventional switching power supply.
Figure 4:
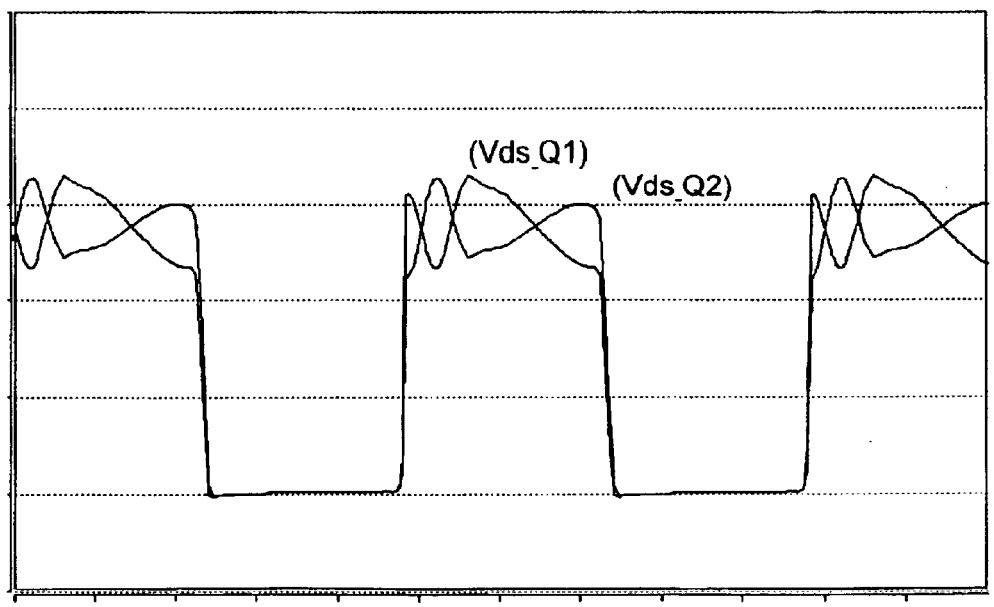
FIG. 4 shows operating waveforms in the conventional example of FIG. 3.

Similarly to the conventional example of FIG. 1, the voltage induced at the secondary winding N21 of the transformer T1 and the secondary winding N22 of the transformer T2 is rectified and smoothed to be the output voltage Vout, which supplies power to the load Iload.

In the embodiment of FIG. 6, the input voltage Vin is thus converted to the output voltage Vout.

The operation in the period when the first main switch Q1 is off and the second main switch Q2 is off will now be described.

The charging current of the first capacitor C5 flows through a circuit formed by the first diode D3, the first magnetic element (inductor L2 and transformer T1) and the first capacitor C5, and a circuit formed by the first diode D3, the second diode D4, the second capacitor C4, the second magnetic element (inductor L4 and transformer T2), the first magnetic element (inductor L2 and transformer T1) and the first capacitor C5.

The discharging current of the first capacitor C5 flows through a circuit formed by the auxiliary switch Q3, the second capacitor C4, the second magnetic element (inductor L4 and transformer T2), the first magnetic element (inductor L2 and transformer T1) and the first capacitor C5.

The charging current of the second capacitor C4 flows through a circuit formed by the second magnetic element (inductor L4 and transformer T2), the second diode D4 and the second capacitor C4, and a circuit formed by the second magnetic element (inductor L4 and transformer T2), the first magnetic element (inductor L2 and transformer T1), the first capacitor C5, the first diode D3, the second diode D4 and the second capacitor C4.

The discharging current of the second capacitor C4 flows through a circuit formed by the second magnetic element (inductor L4 and transformer T2), the first magnetic element (inductor L2 and transformer T1), the first capacitor C5, the auxiliary switch Q3 and the second capacitor C4.

Therefore, the charging paths and discharging paths of the first capacitor C5 and the second capacitor C4 are not coincident with each other.

Such charging currents and discharging currents automatically balance the stress on the first magnetic element (inductor L2 and transformer T1) and the second magnetic element (inductor L4 and transformer T2) and the stress on the first main switch Q1 and the second main switch Q2, and thus suitably stabilize the operation.

For example, in (g) of FIG. 10, the current ID3 excessively charges the first capacitor C5 in the period 2, but the current ID4 charges the second capacitor C4 while compensating its voltage in the period 3. As a result, the voltage of the first capacitor C5 and the voltage of the second capacitor C4 are stabilized.

In this manner, in the embodiment of this invention shown in FIG. 6, the influence of the parasitic elements of the circuit and the resistor Rsen is restrained and preferred characteristics can be realized.

The potential point Vm thus becomes stable at about half the value of the input voltage Vin, and the stress on the first magnetic element (inductor L2 and transformer T1) and the second magnetic element (inductor L4 and transformer T2) and the stress on the first main switch Q1 and the second main switch Q2 are suitably balanced.

If the first magnetic element (inductor L2 and transformer T1) and the like and the second magnetic element (inductor L4 and transformer T2) and the like have a difference in electrical property, the potential point Vm becomes stable at a value deviated from about half the value of Vin.

The bulk capacitor C6 and the bulk capacitor C7 further stabilize the potential point Vm.

Moreover, similarly to the conventional example of FIG. 1, the inductor L2 and the inductor L4, and the capacitor C2 and the capacitor C3 act to restrain the loss when switching the first main switch Q1, the second main switch Q2 and the auxiliary switch Q3. Particularly, they restrain the loss when turning on the switches.

Similarly to the capacitor C2 and the capacitor C3, the equivalent parallel capacity parasitic in the first magnetic element (inductor L2 and transformer T1), the equivalent parallel capacity parasitic in the second magnetic element (inductor L4 and transformer T2) and the parasitic capacity of the auxiliary switch Q3 act to restrain the loss when switching the first main switch Q1, the second main switch Q2 and the auxiliary switch Q3.

During the period when both the first main switch Q1 and the auxiliary switch Q3 are off, the loss in switching the first main switch Q1 and the auxiliary switch Q3 is restrained.

During the period when both the second main switch Q2 and the auxiliary switch Q3 are off, the loss in switching the second main switch Q2 and the auxiliary switch Q3 is restrained.

Figure 11:
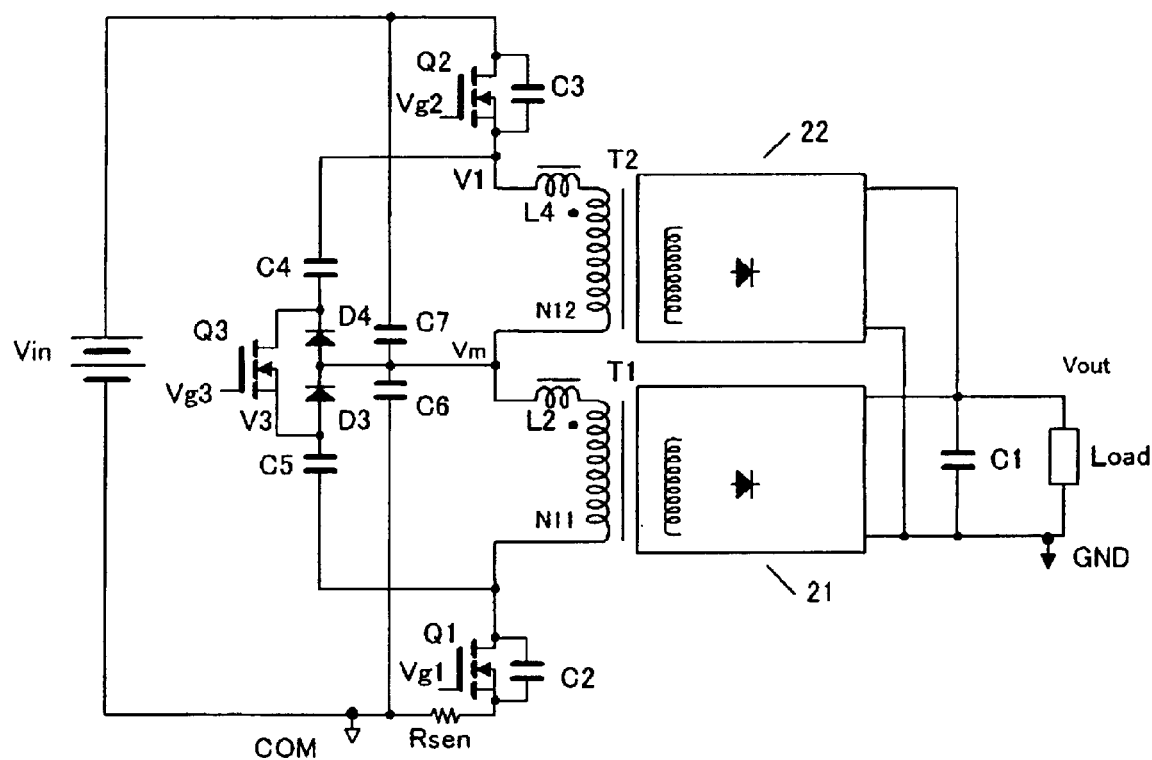
FIG. 11 is a structural view showing a second embodiment of this invention.

FIG. 11 is a structural view showing a second embodiment of the switching power supply according to this invention. The same elements as those of the conventional example shown in FIG. 6 are denoted by the same symbols and numerals and will not be described further in detail.

A characteristic feature of the embodiment shown in FIG. 11 is that an output circuit 21, which is a secondary winding and a rectifying and smoothing circuit of a transformer T1, and an output circuit 22, which is a secondary winding and a rectifying and smoothing circuit of a transformer T2, are provided for use in various applications.

Figure 12:
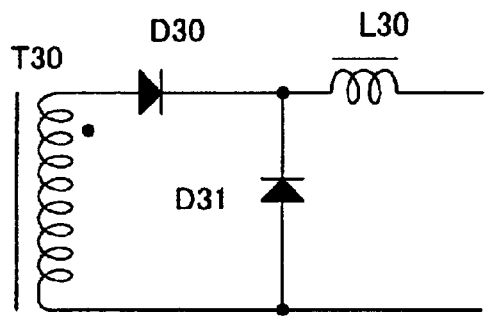
FIGS. 12A to 12H are structural views showing examples of an output circuit.
Figure 12:
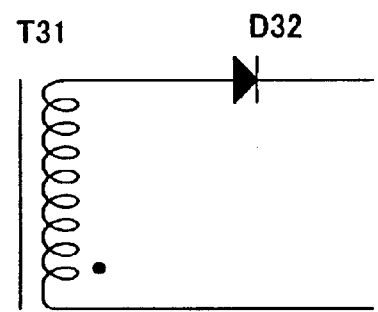
Figure 12:
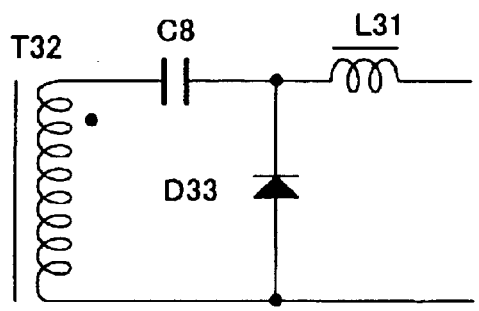
Figure 12:
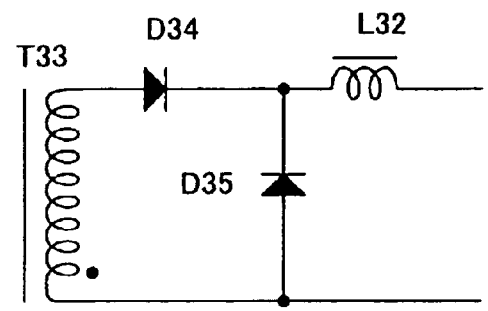
Figure 12:
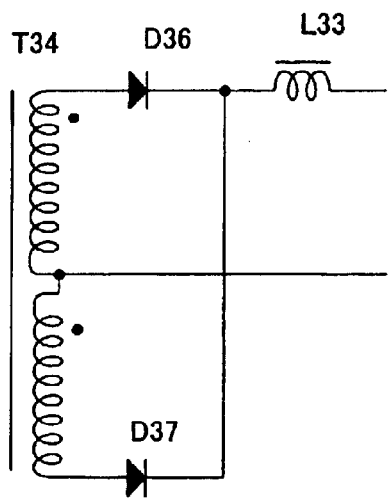
Figure 12:
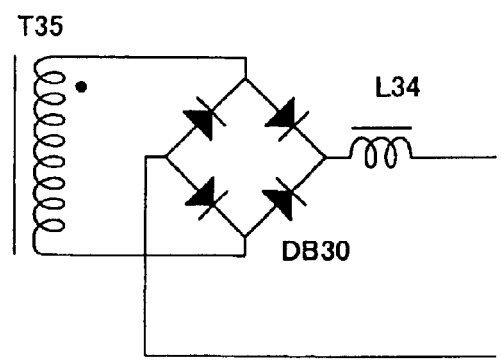
Figure 12:
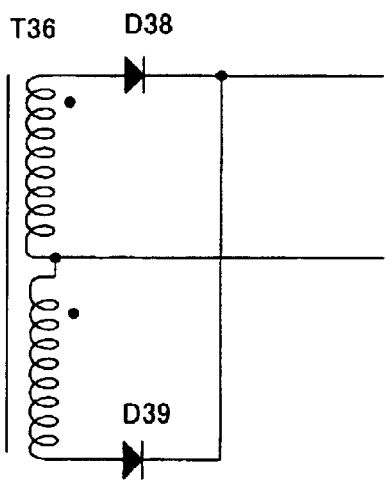
Figure 12:
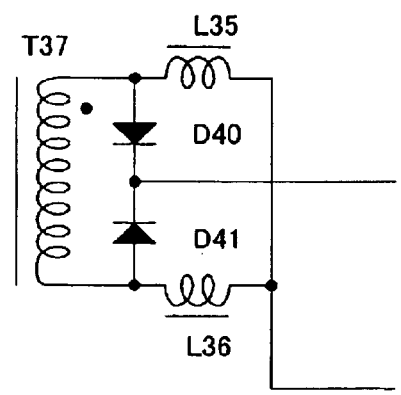

FIGS. 12A to 12H are structural views showing specific examples of the output circuit 21 and the output circuit 22 in the embodiment of FIG. 11. FIG. 12A shows a forward type. FIG. 12B shows a flyback type. FIG. 12C shows a Zeta type. FIG. 12D shows a fly-forward type. FIG. 12E shows a center tapped type. FIG. 12F shows a bridge type. FIG. 12G shows an inductanceless center tapped type. FIG. 12H shows a current doubler type. Modifications by combining these types are possible.

The operations in the structures of FIG. 11 combined with the structures of FIGS. 12A to 12H will now be described.

First, elements in the case where a first magnetic element (inductor L2 and transformer T1) and a second magnetic element (inductor L4 and transformer T2) deliver power to the output circuit 21 and the output circuit 22 when a first main switch Q1 and a second main switch Q2 are on are substantially similar to those in the embodiment of FIG. 6.

Specifically, the forward type of FIG. 12A, the Zeta type of FIG. 12C, the center tapped type of FIG. 12E, the bridge type of FIG. 12F, the inductanceless center tapped type of FIG. 12G and the current doubler type of FIG. 12H correspond to this case.

Next, with respect to elements in the case where the first magnetic element (inductor L2 and transformer T1) and the second magnetic element (inductor L4 and transformer T2) deliver power to the output circuit 21 and the output circuit 22 when the first main switch Q1 and the second main switch Q2 are off, the current related to this transmission of power is superimposed on the elements in the embodiment of FIG. 6.

Specifically, when the first main switch Q1 and the second main switch Q2 are off, the currents at the first capacitor C5, the second capacitor C4, the auxiliary switch Q3, the first magnetic element (inductor L2 and transformer T1), the second magnetic element (inductor L4 and transformer T4) and the like increase.

More specifically, the flyback type of FIG. 12B, the fly-forward type of FIG. 12D, the center tapped type of FIG. 12E, the bridge type of FIG. 12F, the inductanceless center tapped type of FIG. 12G and the current doubler type of FIG. 12H correspond to this case.

However, the operation of the essential part is substantially similar to the operation in the embodiment of FIG. 6.

Therefore, in any of FIGS. 12A to 12H, as in the embodiment of FIG. 6, the stress on the first magnetic element (inductor L2 and transformer T1) and the second magnetic element (inductor L4 and transformer T2) and the stress on the first main switch Q1, the second main switch Q2 and the like in the embodiment of FIG. 11 are suitably balanced by the action of a first diode D3, a second diode D4 and an auxiliary switch Q3.

In the embodiment of FIG. 11, similarly to the conventional example of FIG. 5, primary sides of two converters are connected in series and their secondary sides are connected in parallel.

That is, the first magnetic element (inductor L2 and transformer T1), the first main switch Q1, a capacitor C2, a resistor Rsen, the output circuit 21 and a capacitor C1 form a first converter.

Specifically, the first converter has the first magnetic element (inductor L2 and transformer T1) that is connected in series with the first main switch Q1 and induces a voltage to be an output Vout by turning on/off of the first main switch Q1.

The second magnetic element (inductor L4 and transformer T2), the second main switch Q2, a capacitor C3, the output circuit 22 and the capacitor C1 form a second converter.

Specifically, the second converter has the second magnetic element (inductor L4 and transformer T2) that is connected in series with the second main switch Q2 and induces a voltage to be an output Vout by turning on/off of the second main switch Q2.

Similar to the conventional example of FIG. 5, a bulk capacitor C6 and the first converter, and a bulk capacitor C7 and the second converter are connected in series at a potential point Vm as their connection point on the primary side of the switching power supply.

An input voltage Vin, the first converter and the second converter are connected in series.

Moreover, in the embodiment of FIG. 11, similarly to the conventional example of FIG. 5, the first main switch Q1 and the second main switch Q2 can operate independently.

Figure 13:
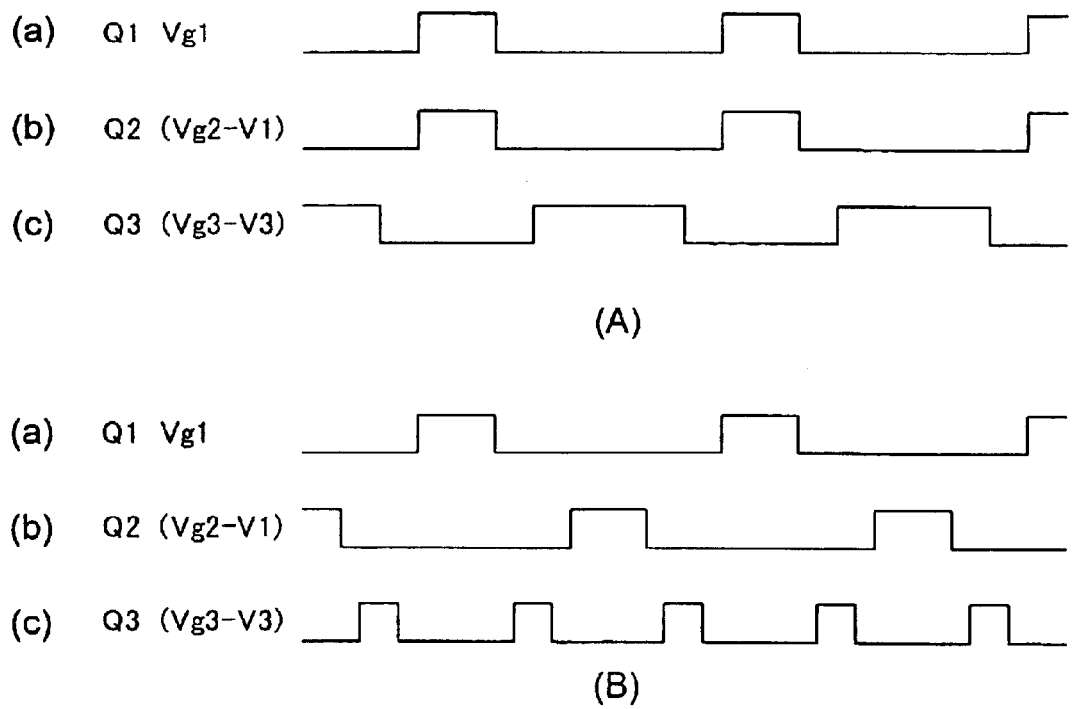
FIGS. 13A and 13B show waveforms of driving signals of respective switches in the embodiment of FIG. 11.

The operation in the case where the first main switch Q1 and the second main switch Q2 are made independent will now be described with reference to FIGS. 13A and 13B. FIGS. 13A and 13B show waveforms of driving signals for the respective switches in the embodiment of FIG. 11.

In FIGS. 13A and 13B, (a)Q1 Vg1 represents a waveform of a driving signal for the first main switch Q1, (b)Q2 (Vg2-V1) represents a waveform of a driving signal for the second main switch Q2, and (c)Q3 (Vg3-V3) represents a waveform of a driving signal for the auxiliary switch Q3.

FIG. 13A shows a case where the first main switch Q1 and the second main switch Q2 are turned on/off in phase. FIG. 13B shows a case where the first main switch Q1 and the second main switch Q2 are turned on/off in the opposite phases.

In both cases of FIGS. 13A and 13B, the auxiliary switch Q3 is turned on when both the first main switch Q1 and the second main switch Q2 are off.

The first main switch Q1 and the auxiliary switch Q3 are turned on/off in a complementary manner via a period when both of these switches are off. The second main switch Q2 and the auxiliary switch Q3 are turned on/off in a complementary manner via a period when both of these switches are off.

The operation in the case of FIG. 13A is similar to the operation in the embodiment of FIG. 6.

Next, the operation in the case of FIG. 13B will be described. The auxiliary switch Q3 is turned on in a short period when both the first main switch Q1 and the second main switch Q2 are off. During this period, the first magnetic element (inductor L2 and transformer T1) and the second magnetic element (inductor L4 and transformer T2) are suitably reset.

Therefore, in any case, as in the embodiment of FIG. 6, the stress on the first magnetic element (inductor L2 and transformer T1) and the second magnetic element (inductor L4 and transformer T2) and the stress on the first main switch Q1, the second main switch Q2 and the like are suitably balanced by the action of the first diode D3, the second diode D4 and the auxiliary switch Q3.

Even in the case where the first main switch Q1 and the second main switch Q2 operate independently, the stress on the first magnetic element (inductor L2 and transformer T1) and the second magnetic element (inductor L4 and transformer T2) and the stress on the first main switch Q1, the second main switch Q2 and the like are suitably balanced by turning on the auxiliary switch Q3 when both the first main switch Q1 and the second main switch Q2 are turned off.

Figure 14:
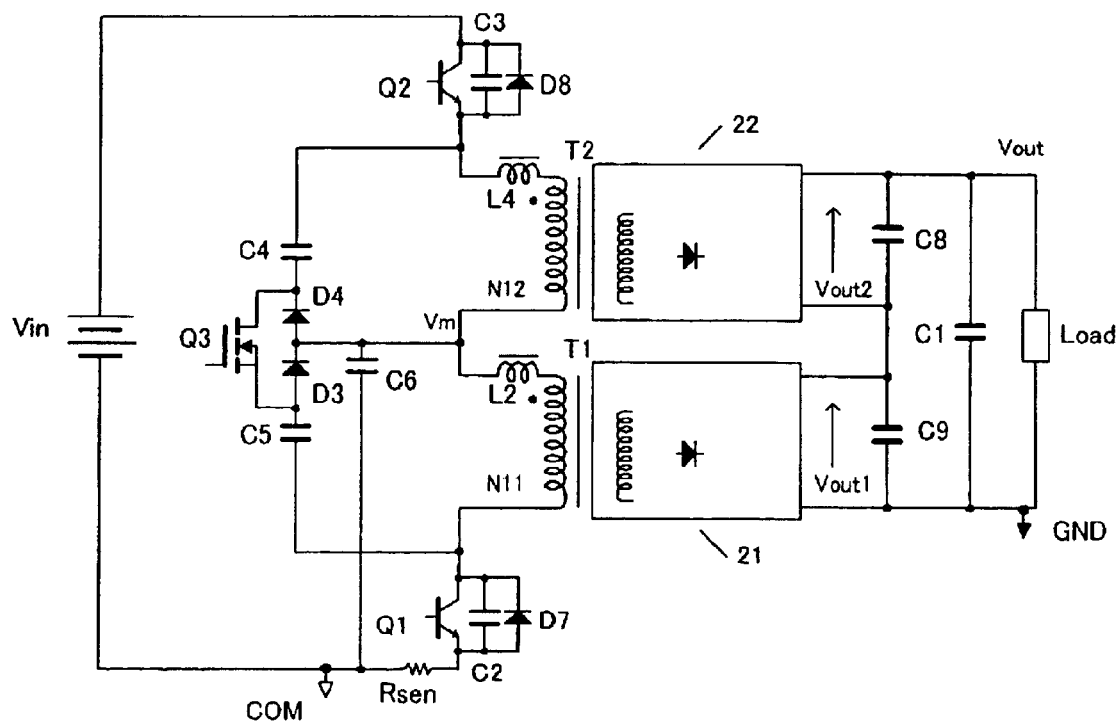
FIG. 14 is a structural view showing a third embodiment of this invention.

FIG. 14 is a structural view showing a third embodiment of the switching power supply according to this invention. The same elements as those of the embodiment shown in FIG. 11 are denoted by the same symbols and numerals and will not be described further in detail.

A first characteristic feature of the embodiment of FIG. 14 is that an output Vout1 of a first magnetic element (inductor L2 and transformer T1) and an output circuit 21 and an output Vout2 of a second magnetic element (inductor L4 and transformer T2) and an output circuit 22 are connected in series.

This structure is suitable for output of a high voltage. High voltage stress is not necessary at the output circuit 21 and the output circuit 22. Moreover, this structure is preferred because voltages generated at the transformer T1 and the transformer T2 are suitably balanced.

A second characteristic feature of the embodiment of FIG. 14 is that a bulk capacitor C7 arranged between a potential point Vm, which is a connection point between a cathode of a first diode D3 and an anode of a second diode D4, and a positive electrode of an input voltage Vin, is omitted. Only a bulk capacitor C6 arranged between a negative electrode of the input voltage Vin and the potential point Vm is provided.

In the embodiment of FIG. 11, the bulk capacitor C7 and the bulk capacitor C6 are equivalent in an alternating manner. Therefore, even with one bulk capacitor alone, equivalence is realized and the operation is not affected.

Apart from the above-described embodiment, the bulk capacitor C7 arranged between the positive electrode of the input voltage Vin and the potential point Vm may be added, and the bulk capacitor C6 arranged between the negative electrode of the input voltage Vin and the potential point Vm may be omitted (not shown).

Alternatively, both the bulk capacitor C6 arranged between the negative electrode of the input voltage Vin and the potential point and the bulk capacitor C7 arranged between the positive electrode of the input voltage Vin and the potential point may be omitted (not shown).

Also in such cases, an effect of automatically balancing a charging current and a discharging current flowing through the first diode D3, the second diode D4 and an auxiliary switch Q3 is independent from the bulk capacitor C6 and the bulk capacitor C7, as in the embodiment of FIG. 11.

Moreover, a third characteristic feature of the embodiment of FIG. 14 is that IGBTs, which are bipolar elements, are used for a first main switch Q1 and a second main switch Q2 and that a capacitor C2 and a diode D7 are connected parallel to the first main switch Q1 while a capacitor C3 and the diode D8 are connected parallel to the second main switch Q2.

In this manner, the first main switch Q1, the second main switch Q2 and the auxiliary switch Q3 are not limited to MOSFETs, and various switching elements can be used in combination with the diode D7 and the diode D8.

Through the diode D7 and the diode D8, currents flow in a direction opposite to the direction of the currents flowing through the first main switch Q1 and the second main switch Q2.

Moreover, though independent elements are connected to form the first diode D3, the second diode D4 and the auxiliary switch Q3 in the above-described embodiment, the first diode D3, the second diode D4 and the auxiliary switch Q3 may be formed as an integral element. This enables a low cost and a small size. The operation is similar to the above-described operation.

The first diode D3 and the second diode D4 may be formed by body diodes of MOSFET. This broadens the range of elements to be selected. The operation is similar to the above-described operation.

With the above-described features, the operation in the embodiment of FIG. 14 is similar to the operation in the embodiment of FIG. 11. The stress on the first magnetic element (inductor L2 and transformer T1) and the second magnetic element (inductor L4 and transformer T2) and the stress on the first main switch Q1, the second main switch Q2 and the like are suitably balanced by the action of the first diode D3, the second diode D4 and the auxiliary switch Q3.

Figure 15:
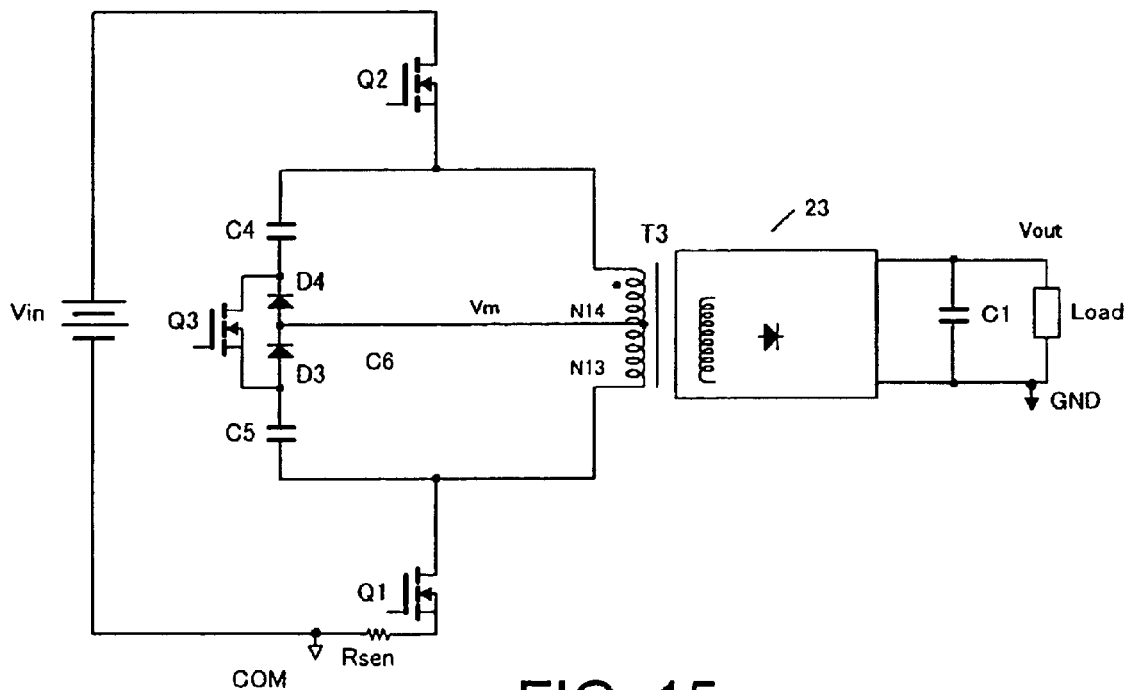
FIG. 15 is a structural view showing a fourth embodiment of this invention.

FIG. 15 is a structural view showing a fourth embodiment of the switching power supply according to this invention. The same elements as those of the embodiment shown in FIG. 11 are denoted by the same symbols and numerals and will not be described further in detail.

A characteristic feature of the embodiment of FIG. 15 is that a first magnetic element (transformer T3) and a second magnetic element (transformer T3) are magnetically coupled and formed by an integral transformer T3.

This structure enables formation of a single transformer T3 in the switching power supply and therefore suitable when an output is low because of a smaller number of component parts.

The structure of the embodiment of FIG. 15 will now be described.

A first primary winding N13 of the transformer T3 forms the first magnetic element (transformer T3).

A second primary winding N14 of the transformer T3 forms the second magnetic element (transformer T3).

The transformer T3 has an output circuit 23, which is a secondary winding and a rectifying and smoothing circuit. The output circuit 23 is similar to the output circuit 21 and the output circuit 22 of the embodiment shown in FIG. 11.

In the embodiment of FIG. 15, compared with the embodiment of FIG. 11, a bulk capacitor C6, a bulk capacitor C7, an inductor L2, inductor L4, a capacitor C2 and a capacitor C3 are not provided.

A first main switch Q1 and a second main switch Q2 are turned on/off in phase. The first main switch Q1 and the second main switch Q2, and an auxiliary switch Q3 are turned on/off in a complementary manner.

The structure with respect to the transformer T3, which is a magnetic element, will be described in detail. One end of the first primary winding N13 is connected to the other end (drain) of the first main switch Q1. One of the second primary winding N14 is connected to the other end (source) of the second main switch Q2. The other end of the second primary winding N14 is connected to the other end of the first primary winding N13. A voltage to be an output is induced by turning on/off of the first main switch Q1 and the second main switch Q2, and an output voltage Vout is generated through the output circuit 23.

An anode of a first diode D3 is connected to a connection point between the first main switch Q1 and the first primary winding N13 via a first capacitor C5. A cathode of the first diode D3 is connected to a connection point between the first primary winding N13 and the second primary winding N14. A cathode of a second diode D4 is connected to a connection point between the second main switch Q2 and the second primary winding N14 via a second capacitor C4.

The operation in this embodiment of FIG. 15 will now be described.

First, when the first main switch Q1 is on, the second main switch Q2 is on and the auxiliary switch Q3 is off, the first diode D3 is off and the second diode D4 is off. An input voltage Vin excites the first magnetic element (transformer T3) and the second magnetic element (transformer T3).

Next, when the first main switch Q1 is off and the second main switch Q2 is off, currents for charging and discharging the first capacitor C5 and the second capacitor C4 flow through the auxiliary switch Q3, the first diode D3 and the second diode D4. The first magnetic element (transformer T3) and the second magnetic element (transformer T3) are reset.

In this case, the charging current and the discharging current flowing through the first diode D3, the second diode D4 and the auxiliary switch Q3 are automatically balanced, as in the embodiment of FIG. 11.

Therefore, the operation in the embodiment of FIG. 15 suitably balances the stress on the first main switch Q1, the second main switch Q2 and the like, as in the embodiment shown in FIG. 11.

Figure 16:
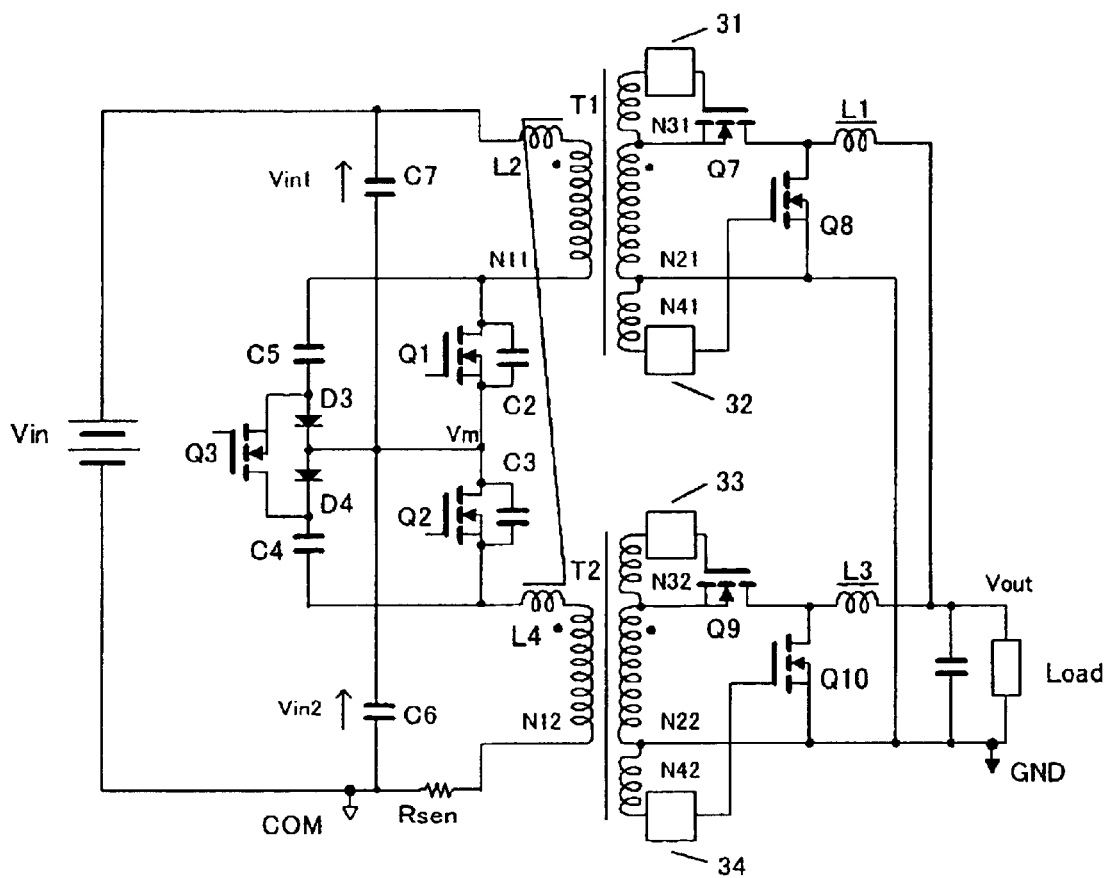
FIG. 16 is a structural view showing a fifth embodiment of this invention.

FIG. 16 is a structural view showing a fifth embodiment of the switching power supply according to this invention. The same elements as those of the embodiment shown in FIG. 11 are denoted by the same symbols and numerals and will not be described further in detail.

A first characteristic feature of the embodiment of FIG. 16 is that the arrangement of the first magnetic element (inductor L2 and transformer T1), the second magnetic element (inductor L4 and transformer T2), the first main switch Q1 and the second main switch Q2 in the embodiment of FIG. 6 is changed.

Specifically, a series switch circuit (first main switch Q1 and second main switch Q2) formed by series connection of the first main switch Q1 and the second main switch Q2 is provided.

The first magnetic element (inductor L2 and transformer T1) has its one end connected with one end (drain of first main switch Q1) of the series switch circuit (first main switch Q1 and second main switch Q2) and has its other end connected to a positive electrode of an input voltage Vin. The first magnetic element (inductor L2 and transformer T1) induces a voltage to be an output by turning on/off of the first main switch Q1 and the second main switch Q2.

The second magnetic element (inductor L4 and transformer T2) has its one end connected to the other end (source of second main switch Q2) of the series switch circuit (first main switch Q1 and second main switch Q2) and has its other end connected to a common potential COM, which is a negative electrode of the input voltage Vin, via a resistor Rsen. The second magnetic element (inductor L4 and transformer T2) induces a voltage to be an output by turning on/off of the first main switch Q1 and the second main switch Q2.

This switching power supply has the following features.

A first diode D3 is provided having its anode connected to a connection point between the drain of the first main switch Q1 and the first magnetic element (inductor L2 and transformer T1) via a first capacitor C5 and having its cathode connected to a potential point Vm, which is a connection point between the first main switch Q1 and the second main switch Q2.

A second diode D4 is provided having its anode connected to the cathode of the first diode D3 and having its cathode connected to a connection point between the source of the second main switch Q2 and the second magnetic element (inductor L4 and transformer T2) via a second capacitor C4.

Moreover, an auxiliary switch Q3 is provided which is arranged between the cathode of the second diode D4 and the anode of the first diode D3 and which is turned on when both the first main switch Q1 and the second main switch Q2 are off.

The operation in this embodiment of FIG. 16 is similar to the operation in the embodiment of FIG. 11 because of the equivalent transform of the arrangement. The stress on the first magnetic element (inductor L2 and transformer T1) and the second magnetic element (inductor L4 and transformer T2) and the stress on the first main switch Q1, the second main switch Q2 and the like are suitably balanced by the action of the first diode D3, the second diode D4 and the auxiliary switch Q3.

A second characteristic feature of the embodiment of FIG. 16 is that a voltage induced at the first magnetic element (inductor L2 and transformer T1) is rectified by a switch Q7 and a switch Q8 and that a voltage induced at the second magnetic element (inductor L4 and transformer T2) is rectified by a switch Q9 and a switch Q10.

Specifically, a secondary winding N21 of the transformer T1 of the first magnetic element (inductor L2 and transformer T1) is connected to the switch Q7 and the switch Q8, then to an inductor L1 and a capacitor C1, and then to a load Load.

An auxiliary winding N31 of the transformer T1 is connected to a gate of the switch Q7 via a control circuit 31. An auxiliary winding N41 of the transformer T1 is connected to a gate of the switch Q8 via a control circuit 32.

A secondary winding of the transformer T2 of the second magnetic element (inductor L4 and transformer T2) is connected to the switch Q9 and the switch Q10, then to an inductor L3 and the capacitor C1, and then to the load Load.

An auxiliary winding N32 of the transformer T2 is connected to a gate of the switch Q9 via a control circuit 33. An auxiliary winding N42 is connected to a gate of the switch Q10 via a control circuit 34.

The switch Q7, the switch Q8, the switch Q9 and the switch Q10 operate as rectifiers, respectively, similar to the diode D1, the diode D2, the diode D5 and the diode D6 in FIG. 6.

In this case, since the stress on the transformer T1 and the stress on the transformer T2 are balanced, suitable rectification can be carried out.

Moreover, suitable driving signals are generated at the auxiliary winding N31, the auxiliary winding N41, the auxiliary winding N32 and the auxiliary winding N42.

Therefore, in the embodiment of FIG. 16 as described above, since suitable rectification can be carried out, the loss is reduced and high efficiency is realized.

A third characteristic feature of the embodiment of FIG. 16 is that the inductor L2 of the first magnetic element (inductor L2 and transformer T1) and the inductor L4 of the second magnetic element (inductor L4 and transformer T2) are magnetically coupled.

This enables balance between a current in the inductor L2 and a current in the inductor L4, which is preferable.

Figure 17:
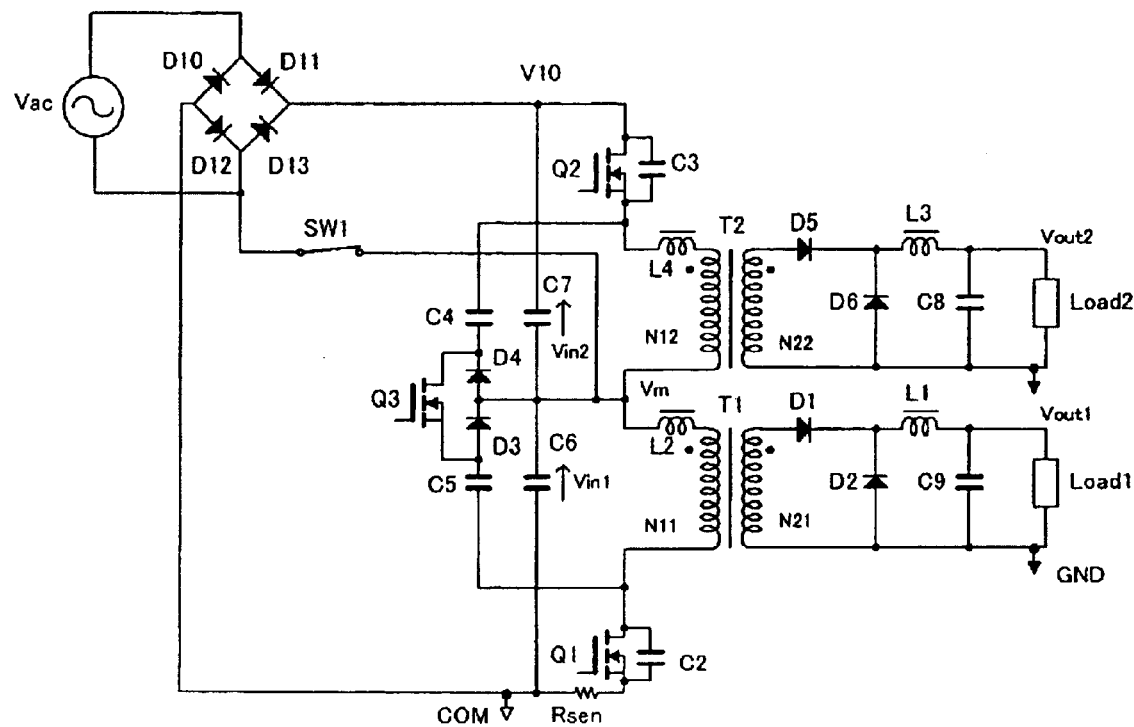
FIG. 17 is a structural view showing a sixth embodiment of this invention.

FIG. 17 is a structural view showing a sixth embodiment of the switching power supply according to this invention. The same elements as those of the embodiment shown in FIG. 6 are denoted by the same symbols and numerals and will not be described further in detail.

A characteristic feature of the embodiment of FIG. 17 is that voltage doubler rectification of an AC input voltage Vac is carried out at a diode D10 and a diode D11 to generate a first input voltage Vin1 and a second input voltage Vin2, and that a potential of their midpoint is connected to a potential point Vm.

First, the first input voltage Vin1 and the second input voltage Vin2 will be described. The potential point Vm is connected to a switch SW1, a bulk capacitor C6, a bulk capacitor C7, a first diode D3 and a second diode D4.

One end of the AC input voltage Vac is connected to the potential point Vm via the switch SW1. The other end of the AC input voltage Vac is connected to a common potential COM and the bulk capacitor C6 via the diode D10 and is also connected to a potential point V10 and the bulk capacitor C7 via the diode D11.

When the switch SW1 is on, the AC input voltage Vac is rectified at the diode D10 and the diode D11 and smoothed at the bulk capacitor C6 and the bulk capacitor C7. A DC voltage is generated in the bulk capacitor C6 and the bulk capacitor C7.

In this manner, the bulk capacitor C6 has the first input voltage Vin1 and the bulk capacitor C7 has the second input voltage Vin2.

On the other hand, when the switch SW1 is off, the AC input voltage Vac is full-wave rectified at the diode D10, the diode D11, a diode D12 and a diode D13 and smoothed at the bulk capacitor C6 and the bulk capacitor C7. A series circuit formed by the bulk capacitor C6 and the bulk capacitor C7 has an input voltage Vin.

The operation in this case where the switch SW1 is off is similar to the operation in the embodiment of FIG. 11 and therefore will not be described further in detail.

Next, with respect to the embodiment of FIG. 17 in the case where the switch SW1 is on, the relation between the first input voltage Vin1, the second input voltage Vin2 and this invention will be described in detail.

A series voltage circuit (first input voltage Vin1 and second input voltage Vin2) formed by series connection of the first input voltage Vin1 and the second input voltage Vin2 is provided.

A positive electrode of the first input voltage Vin1 and a negative electrode of the second input voltage Vin2 are connected to each other at the potential point Vm.

Also a first main switch Q1 is provided, having its one end (source) connected with the common potential COM, which is one end (negative electrode of first input voltage Vin1) of the series voltage circuit (first input voltage Vin1 and second input voltage Vin2), via a resistor Rsen.

Moreover, a second main switch Q2 is provided, having its one end (drain) connected with the other end (positive electrode of second input voltage Vin2) of the series voltage circuit (first input voltage Vin1 and second input voltage Vin2).

Also a first magnetic element (inductor L2 and transformer T1) is provided, having its one end connected with the other end (drain) of the first main switch Q1 and having its other end connected with the potential point Vm, which is the connection point between the first input voltage Vin1 and the second input voltage Vin2.

The first magnetic element (inductor L2 and transformer T1) induces a voltage to be an output Vout1 by turning on/off of the first main switch Q1 and the second main switch Q2.

Moreover, a second magnetic element (inductor L4 and transformer T2) is provided, having its one end connected with the other end (source) of the second main switch Q2 and having its other end connected with the potential point Vm, which is the connection point between the first input voltage Vin1 and the second input voltage Vin2.

The second magnetic element (inductor L4 and transformer T2) induces a voltage to be an output Vout2 by turning on/off of the first main switch Q1 and the second main switch Q2.

Such a switching power supply has the following characteristic features.

The first diode D3 has its anode connected to a connection point between the drain of the first main switch Q1 and the first magnetic element (inductor L2 and transformer T1) via a first capacitor C5 and has its cathode connected to the potential point Vm, which is the connection point between the first input voltage Vin1 and the second input voltage Vin2.

The second diode D4 has its anode connected to the cathode of the first diode D3 and has its cathode connected to a connection point between the source of the second main switch Q2 and the second magnetic element (inductor L4 and transformer T2) via a second capacitor C4.

Moreover, an auxiliary switch Q3 is provided which is arranged between the cathode of the second diode D4 and the anode of the first diode D3 and which is turned on when both the first main switch Q1 and the second main switch Q2 are off.

In this embodiment of FIG. 17, as in the conventional example of FIG. 5, primary sides of two converters are connected in series.

That is, the first main switch Q1, the first magnetic element (inductor L2 and transformer T1), a capacitor C2, the resistor Rsen, a diode D1, a diode D2, an inductor L1 and a capacitor C9 form a first converter.

Specifically, the first converter has, on its primary side, the first magnetic element (inductor L2 and transformer T1) which is connected in series with the first main switch and which induces a voltage to be an output by turning on/off of the first main switch.

The first converter is connected with the first input voltage Vin1 and thus supplied with power.

The second main switch Q2, the second magnetic element (inductor L4 and transformer T2), a capacitor C3, a diode D5, a diode D6, an inductor L3 and a capacitor C8 form a second converter.

Specifically, the second converter has, on its primary side, the second magnetic element (inductor L4 and transformer T2) which is connected in series with the second main switch and which induces a voltage to be an output by turning on/off of the second main switch.

The second converter is connected with the second input voltage Vin2 and thus supplied with power.

Parallel connection of the first input voltage Vin1 and the first converter and parallel connection of the second input voltage Vin2 and the second converter are connected in series.

The connection point between the parallel connection of the first input voltage Vin1 and the first converter and the parallel connection of the second input voltage Vin2 and the second converter is the potential point Vm.

Such a switching power supply has the following characteristic features.

The first diode D3 has its anode connected to the connection point between the drain of the first main switch Q1 and the first magnetic element (inductor L2 and transformer T1) via the first capacitor C5 and has its cathode connected to the potential point Vm, which is the connection point between the first converter and the second converter.

The second diode D4 has its anode connected to the cathode of the first diode D3 and has its cathode connected to the connection point between the source of the second main switch Q2 and the second magnetic element (inductor L4 and transformer T2) via the second capacitor C4.

Moreover, the auxiliary switch Q3 is arranged between the cathode of the second diode D4 and the anode of the first diode D3 and is turned on when both the first main switch Q1 and the second main switch Q2 are off.

In the embodiment of FIG. 17, the output of a secondary winding N21 of the transformer T1 of the first magnetic element (inductor L2 and transformer T1) is the output voltage Vout1, and the output of a secondary winding N22 of the transformer T2 of the second magnetic element (inductor L4 and transformer T2) is the output voltage Vout2. These output voltages are independent of each other.

The operation in this embodiment of FIG. 17 is similar to the operation in the embodiment of FIG. 11, with the voltages of the bulk capacitor C6 and the bulk capacitor C7 replaced by the first input voltage Vin1 and the second input voltage Vin2.

The stress on the first magnetic element (inductor L2 and transformer T1) and the second magnetic element (inductor L4 and transformer T2) and the stress on the first main switch Q1, the second main switch Q2 and the like are suitably balanced by the action of the first diode D3, the second diode D4 and the auxiliary switch Q3.

For this structure using the first input voltage Vin1 and the second input voltage Vin2, a structure in which the arrangement of the first magnetic element (inductor L2 and transformer T1) and the second magnetic element (inductor L4 and transformer T2) and the arrangement of the first main switch Q1 and the second main switch Q2 are replaced, as in the embodiment of FIG. 16, can be used.

With this structure, the voltage of the bulk capacitor C7 is replaced by the first input voltage Vin1 and the voltage of the bulk capacitor C6 is replaced by the second input voltage Vin2 in the embodiment of FIG. 16 (not shown).

That is, a series voltage circuit (first input voltage Vin1 and second input voltage Vin2) formed by series connection of the first input voltage Vin1 and the second input voltage Vin2 is provided.

The positive electrode of the second input voltage Vin2 and the negative electrode of the first input voltage Vin1 are connected with each other at the potential point Vm.

A first main switch Q1 is provided, having its one end (source) connected with a potential point Vm, which is the connection point between the first input voltage Vin1 and the second input voltage Vin2.

A second main switch Q2 is provided, having its one end (drain) connected with the potential point Vm, which is the connection point between the first input voltage Vin1 and the second input voltage Vin2.

Moreover, a first magnetic element (inductor L2 and transformer T1) is provided, having its one end connected with the other end (drain) of the first main switch Q1 and having its other end connected with one end (positive electrode of first input voltage Vin1) of the series voltage circuit (first input voltage Vin1 and second input voltage Vin2).

The first magnetic element (inductor L2 and transformer T1) induces a voltage to be an output by turning on/off of the first main switch Q1 and the second main switch Q2.

Moreover, a second magnetic element (inductor L4 and transformer T2) is provided, having its one end connected with the other end (source) of the second main switch Q2 and having its other end connected with a common potential COM, which is the other end (negative electrode of second input voltage Vin2) of the series voltage circuit (first input voltage Vin1 and second input voltage Vin2), via a resistor Rsen.

The second magnetic element (inductor L4 and transformer T2) induces a voltage to be an output by turning on/off of the first main switch Q1 and the second main switch Q2.

Such a switching power supply has the following characteristic features.

A first diode D3 is provided, having its anode connected to the connection point between the drain of the first main switch Q1 and the first magnetic element (inductor L2 and transformer T1) via a first capacitor C5 and having its cathode connected to the potential point Vm, which is the connection point between the first input voltage Vin1 and the second input voltage Vin2.

A second diode D4 is provided, having its anode connected to the cathode of the first diode D3 and having its cathode connected to the connection point between the source of the second main switch Q2 and the second magnetic element (inductor L4 and transformer T2) via a second capacitor C4.

An auxiliary switch Q3 is provided which is arranged between the cathode of the second diode D4 and the anode of the first diode D3 and which is turned on when both the first main switch Q1 and the second main switch Q2 are off.

The operation in this case is similar to the operation in the embodiment of FIG. 17, as in the embodiment of FIG. 16, and therefore will not be described further in detail.

In the above-described embodiment, the first input voltage Vin1 and the second input voltage Vin2 are obtained by rectifying the AC input voltage Vac. However, apart from this, a battery can be connected in series.

Figure 18:
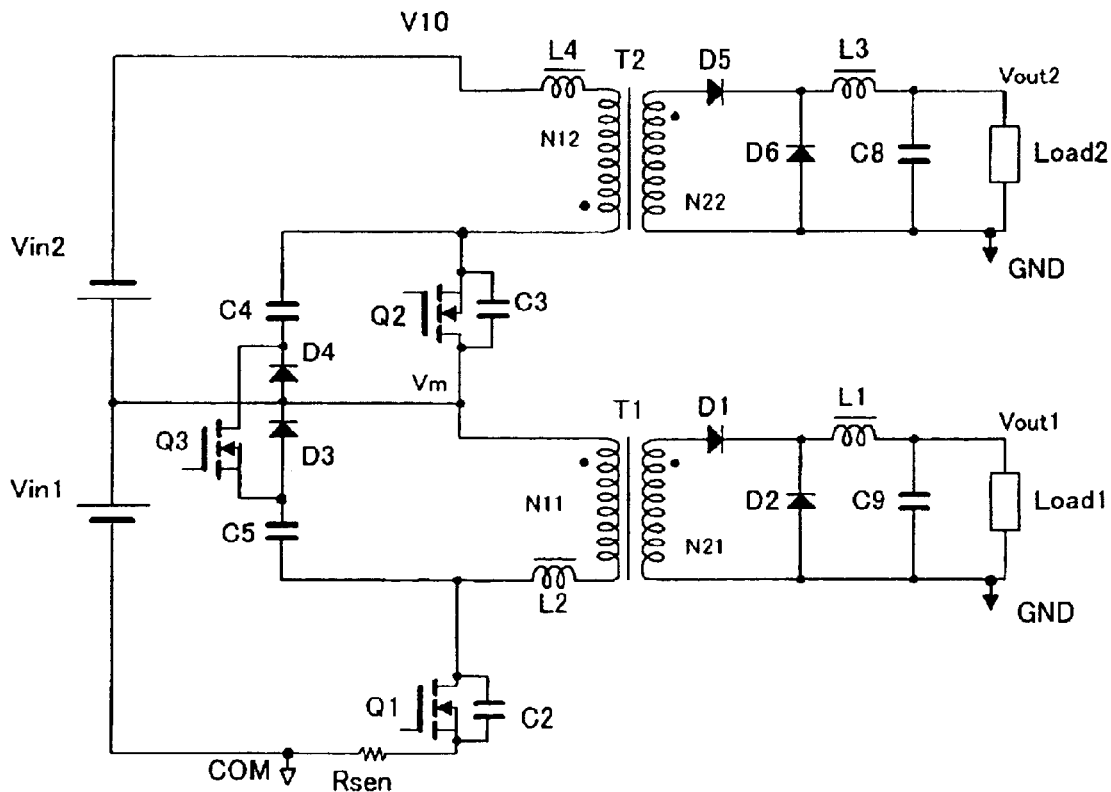
FIG. 18 is a structural view showing a seventh embodiment of this invention.

FIG. 18 is a structural view showing a seventh embodiment of the switching power supply according to this invention. The same elements as those of the embodiment shown in FIG. 17 are denoted by the same symbols and numerals and will not be described further in detail.

A characteristic feature of the embodiment of FIG. 18 is that a first input voltage Vin1 and a second input voltage Vin2 are formed by batteries and that the arrangement of a second magnetic element (inductor L4 and transformer T2), a second main switch Q2 and the second input voltage Vin2 is changed.

Specifically, a first main switch Q1, a first magnetic element (inductor L2 and transformer T1), a capacitor C2, a resistor Rsen, a diode D1, a diode D2, an inductor L1 and a capacitor C9 form a first converter.

The first converter has, on its primary side, the first magnetic element (inductor L2 and transformer T1) connected in series with the first main switch and inducing a voltage to be an output by turning on/off of the first main switch.

The first converter is connected to the first input voltage Vin1 via the resistor Rsen and is thus supplied with power.

The second main switch Q2, the second magnetic element (inductor L4 and transformer T2), a capacitor C3, a diode D5, a diode D6, an inductor L3 and a capacitor C8 form a second converter.

Specifically, the second converter has, on its primary side, the second magnetic element (inductor L4 and transformer T2) connected in series with the second main switch and inducing a voltage to be an output by turning on/off of the second main switch.

The second converter is connected to the second input voltage Vin2 and is thus supplied with power.

Parallel connection of the first input voltage Vin1 and the first converter and parallel connection of the second input voltage Vin2 and the second converter are connected in series.

The connection point between the parallel connection of the first input voltage Vin1 and the first converter and the parallel connection of the second input voltage Vin2 and the second converter is a potential point Vm.

Therefore, a positive electrode of the first input voltage Vin1 and a positive electrode of the second input voltage Vin2 are connected at the potential point Vm. That is, a series voltage circuit (first input voltage Vin1 and second input voltage Vin2) formed by series connection of the first input voltage Vin1 and the second input voltage Vin2 is provided.

However, from a different viewpoint, the first input voltage Vin1 and the second input voltage Vin2 are connected in parallel.

Such a switching power supply has the following characteristic features.

A first diode D3 is provided, having its anode connected to a connection point between a drain of the first main switch Q1 and the first magnetic element (inductor L2 and transformer T1) via a first capacitor C5 and having its cathode connected to the potential point Vm, which is the connection point between the first converter and the second converter.

Also a second diode D4 is provided, having its anode connected to the cathode of the first diode D3 and having its cathode connected to a connection point between a source of the second main switch Q2 and the second magnetic element (inductor L4 and transformer T2) via a second capacitor C4.

Moreover, an auxiliary switch Q3 is provided which is arranged between the cathode of the second diode D4 and the anode of the first diode D3 and which is turned on when both the first main switch Q1 and the second main switch Q2 are off.

The operation in this embodiment of FIG. 18 is similar to the operation in the embodiment of FIG. 17.

The stress on the first magnetic element (inductor L2 and transformer T1) and the second magnetic element (inductor L4 and transformer T2) and the stress on the first main switch Q1, the second main switch Q2 and the like are suitably balanced by the action of the first diode D3, the second diode D4 and the auxiliary switch Q3.

Figure 19:
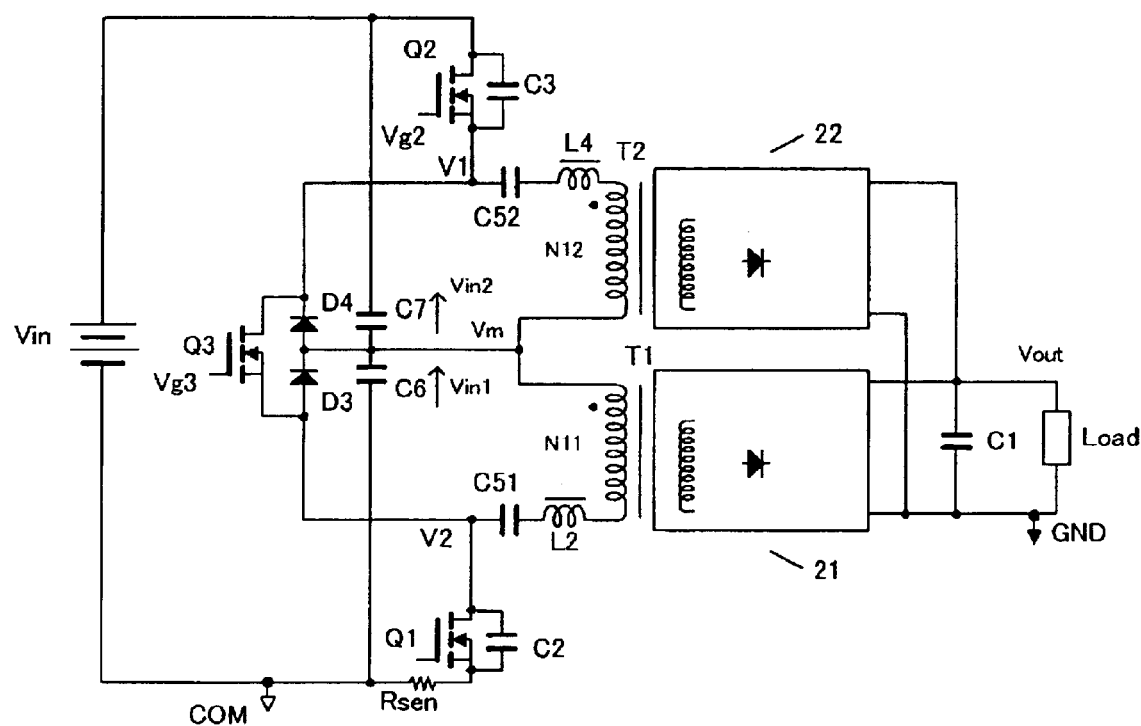
FIG. 19 is a structural view showing an eighth embodiment of this invention.

FIG. 19 is a structural view showing an eighth embodiment of the switching power supply according to this invention. The same elements as those of the embodiment shown in FIG. 14 are denoted by the same symbols and numerals and will not be described further in detail.

A characteristic feature of the embodiment of FIG. 19 is that a first capacitor C51 is connected in series with a first magnetic element (inductor L2 and transformer T1) and that a second capacitor C52 is connected in series with a second magnetic element (inductor L4 and transformer T2).

In the first capacitor C51 and the second capacitor C52 of FIG. 19, and the first capacitor C5 and the second capacitor C4 of FIG. 11, AC equivalent circuits in the actual operation can be approximated by constant-voltage sources, respectively.

Therefore, the operation in the embodiment of FIG. 19 and the operation in the embodiment of FIG. 11 are similar to each other.

The embodiment of FIG. 19 has advantages such as reduction in voltage stress on a first main switch Q1, a second main switch Q2 and an auxiliary switch Q3, compared with the embodiment of FIG. 11. However, the embodiment of FIG. 19 has drawbacks such as increase in current stress on the auxiliary switch Q3, the first capacitor C51 and the second capacitor C52.

First, the structure shown in FIG. 19 will be described in detail.

The first main switch Q1 has its one end (source) connected with a common potential COM, which is a negative electrode of an input voltage Vin, via a resistor Rsen.

The second main switch Q2 has its one end (drain) connected with a positive electrode of the input voltage Vin.

A first series circuit (inductor L2, transformer T1 and first capacitor C51) is provided which is formed by the first magnetic element (inductor L2 and transformer T1) and the first capacitor C51 and which has its one end connected with the other end (drain) of the first main switch Q1.

The first magnetic element (inductor L2 and transformer T1) induces a voltage to be an output Vout by turning on/off of the first main switch Q1 and the second main switch Q2.

Also a second series circuit (inductor L4, transformer T2 and second capacitor C52) is provided which is formed by the second magnetic element (inductor L4 and transformer T2) and the second capacitor C52 and which has its one end connected with the other end (source) of the second main switch and has its other end connected with the other end of the first series circuit (inductor L2, transformer T1 and first capacitor C51).

The second magnetic element (inductor L4 and transformer T2) induces a voltage to be an output Vout by turning on/off of the first main switch Q1 and the second main switch Q2.

Therefore, the first series circuit (inductor L2, transformer T1 and first capacitor C51) and the second series circuit (inductor L4, transformer T2 and second capacitor C52) are connected in series at a potential point Vm as their connection point.

Such a switching power supply has the following characteristic features.

A first diode D3 is provided which has its anode connected to a connection point between the first main switch Q1 and the first series circuit (inductor L2, transformer T1 and first capacitor C51) and which has its cathode connected to the potential point Vm, which is the connection point between the first series circuit (inductor L2, transformer T1 and first capacitor C51) and the second series circuit (inductor L4, transformer T2 and second capacitor C52).

Also a second diode D4 is provided which has its anode connected to the cathode of the first diode D3 and which has its cathode connected to a connection point between the second main switch Q2 and the second series circuit (inductor L4, transformer T2 and second capacitor C52).

Moreover, the auxiliary switch Q3 is arranged between the cathode of the second diode D4 and the anode of the first diode D3 and is turned on when both the first main switch Q1 and the second main switch Q2 are off.

In this embodiment of FIG. 19, as in the embodiment of FIG. 11, two converters are connected in series on their primary sides.

That is, the first main switch Q1, the first series circuit (inductor L2, transformer T1 and first capacitor C51), a capacitor C2, the resistor Rsen, an output circuit 21 and a capacitor C1 form a first converter.

Specifically, the first converter has the first series circuit (inductor L2, transformer T1 and first capacitor C51) formed by series connection of the first magnetic element (inductor L2 and transformer T1) and the first capacitor C51.

The first magnetic element (inductor L2 and transformer T1) is connected in series with the first main switch Q1 and induces a voltage to be the output Vout by turning on/off of the first main switch.

The second main switch Q2, the second series circuit (inductor L4, transformer T2 and second capacitor C52), a capacitor C3, an output circuit 22 and the capacitor C1 form a second converter.

Specifically, the second converter has the second series circuit (inductor L4, transformer T2 and second capacitor C52) formed by series connection of the second magnetic element (inductor L4 and transformer T2) and the second capacitor C52.

The second magnetic element (inductor L4 and transformer T2) is connected in series with the second main switch Q2 and induces a voltage to be the output Vout by turning on/off of the second main switch.

The input voltage Vin, the first converter and the second converter are connected in series.

Such a switching power supply has the following characteristic features.

The first diode D3 has its anode connected to the connection point between the first main switch Q1 and the first series circuit (inductor L2, transformer T1 and first capacitor C51) and has its cathode connected to the connection point between the first converter and the second converter.

The second diode D4 has its anode connected to the cathode of the first diode D3 and has its cathode connected to the connection point between the second main switch Q2 and the second series circuit (inductor L4, transformer T2 and second capacitor C52).

Moreover, the auxiliary switch Q3 is arranged between the cathode of the second diode D4 and the anode of the first diode D3 and is turned on when both the first main switch Q1 and the second main switch Q2 are off.

In this embodiment of FIG. 19, as in the embodiment of FIG. 17, a voltage of a bulk capacitor C6 can be replaced by a first input voltage Vin1 and a voltage of a bulk capacitor C7 can be replaced by a second input voltage Vin2.

The structure in this case will be described in detail.

A series voltage circuit (first input voltage Vin1 and second input voltage Vin2) formed by series connection of the first input voltage Vin1 and the second input voltage Vin2 is provided.

A positive electrode of the first input voltage Vin1 and a negative electrode of the second input voltage Vin2 are connected with each other.

The first main switch Q1 has its one end (source) connected with the common potential COM, which is one end (negative electrode of first input voltage Vin1) of the series voltage circuit (first input voltage Vin1 and second input voltage Vin2), via the resistor Rsen.

The second main switch Q2 has its one end (drain) connected with the other end (positive electrode of second input voltage Vin2) of the series voltage circuit (first input voltage Vin1 and second input voltage Vin2).

The first series circuit (inductor L2, transformer T1 and first capacitor C51) is formed by series connection of the first magnetic element (inductor L2 and transformer T1) and the first capacitor C51 and has its one end connected with the other end (drain) of the first main switch Q1 and has its other end connected with the potential point Vm, which is the connection point between the first input voltage Vin1 and the second input voltage Vin2.

The first magnetic element (inductor L2 and transformer T1) induces a voltage to be the output Vout by turning on/off of the first main switch Q1 and the second main switch Q2.

The second series circuit (inductor L4, transformer T2 and second capacitor C52) is formed by series connection of the second magnetic element (inductor L4 and transformer T2) and the second capacitor C52 and has its one end connected with the other end (source) of the second main switch Q2 and has its other end connected with the potential point Vm, which is the connection point between the first input voltage Vin1 and the second input voltage Vin2.

The second magnetic element (inductor L4 and transformer T2) induces a voltage to be the output by turning on/off of the first main switch Q1 and the second main switch Q2.

Such a switching power supply has the following characteristic features.

The first diode D3 has its anode connected to the connection point between the first main switch Q1 and the first series circuit (inductor L2, transformer T1 and first capacitor C51) and has its cathode connected to the potential point Vm, which is the connection point between the first input voltage Vin1 and the second input voltage Vin2.

The second diode D4 has its anode connected to the cathode of the first diode D3 and has its cathode connected to the connection point between the second main switch Q2 and the second series circuit (inductor L4, transformer T2 and second capacitor C52).

Moreover, the auxiliary switch Q3 is arranged between the cathode of the second diode D4 and the anode of the first diode D3 and is turned on when both the first main switch Q1 and the second main switch Q2 are off.

In the embodiment of FIG. 19, where the voltage of the bulk capacitor C6 is replaced by the first input voltage Vin1 and the voltage of the bulk capacitor C7 is replaced by the second input voltage Vin2, two converters are connected in series on their primary sides, as in the embodiment of FIG. 11.

That is, the first converter is connected to the first input voltage Vin1 and is thus supplied with power.

The second converter is connected to the second input voltage Vin2 and is thus supplied with power.

The first converter and the second converter are connected in series at the potential point Vm.

Such a switching power supply has the following characteristic features.

The first diode D3 has its anode connected to the connection point between the first main switch Q1 and the first series circuit (inductor L2, transformer T1 and first capacitor C51) and has its cathode connected to the potential point Vm, which is the connection point between the first converter and the second converter.

The second diode D4 has its anode connected to the cathode of the first diode D3 and has its cathode connected to the connection point between the second main switch Q2 and the second series circuit (inductor L4, transformer T2 and second capacitor C52).

Moreover, the auxiliary switch Q3 is arranged between the cathode of the second diode D4 and the anode of the first diode D3 and is turned on when both the first main switch Q1 and the second main switch Q2 are off.

With respect to the operation in the embodiment of FIG. 19 as described above, the charging current and the discharging current flowing through the first diode D3, the second diode D4 and the auxiliary switch Q3 are automatically balanced, as in the embodiment of FIG. 11. The stress on the first magnetic element (inductor L2 and transformer T1) and the second magnetic element (inductor L4 and transformer T2) and the stress on the first main switch Q1, the second main switch Q2 and the like are suitably balanced.

The structure of the embodiment of FIG. 19 will now be applied to the structure of the embodiment of FIG. 16 (not shown).

That is, this switching power supply is applied to the structure in which the first magnetic element (inductor L2 and transformer T1) is connected in series with the first capacitor C51 while the second magnetic element (inductor L4 and transformer T2) is connected in series with the second capacitor C52 and in which the arrangements of the first magnetic element (inductor L2 and transformer T1) and the second magnetic element (inductor L4 and transformer T2) are replaced with each other while the arrangements of the first main switch Q1 and the second main switch Q2 are replaced with each other.

This structure will be described in detail with reference to FIGS. 16 and 19.

A series switch circuit (first main switch Q1 and second main switch Q2) formed by series connection of the first main switch Q1 and the second main switch Q2 is provided.

A first series circuit (inductor L2, transformer T1 and first capacitor C51) is provided which is formed by series connection of the first magnetic element (inductor L2 and transformer T1) and the first capacitor C51 and which has its one end connected with one end (drain of first main switch Q1) of the series switch circuit (first main switch Q1 and second main switch Q2) and has its other end connected with the positive electrode of the input voltage Vin.

The first magnetic element (inductor L2 and transformer T1) induces a voltage to be an output by turning on/off of the first main switch Q1 and the second main switch Q2.

A second series circuit (inductor L4, transformer T2 and second capacitor C52) is provided which is formed by series connection of the second magnetic element (inductor L4 and transformer T2) and the second capacitor C52 and which has its one end connected with the other end (source of second main switch Q2) of the series switch circuit (first main switch Q1 and second main switch Q2) and has its other end connected with the common potential COM, which is the negative electrode of the input voltage Vin, via the resistor Rsen.

The second magnetic element (inductor L4 and transformer T2) induces a voltage to be an output by turning on/off of the first main switch Q1 and the second main switch Q2.

Such a switching power supply has the following characteristic features.

The first diode D3 has its anode connected to the connection point between the drain of the first main switch Q1 and the first series circuit (inductor L2, transformer T1 and first capacitor C51) and has its cathode connected to the potential point Vm, which is the connection point between the first main switch Q1 and the second main switch Q2.

The second diode D4 has its anode connected to the cathode of the first diode D3 and has its cathode connected to the connection point between the source of the second main switch Q2 and the second series circuit (inductor L4, transformer T2 and second capacitor C52).

Moreover, the auxiliary switch Q3 is arranged between the cathode of the second diode D4 and the anode of the first diode D3 and is turned on when both the first main switch Q1 and the second main switch Q2 are off.

In such a structure, the voltage of the bulk capacitor C7 can be replaced by the first input voltage Vin1 and the voltage of the bulk capacitor C6 can be replaced by the second input voltage Vin2.

That is, such a switching power supply has a series voltage circuit (first input voltage Vin1 and second input voltage Vin2) formed by series connection of the first input voltage Vin1 and the second input voltage Vin2.

The positive electrode of the first input voltage Vin1 and the negative electrode of the second input voltage Vin2 are connected at the potential point Vm.

The first main switch Q1 has its one end (source) connected with the potential point Vm, which is the connection point between the first input voltage Vin1 and the second input voltage Vin2.

The second main switch Q2 has its one end (drain) connected with the potential point Vm, which is the connection point between the first input voltage Vin1 and the second input voltage Vin2.

The first magnetic element (inductor L2 and transformer T1) induces a voltage to be an output by turning on/off of the first main switch Q1 and the second main switch Q2.

Then, the first series circuit (inductor L2, transformer T1 and first capacitor C51) is formed by series connection of the first magnetic element (inductor L2 and transformer T1) and the first capacitor C51 and has its one end connected with the other end (drain) of the first main switch Q1 and has its other end connected with one end (positive electrode of first input voltage Vin1) of the series voltage circuit (first input voltage Vin1 and second input voltage Vin2).

The second magnetic element (inductor L4 and transformer T2) induces a voltage to be an output by turning on/off of the first main switch Q1 and the second main switch Q2.

Then, the second series circuit (inductor L4, transformer T2 and second capacitor C52) is formed by series connection of the second magnetic element (inductor L4 and transformer T2) and the second capacitor C52 and has its one end connected with the other end (source) of the second main switch Q2 and has its other end connected with one end (negative electrode of second input voltage Vin2) of the series voltage circuit (first input voltage Vin1 and second input voltage Vin2) via the resistor Rsen.

Such a switching power supply has the following characteristic features.

The first diode D3 has its anode connected to the connection point between the first main switch Q1 and the first series circuit (inductor L2, transformer T1 and first capacitor C51) and has its cathode connected to the potential point Vm, which is the connection point between the first input voltage Vin1 and the second input voltage Vin2.

The second diode D4 has its anode connected to the cathode of the first diode D3 and has its cathode connected to the connection point between the second main switch Q2 and the second series circuit (inductor L4, transformer T2 and second capacitor C52).

Moreover, the auxiliary switch Q3 is arranged between the cathode of the second diode D4 and the anode of the first diode D3 and is turned on when both the first main switch Q1 and the second main switch Q2 are off.

The operation in this case is similar to the operation in the embodiment of FIG. 19.

The stress on the first magnetic element (inductor L2 and transformer T1) and the second magnetic element (inductor L4 and transformer T2) and the stress on the first main switch Q1, the second main switch Q2 and the like are suitably balanced by the action of the first diode D3, the second diode D4 and the auxiliary switch Q3.

Figure 20:
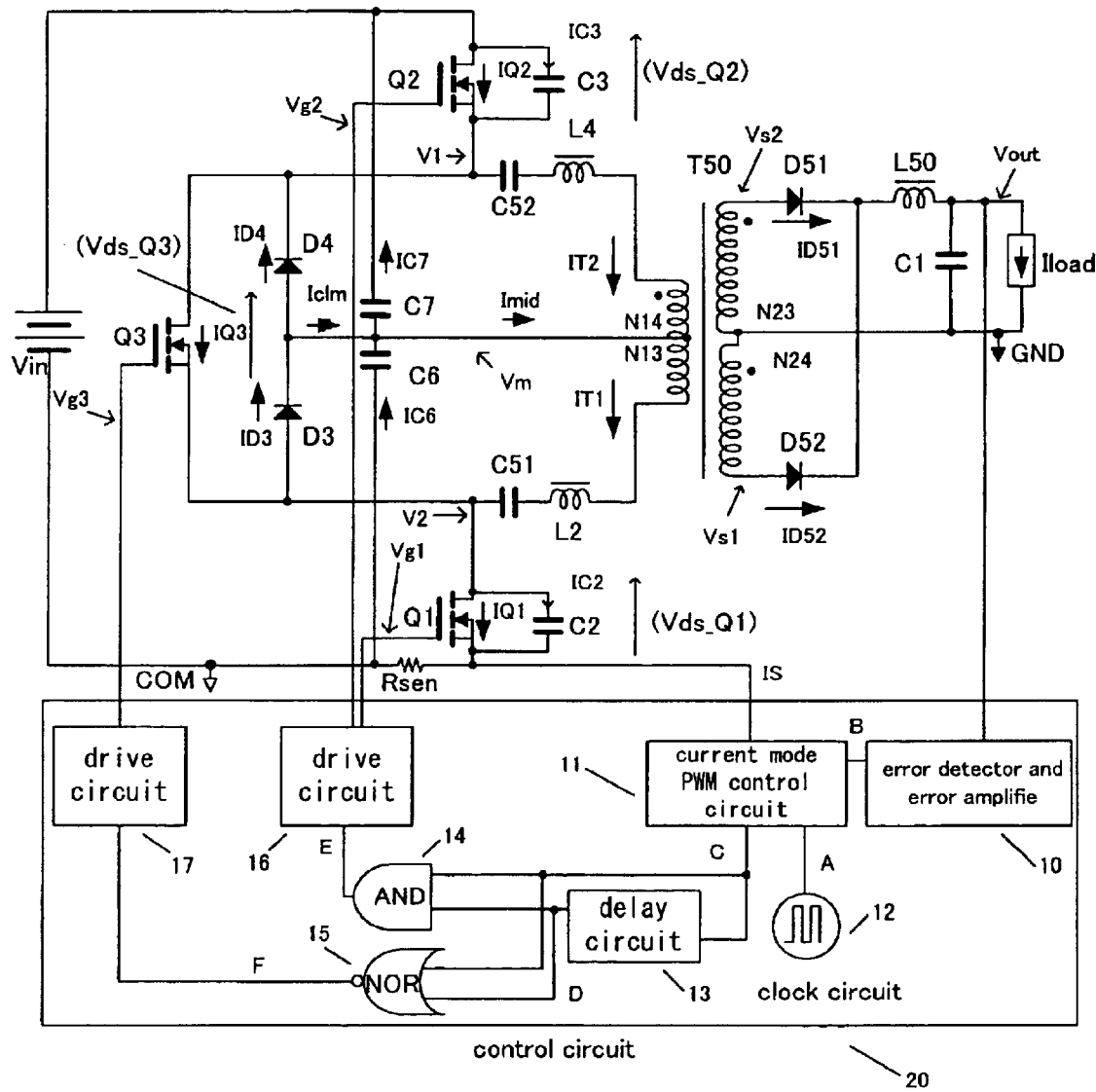
FIG. 20 is a structural view showing a ninth embodiment of this invention.

FIG. 20 is a structural view showing a ninth embodiment of the switching power supply according to this invention. The same elements as those of the embodiment shown in FIG. 6 are denoted by the same symbols and numerals and will not be described further in detail.

A characteristic feature of the embodiment of FIG. 20 is that a center tapped-type output circuit (see FIG. 12E) is formed using one transformer T50.

The structure of essential parts of the embodiment shown in FIG. 20 is substantially the same as the structure of essential parts of the embodiment shown in FIG. 19. What is different will now be described.

An inductor L2 and a first primary winding N13 of the transformer T50 form a first magnetic element (inductor L2 and transformer T50).

An inductor L4 and a second primary winding N14 of the transformer T50 form a second magnetic element (inductor L4 and transformer T50).

The first magnetic element (inductor L2 and transformer T50) and the second magnetic element (inductor L4 and transformer T50) are magnetically coupled and are formed by the integral transformer T50.

Series connection of the first magnetic element (inductor L2 and transformer T50) and a first capacitor C51 forms a first series circuit (inductor L2, transformer T50 and first capacitor C51).

Series connection of the second magnetic element (inductor L4 and transformer T50) and a second capacitor C52 forms a second series circuit (inductor L4, transformer T50 and second capacitor C52).

The structure on the primary side of the transformer T50 in the embodiment of FIG. 20 is similar to the structure on the primary side of the transformer T3 in the embodiment of FIG. 15.

Different features other than those of the essential parts of the embodiment shown in FIG. 20 will now be described.

A secondary winding N23 of the transformer T50 and a secondary winding N24 of the transformer T50 are connected with a diode D51 and a diode D52, respectively, and are further connected with an inductor L50 and a capacitor C1.

The operation in this embodiment of FIG. 20 will be described. A first main switch Q1 and a second main switch Q2 operate synchronously.

Since the structure of the essential parts of the embodiment shown in FIG. 20 is substantially the same as the structure of the essential parts of the embodiment shown in FIG. 19, the operation in the embodiment of FIG. 20 is substantially similar to the operation in the embodiment of FIG. 19 (FIG. 6). However, the operation will now be described again in detail.

Since the operation of a control circuit 20 and the like shown in FIG. 20 is the same as the operation of the control circuit 20 and the like shown in FIG. 6, it will not be described further in detail.

The overall operation in the embodiment of FIG. 20 will be described. FIGS. 21A to 21E show schematic operations in periods 1 to 5'. In FIGS. 21A to 21E, the operating state sequentially shifts from the period 1 to the period 5' and then returns to the period 1 again. This operation is repeated.

Figure 8:
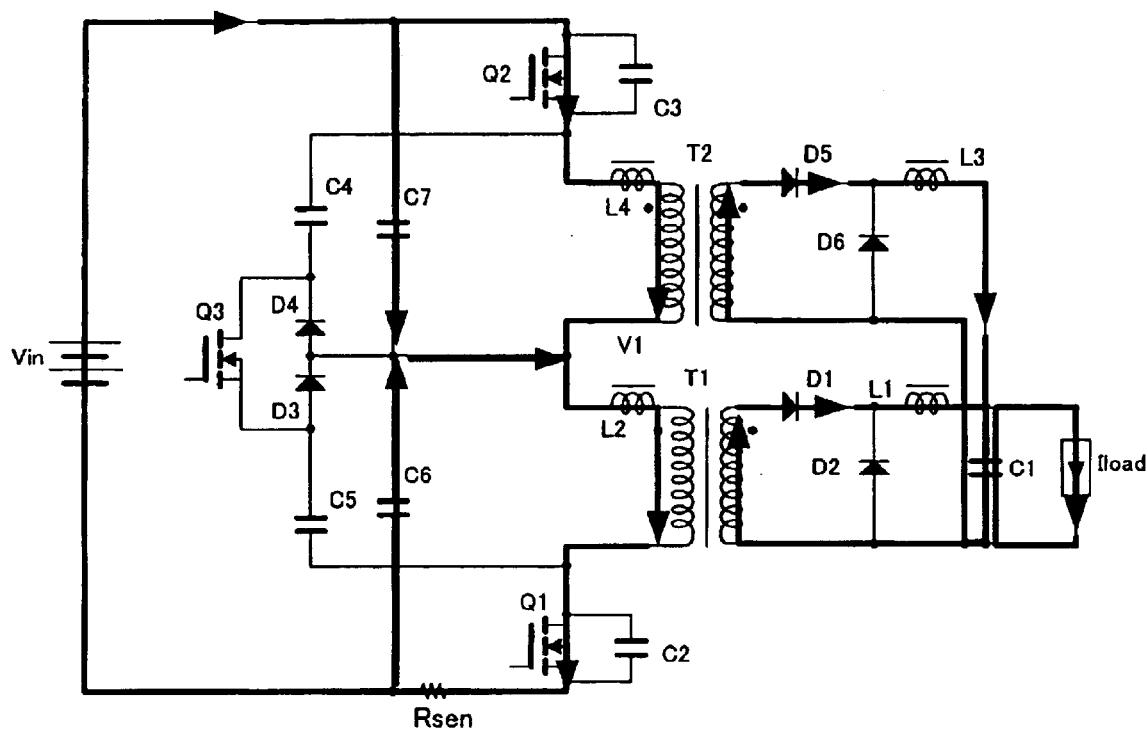
FIGS. 8A to 8G are schematic diagrams showing operations of respective periods in the embodiment of FIG. 6.
Figure 8:
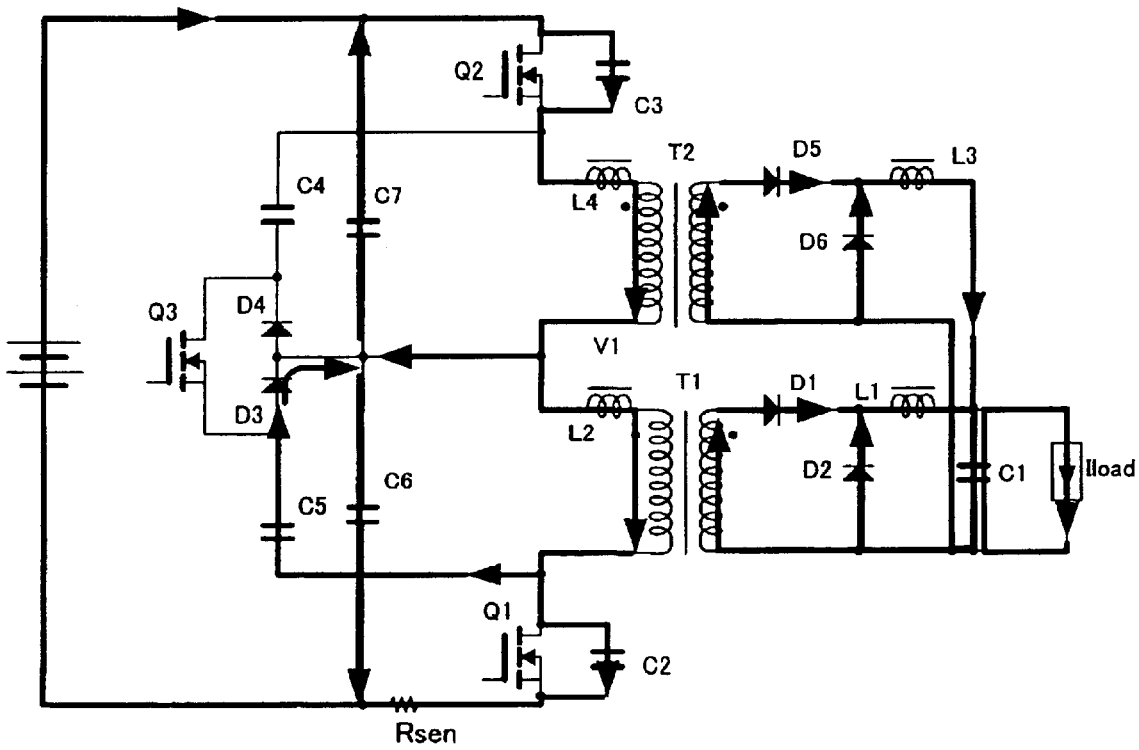
Figure 8C:
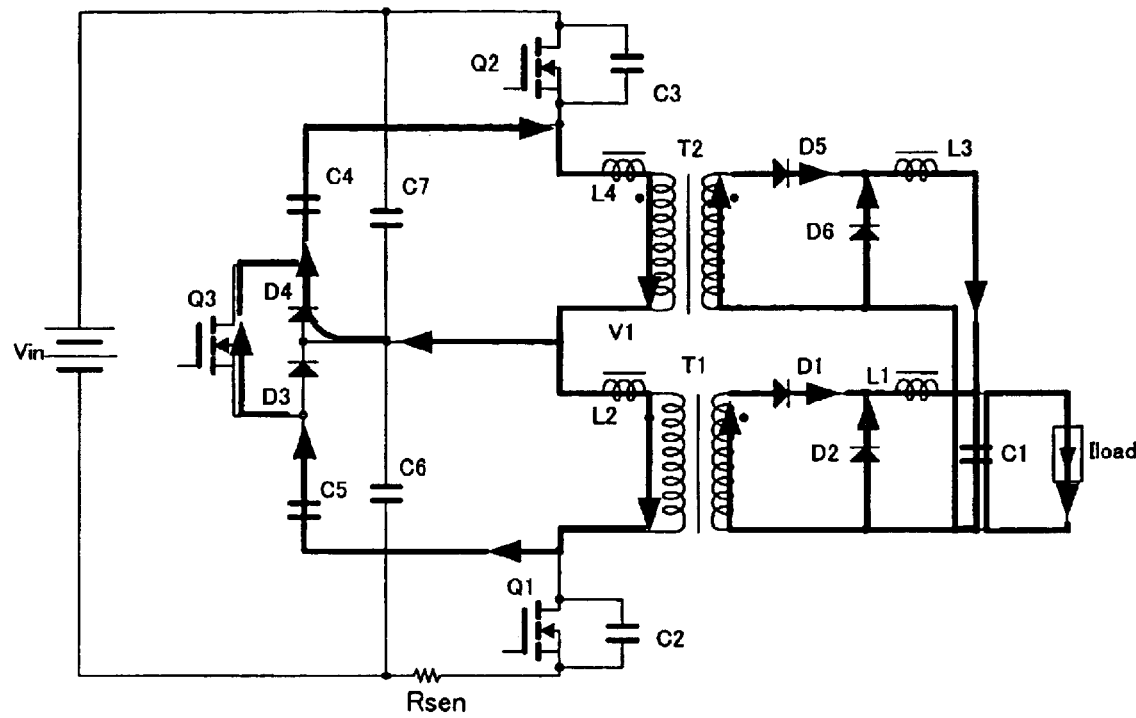
Figure 8D:
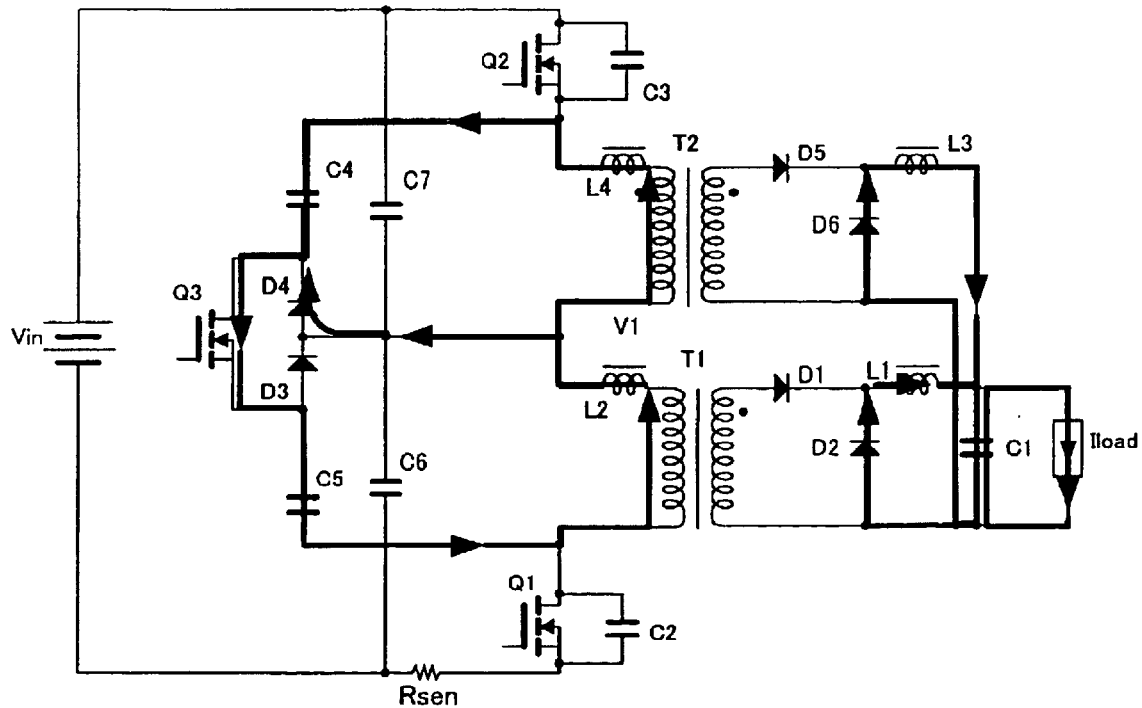
Figure 21:
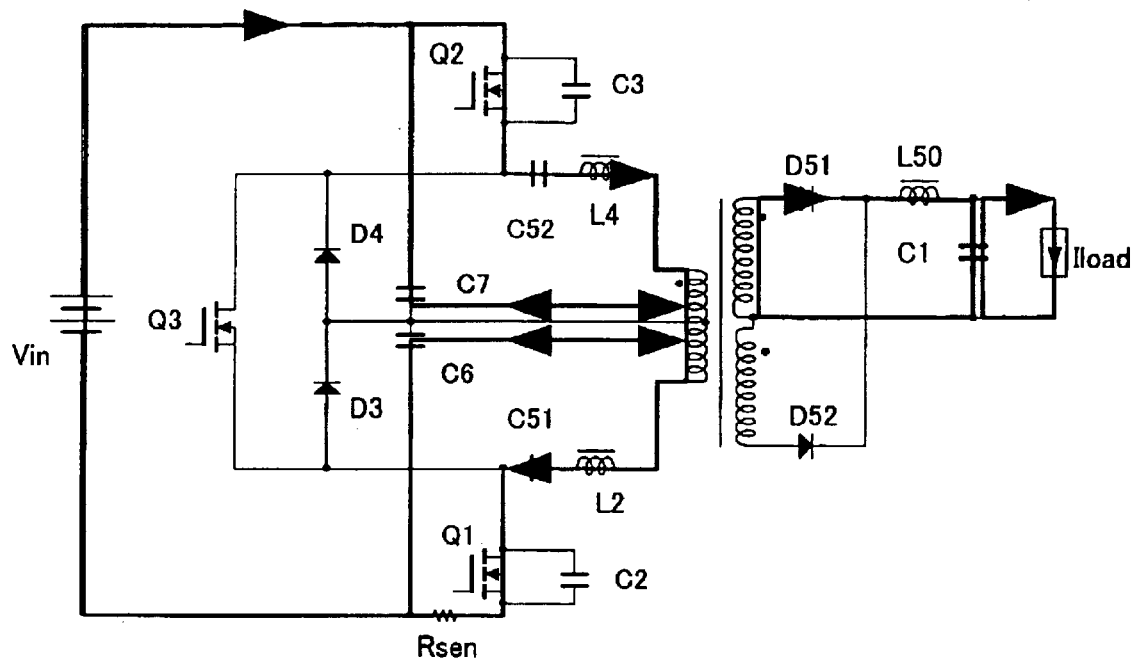
FIGS. 21A to 21E are schematic diagrams showing operations of respective periods in the embodiment of FIG. 20.
Figure 21:
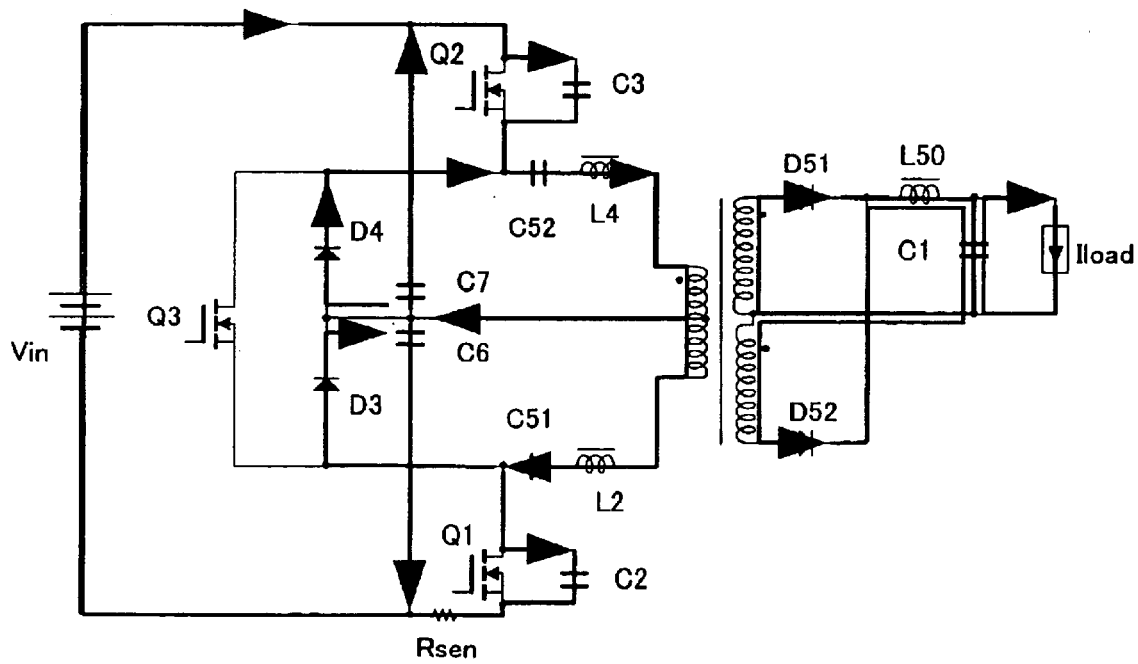
Figure 21:
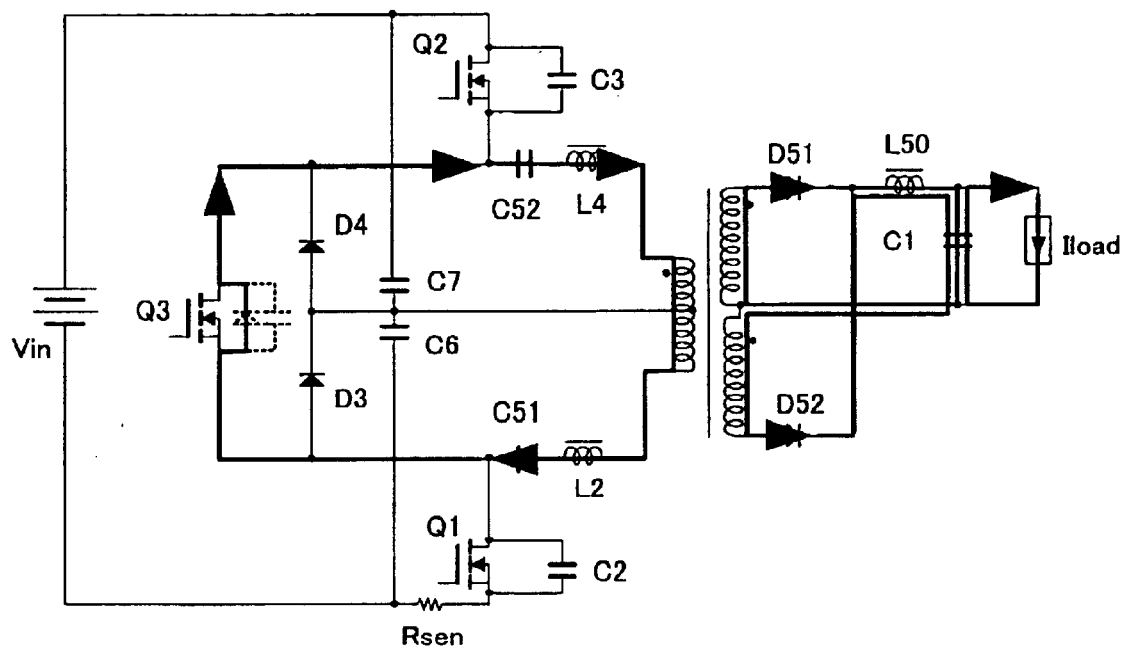
Figure 21:
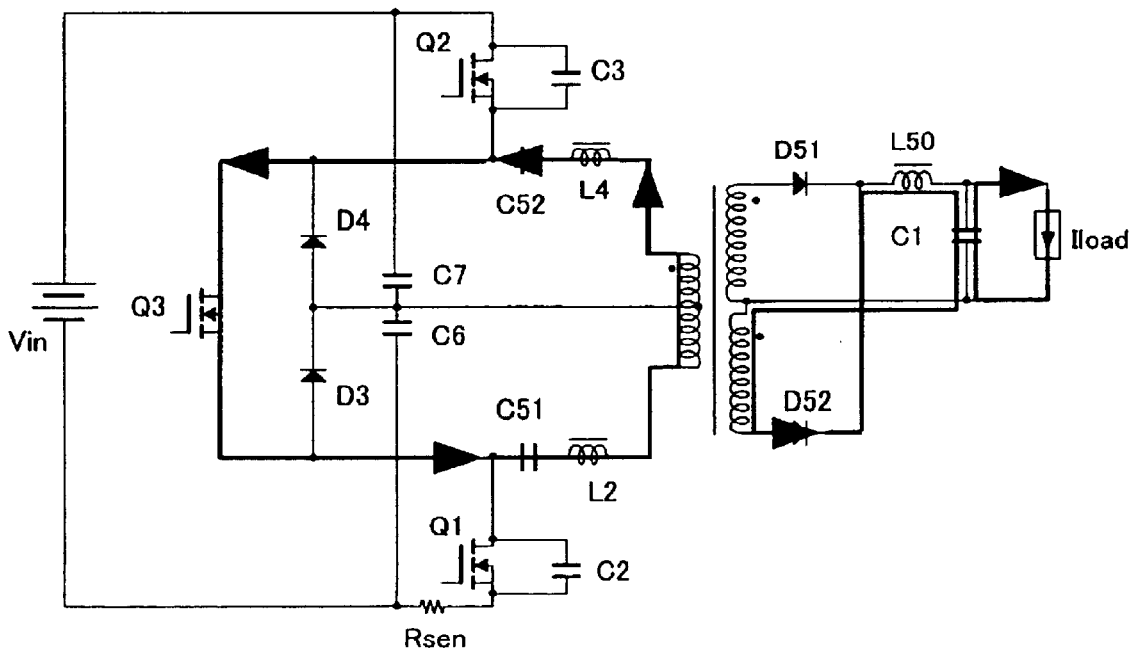
Figure 21:
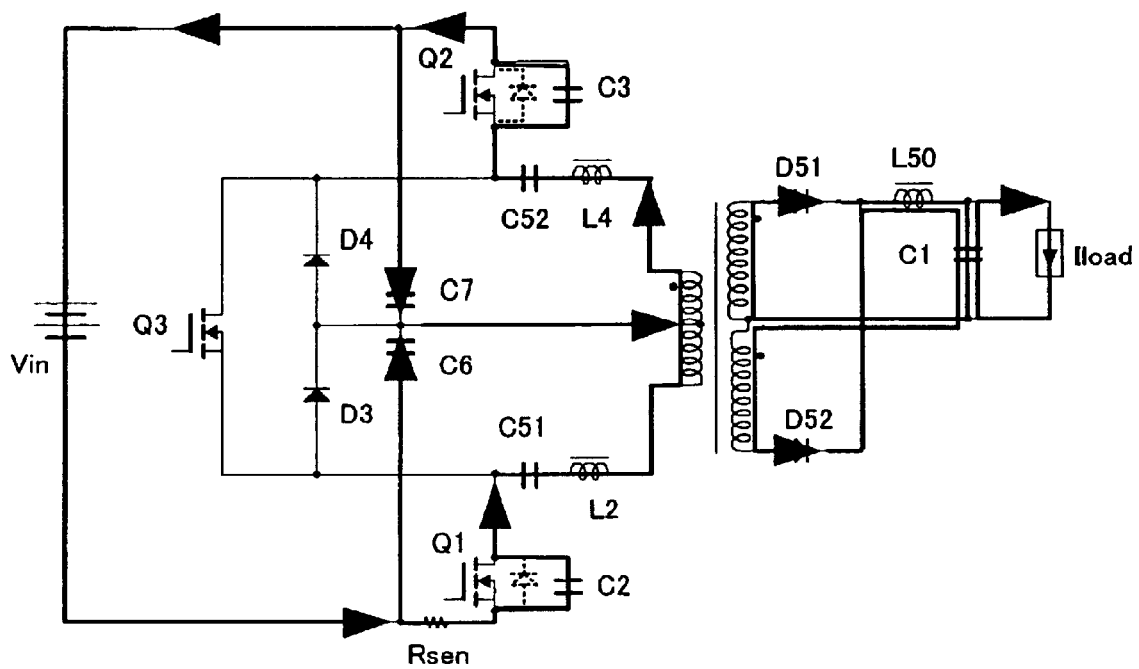

The period 2' shown in FIG. 21B corresponds to a part of the periods 2 and 3 shown in FIGS. 8B and 8C.

Figure 8E:
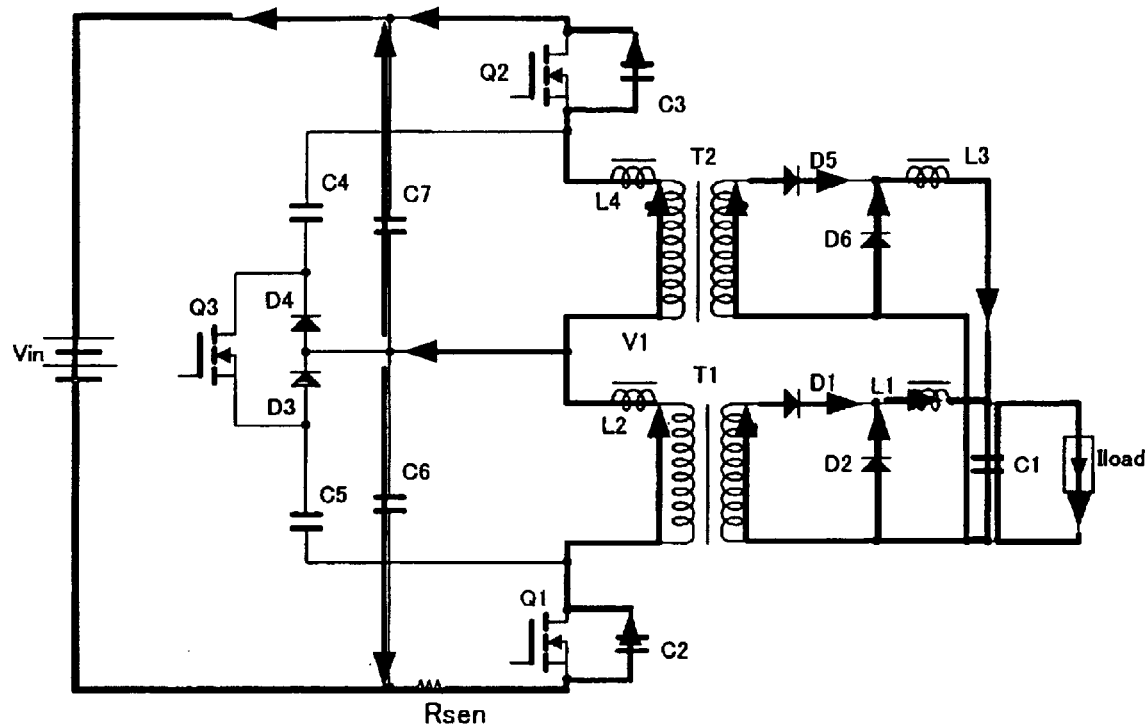
Figure 8F:
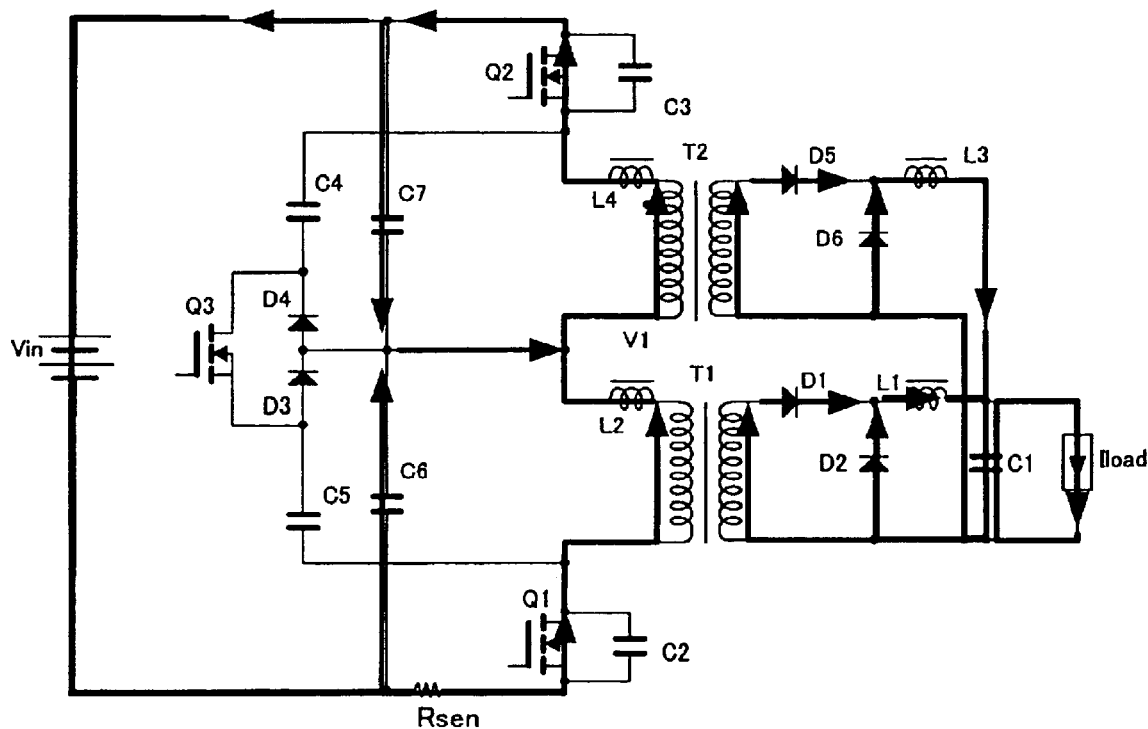
Figure 8G:
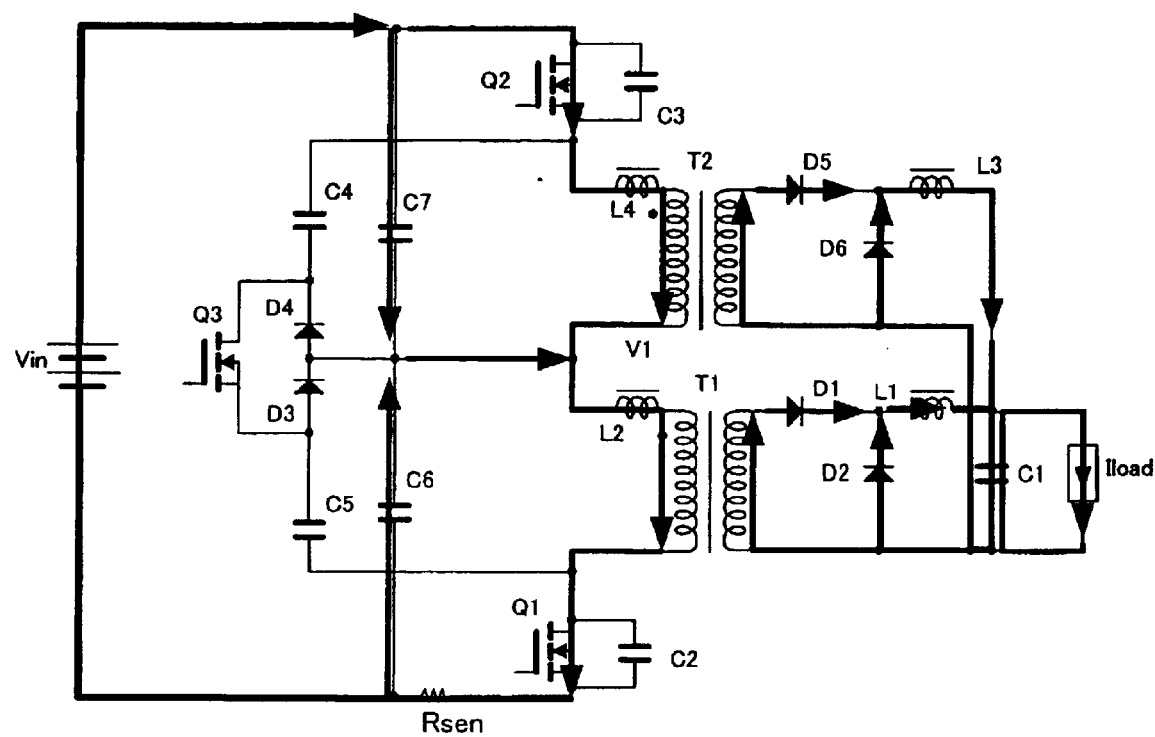

The period 5' shown in FIG. 21E corresponds to the periods 5, 6 and 7 shown in FIGS. 8E, 8F and 8G.

Figure 22:
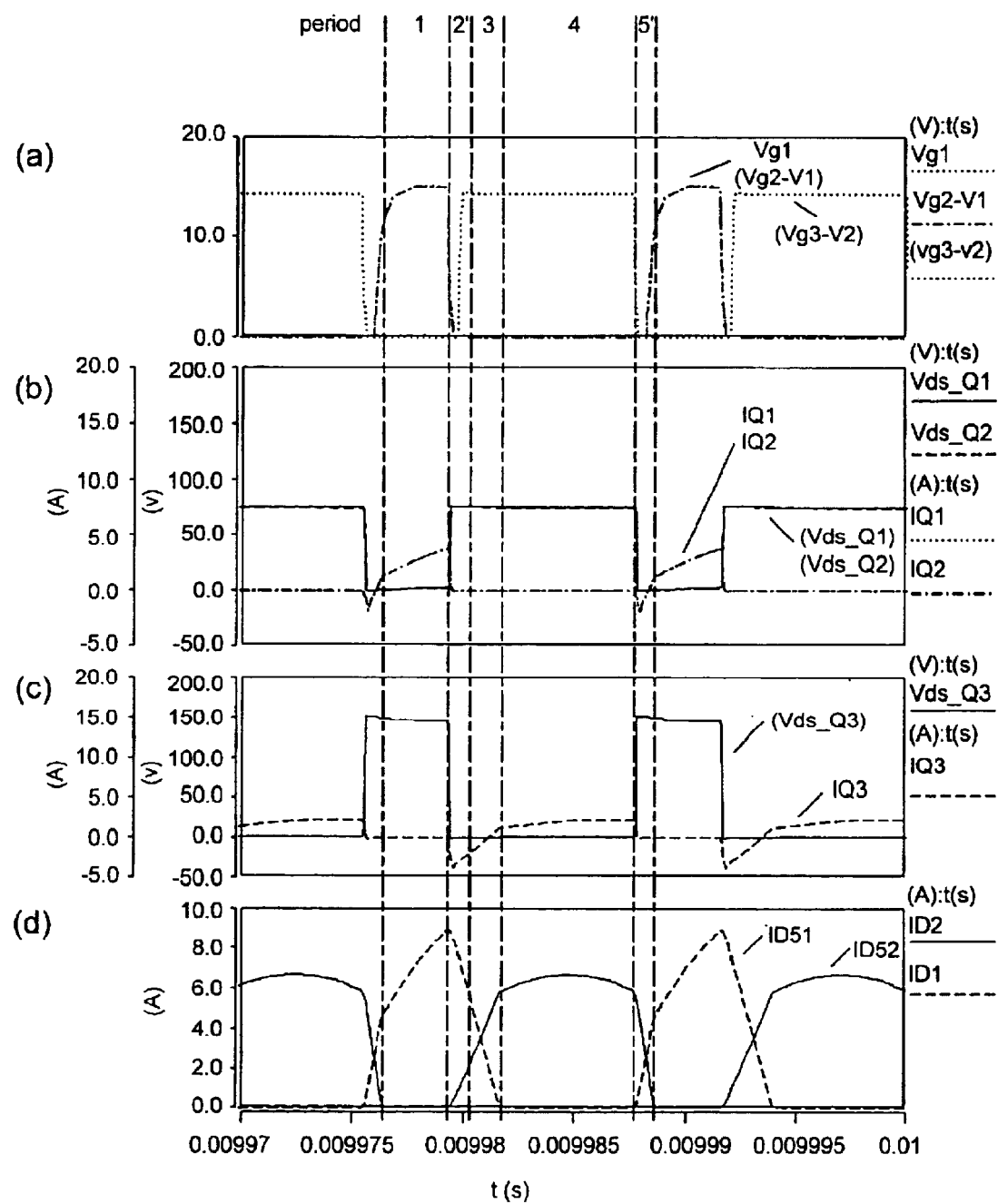
FIG. 22 shows operating waveforms of respective parts in the embodiment of FIG. 20.
Figure 23:
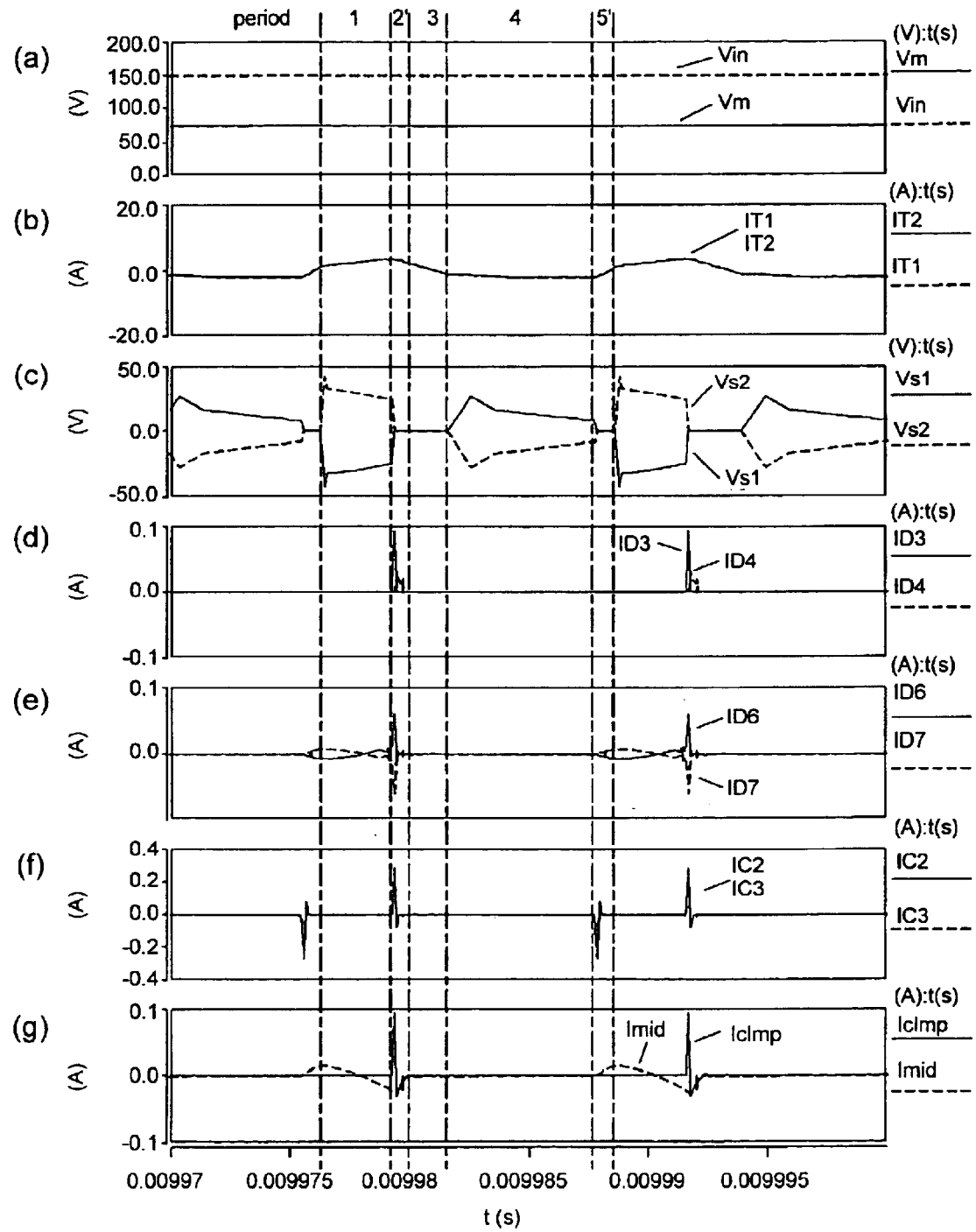
FIG. 23 shows operating waveforms of respective parts in the embodiment of FIG. 20.

FIGS. 22 and 23 show operating waveforms of the respective parts in the embodiment of FIG. 20.

In (a) of FIG. 22, Vg1 is a driving signal for the first main switch Q1. (Vg3-V2) is a driving signal for an auxiliary switch Q3. (Vg2-V1) is a driving signal for the second main switch Q2.

As seen from (a) of FIG. 22, the driving signal Vg1 and the driving signal (Vg2-V1) are substantially equal. The driving signal Vg1 and the driving signal (Vg2-V1), and the driving signal (Vg3-V2) are complementary.

In (b) of FIG. 22, a voltage (Vds_Q1) is a voltage between the drain and source of the first main switch Q1. A voltage (Vds_Q2) is a voltage between the drain and source of the second main switch Q2. A current IQ1 is a drain current of the first main switch Q1. A current IQ2 is a drain current of the second main switch Q2.

As seen from (b) of FIG. 22, the voltage (Vds_Q1) and the voltage (Vds_Q2) are substantially equal. The current IQ1 and the current IQ2 are substantially equal.

There is a period when the current IQ1 and the current IQ2 flow in the backward direction.

In (c) of FIG. 22, a voltage (Vds_Q3) is a voltage between the drain and source of the auxiliary switch Q3. A current IQ3 is a drain current of the auxiliary switch Q3.

There is a period when the current IQ3 flows in the backward direction.

In (d) of FIG. 22, a current ID51 is a current of the diode D51. A current ID52 is a current of the diode D52.

In (a) of FIG. 23, a voltage Vm represents a potential point Vm. A voltage Vin is an input voltage Vin.

The potential point Vm is a connection point between the first series circuit (inductor L2, transformer T50 and first capacitor C51) and the second series circuit (inductor L4, transformer T50 and second capacitor C52). The potential point Vm is connected with a cathode of a first diode D3, an anode of a second diode D4, a bulk capacitor C6 and a bulk capacitor C7.

As seen from (a) of FIG. 23, the voltage Vm is approximately half the voltage Vin and is constant.

In (b) of FIG. 23, a current IT1 is a current flowing through the first series circuit (inductor L2, transformer T50 and first capacitor C51). A current IT2 is a current flowing through the second series circuit (inductor L4, transformer T50 and second capacitor C52).

As seen from (b) of FIG. 23, the current IT1 and the current IT2 are substantially equal.

In (c) of FIG. 23, a voltage Vs1 is a voltage generated in the secondary winding N24 of the transformer T50. A voltage Vs2 is a voltage generated in the secondary winding N23 of the transformer T50.

As seen from (c) of FIG. 23, the voltage Vs1 and the voltage Vs2 are complementary. This is because the polarity of the secondary winding N24 of the transformer T50 and the polarity of the secondary winding N23 of the transformer T50 are complementary.

In (d) of FIG. 23, a current ID3 is a current of the first diode D3 and a current ID4 is a current of the second diode D4.

In (e) of FIG. 23, a current IC6 is a current of the bulk capacitor C6 and a current IC7 is a current of the bulk capacitor C7.

In (f) of FIG. 23, a current IC2 is a current of a capacitor C2 and a current IC3 is a current of a capacitor C3.

In (g) of FIG. 23, a current Imid is a current flowing from the connection point between the bulk capacitor C6 and the bulk capacitor C7 to the connection point between the first series circuit (inductor L2, transformer T50 and first capacitor C51) and the second series circuit (inductor L4, transformer T50 and second capacitor C52).

As seen from (g) of FIG. 23, a current Iclmp is a current flowing from the connection point between the cathode of the first diode D3 and the anode of the second diode D4 to the connection point between the bulk capacitor C6 and the bulk capacitor C7.

Hereinafter, the periods 1 to 5' will be sequentially described with reference to FIGS. 21A to 21E, FIG. 22 and FIG. 23.

In the period 1, the first main switch Q1 is on and the second main switch Q2 is on. The auxiliary switch Q3 is off. The diode D51 is on and the diode D52 are off. Both the first diode D3 and the second diode D4 are off.

In this case, the current IQ1, the current IQ2, the current IT1 and the current IT2 flow. Then, as both the first main switch Q1 and the second main switch Q2 are turned off, the period 1 ends and shifts to the period 2'.

In the period 2', the first main switch Q1 is off and the second main switch Q2 is off. The auxiliary switch Q3 is on (with its channel being off) as its body diode is biased in the forward direction. The diode D51 and the diode D52 are on. The first diode D3 and the second diode D4 are on.

In this case, the current ID3 flows and the current IC2 flows. The voltage (Vds_Q1) rises to a predetermined voltage. Also the current ID4 flows and the current IC3 flows. The voltage (Vds_Q2) rises to a predetermined voltage. The voltage (Vds_Q3) falls. Then, the charging of the capacitor C2 and the capacitor C3 is completed and the current of the capacitor C2 and the capacitor C3 becomes zero.

As the current of the first diode D3 and the second diode D4 becomes almost zero, the period 2' ends and shifts to the period 3.

When the auxiliary switch Q3 is on as its body diode is biased in the forward direction, the auxiliary switch Q3 is provided with the driving signal (Vg3-V2) for turning on the channel and it is turned on with a low loss.

In the period 3, the first main switch Q1 is off and the second main switch Q2 is off. The auxiliary switch Q3 is on. The diode D51 and the diode D52 are on.

In this case, the current IT1 and the current IT2 decrease. The current ID51 decreases and the current ID52 increases. The current IQ3 for resetting the inductor L2 and the inductor L4 flows. Then, as the current ID51 becomes zero, the period 3 ends and shifts to the period 4.

In the period 4, the first main switch Q1 is off and the second main switch Q2 is off. The auxiliary switch Q3 is on. The diode D51 is off and the diode D52 is on.

In this case, the current IQ3 for resetting the magnetizing inductance of the transformer T50 flows. Then, as the auxiliary switch Q3 is turned off, the period 4 ends and shifts to the period 5'.

At the beginning of the period 5', the first main switch Q1 is off and the second main switch Q2 is off. The auxiliary switch Q3 is off. The diode D51 and the diode D52 are on.

In this case, the current IC2 flows and the voltage (Vds_Q1) falls. The current IC3 flows and the voltage (Vds_Q2) falls. Then, the discharging of the capacitor C2 and the capacitor C3 is completed and the voltage (Vds_Q1) and the voltage (Vds_Q2) become zero.

Moreover, the first main switch Q1 is turned on (with its channel being off) as its body diode is biased in the forward direction. The second main switch Q2 is turned on (with its channel being off) as its body diode is biased in the forward direction.

In this case, the current IQ1 and the current IQ2 flow in the backward direction. During such a period, that is, when these switches are on as their body diodes are biased in the forward direction, the first main switch Q1 and the second main switch Q2 are provided with the driving signal Vg1 and the driving signal (Vg2-V1) for turning on their channels, and the channels are thus turned on with a low loss.

Then, the current IQ1 and the current IQ2 become zero. The first main switch Q1 is on and the second main switch Q2 is on.

The current ID52 decreases and the current IQ51 increases.

Then, as the current ID52 becomes zero, the period 5' ends and shifts to the period 1.

The voltages induced at the secondary winding N23 of the transformer T50 and the secondary winding N24 of the transformer T50 are rectified by the diodes 51 and the diode D52 and smoothed by the inductor L50 and the capacitor C1, thus becoming an output voltage Vout, which supplies power to a load load.

In the embodiment of FIG. 20, the input voltage Vin is thus converted to the output voltage Vout.

The operation in the period when the first main switch Q1 is off and the second main switch Q2 is off will now be described.

The charging current of the first capacitor C51 flows through a circuit formed by the first diode D3, the first magnetic element (inductor L2 and transformer T50) and the first capacitor C51, and a circuit formed by the first diode D3, the second diode D4, the second capacitor C52, the second magnetic element (inductor L4 and transformer T50), the first magnetic element (inductor L2 and transformer T50) and the first capacitor C51.

The discharging current of the first capacitor C51 flows through a circuit formed by the auxiliary switch Q3, the second capacitor C52, the second magnetic element (inductor L4 and transformer T50), the first magnetic element (inductor L2 and transformer T50) and the first capacitor C51.

The charging current of the second capacitor C52 flows through a circuit formed by the second magnetic element (inductor L4 and transformer T50), the second diode D4 and the second capacitor C52, and a circuit formed by the second magnetic element (inductor L4 and transformer T50), the first magnetic element (inductor L2 and transformer T50), the first capacitor C51, the first diode D3, the second diode D4 and the second capacitor C52.

The discharging current of the second capacitor C52 flows through a circuit formed by the auxiliary switch Q3, the first capacitor C51, the first magnetic element (inductor L2 and transformer T50), the second magnetic element (inductor L4 and transformer T50) and the second capacitor C52.

Therefore, the charging paths and discharging paths of the first capacitor C51 and the second capacitor C52 are not coincident with each other.

Such charging currents and discharging currents automatically balance the stress on the first magnetic element (inductor L2 and transformer T50) and the second magnetic element (inductor L4 and transformer T50) and the stress on the first main switch Q1 and the second main switch Q2, and thus suitably stabilize the operation, as in the embodiment of FIG. 6.

In this manner, in the embodiment of this invention shown in FIG. 20, the influence of the parasitic elements of the circuit and the resistor Rsen is restrained and preferred characteristics can be realized.

The potential point Vm thus becomes stable at about half the value of the input voltage Vin, and the stress on the first main switch Q1 and the second main switch Q2 is suitably balanced.

Figure 24:
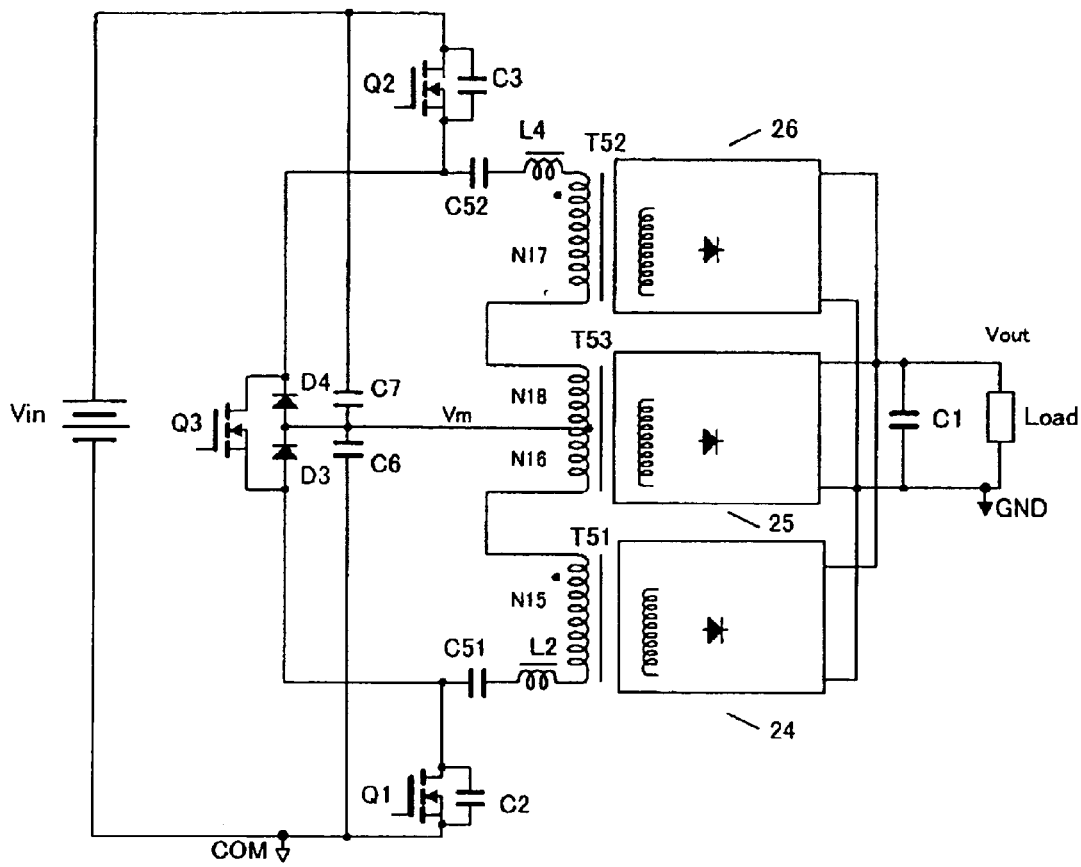
FIG. 24 is a structural view showing a tenth embodiment of this invention.

FIG. 24 is a structural view showing a tenth embodiment of the switching power supply according to this invention. The same elements as those of the embodiment shown in FIG. 19 are denoted by the same symbols and numerals and will not be described further in detail.

A characteristic feature of the embodiment of FIG. 24 is that a first magnetic element and a second magnetic element are formed using three transformers T51, T52 and T53.

In this embodiment of FIG. 24, the transformer T51, the transformer T52 and the transformer T53 share a load. Therefore, this embodiment is suitable for an application with a large load.

This embodiment is also suitable for an application where the whole switching power supply is reduced in thickness by reducing the thickness of the transformer T51, the transformer T52 and he transformer T53.

The structure of essential parts of the embodiment shown in FIG. 24 is substantially the same as the structure of essential parts of the embodiment shown in FIG. 19. What is different will now be described.

An inductor L2, a primary winding N15 of the transformer T51 and a primary winding N16 of the transformer T53 form a first magnetic element (inductor L2, transformer T51 and transformer T53).

An inductor L4, a primary winding N17 of the transformer T52 and a primary winding N18 of the transformer T53 form a second magnetic element (inductor L4, transformer T52 and transformer T53).

Specifically, the inductor L2, the primary winding N15 of the transformer T51 and the primary winding N16 of the transformer T53 are connected in series. The inductor L4, the primary winding N17 of the transformer T52 and the primary winding N18 of the transformer T53 are connected in series.

The first magnetic element (inductor L2, transformer T51 and transformer T53) and the second magnetic element (inductor L4, transformer T52 and transformer T53) are magnetically coupled and include the integral transformer T53.

Series connection of the first magnetic element (inductor L2, transformer T51 and transformer T53) and a first capacitor C51 forms a first series circuit (inductor L2, transformer T51, transformer T53 and first capacitor C51).

Series connection of the second magnetic element (inductor L4, transformer T52 and transformer T53) and a second capacitor C52 forms a second series circuit (inductor L4, transformer T52, transformer T53 and second capacitor C52).

The transformer T51 has an output circuit 24, which is a secondary winding and a rectifying and smoothing circuit. The transformer T52 has an output circuit 26, which is a secondary winding and a rectifying and smoothing circuit. The transformer T53 has an output circuit 25, which is a secondary winding and a rectifying and smoothing circuit.

The output circuit 24, the output circuit 25 and the output circuit 26 are similar to the output circuit 21 and the output circuit 22 in the embodiment of FIG. 11.

In the embodiment of FIG. 24, the resistor Rsen in the embodiment of FIG. 19 is not provided.

The structure of the transformer T53 will now be described in detail. The first primary winding N16 has its one end connected to the other end (drain) of a first main switch Q1 via the transformer T51, the inductor L2 and the first capacitor C51. The second primary winding N18 has its one end connected to the other end (source) of a second main switch Q2 via the transformer T52, the inductor L4 and the second capacitor C52. The other end of the second primary winding N18 is connected to the other end of the first primary winding N16.

A first diode D3 has its cathode connected to a connection point between the first primary winding N16 and the second primary winding N18. That is, the cathode of the first diode D3 is connected to a connection point between the first series circuit (inductor L2, transformer T51, transformer T53 and first capacitor C51) and the second series circuit (inductor L4, transformer T52, transformer T53 and second capacitor C52).

The operation in this embodiment of FIG. 24 is similar to the operation in the embodiment of FIG. 19.

The stress on the first main switch Q1, the second main switch Q2 and the like is suitably balanced by the action of the first diode D3, a second diode D4 and an auxiliary switch Q3.

While three transformers are used in the above-described embodiment, plural transformers such as four or five transformers may be used. The operation is similar to the operation in this embodiment.

Figure 25:
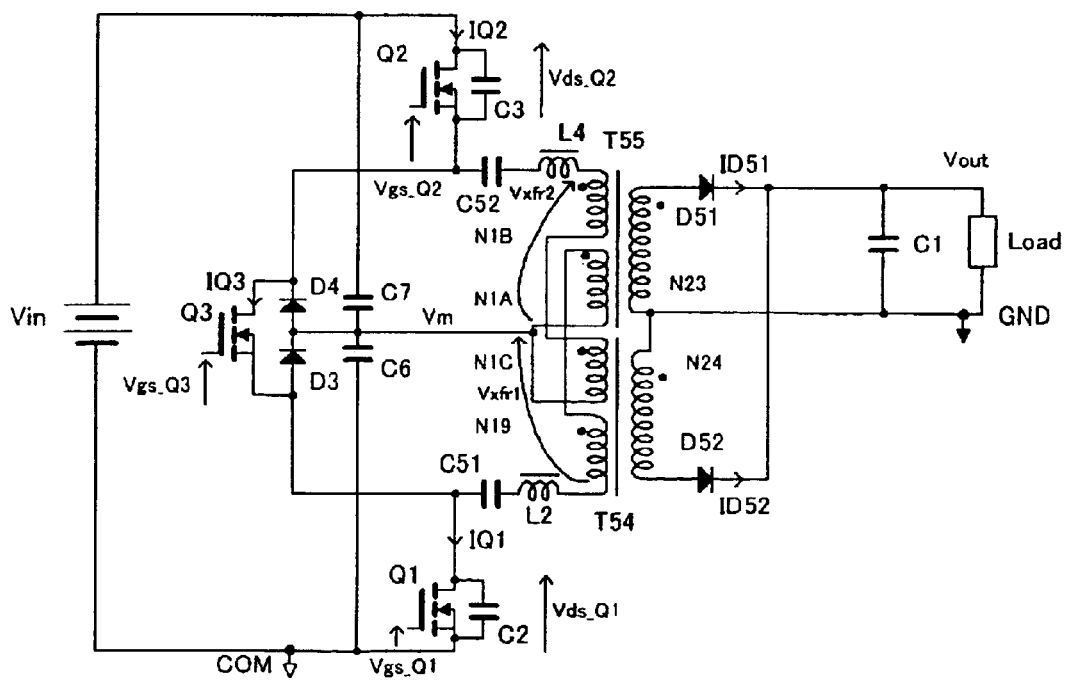
FIG. 25 is a structural view showing an eleventh embodiment of this invention.

FIG. 25 is a structural view showing an eleventh embodiment of the switching power supply according to this invention. The same elements as those of the embodiment shown in FIG. 19 are denoted by the same symbols and numerals and will not be described further in detail.

A characteristic feature of the embodiment of FIG. 25 is that arrangement is made so that a current on the primary side of a transformer T54 and a current on the primary side of a transformer T55 become equal.

In this embodiment of FIG. 25, sharing of a load by the transformer T54 and the transformer T55 is balanced more suitably. Therefore, this embodiment is preferable.

Moreover, this embodiment is suitable for an application where the whole switching power supply is reduced in thickness by reducing the thickness of the transformers T54 and the transformer T55.

The structure of essential parts of the embodiment shown in FIG. 25 is substantially the same as the structure of essential parts of the embodiment shown in FIG. 19. What is different will now be described.

An inductor L2, a first primary winding N19 of the transformer T54 and a first primary winding N1A of the transformer T55 form a first magnetic element (inductor L2, transformer T54 and transformer T55).

An inductor L4, a second primary winding N1B of the transformer T55 and a second primary winding N1C of the transformer T54 form a second magnetic element (inductor L4, transformer T54 and transformer T55).

Specifically, the inductor L2, the first primary winding N19 of the transformer T54 and the first primary winding N1A of the transformer T55 are connected in series. The inductor L4, the second primary winding N1B of the transformer T55 and the second primary winding N1C of the transformer T54 are connected in series.

The first magnetic element (inductor L2, transformer T54 and transformer T55) and the second magnetic element (inductor L4, transformer T54 and transformer T55) are magnetically coupled and include the integral transformers T54 and T55.

Series connection of the first magnetic element (inductor L2, transformer T54 and transformer T55) and a first capacitor C51 forms a first series circuit (inductor L2, transformer T54, transformer T55 and first capacitor C51).

Series connection of the second magnetic element (inductor L4, transformer T54 and transformer T55) and a second capacitor C52 forms a second series circuit (inductor L4, transformer T54, transformer T55 and second capacitor C52).

A secondary winding N24 of the transformer T54 is connected to a diode D52 in the form of flyback type (see FIG. 12B) and is further connected to a capacitor C1.

A secondary winding N23 of the transformer T55 is connected to a diode D51 in the form of non-flyback type (reverse connection of FIG. 12B) and is further connected to the capacitor C1.

Therefore, the diode D51 and the diode D52 operate in the opposite phases.

The structure of the transformer T54 and the transformer T55 will now be described in detail.

The first primary winding N19 and the first primary winding N1A have their one ends connected to the other end (drain) of a first main switch Q1 via the inductor L2 and the first capacitor C51. The second primary winding N1B and the second primary winding N1C have their one ends connected to the other end (source) of a second main switch Q2 via the inductor L4 and the second capacitor C52. The other ends of the second primary winding N1B and the second primary winding N1C are connected to the other ends of the first primary winding N19 and the first primary winding N1A.

A first diode D3 has its anode connected to a connection point between the first main switch Q1 and the first capacitor C51. A second diode D4 has its cathode connected to a connection point between the second main switch Q2 and the second capacitor C52.

The first diode D3 has its cathode connected to a connection point between the first primary winding N19 and the first primary winding N1A, and the second primary winding N1B and the second primary winding N1C. That is, the cathode of the first diode D3 is connected to a connection point between the first series circuit (inductor L2, transformer T54, transformer T55 and first capacitor C51) and the second series circuit (inductor L4, transformer T54, transformer T55 and second capacitor C52).

The transformer T54 has the first primary winding N19 and the second primary winding N1C. The transformer T54 induces a voltage to be an output by turning on/off of the first main switch Q1 and the second main switch Q2 and generates an output voltage Vout via the diode D52 and the capacitor C1.

The transformer T55 has the first primary winding N1A and the second primary winding N1B. The transformer T55 induces a voltage to be an output by turning on/off of the first main switch Q1 and the second main switch Q2 and generates the output voltage Vout via the diode D51 and the capacitor C1.

The operation in this embodiment of FIG. 25 is similar to the operation in the embodiment of FIG. 19.

The stress on the first main switch Q1, the second main switch Q2 and the like is suitably balanced by the action of the first diode D3, the second diode D4 and an auxiliary switch Q3.

The same current flows through the first primary winding N19 of the transformer T54 and the first primary winding N1A of the transformer T55. The same current flows through the second primary winding N1B of the transformer T55 and the second primary winding N1C of the transformer T54. Therefore, a change of magnetic flux in the transformer T54 and a change of magnetic flux in the transformer T55 are balanced.

Figure 26:
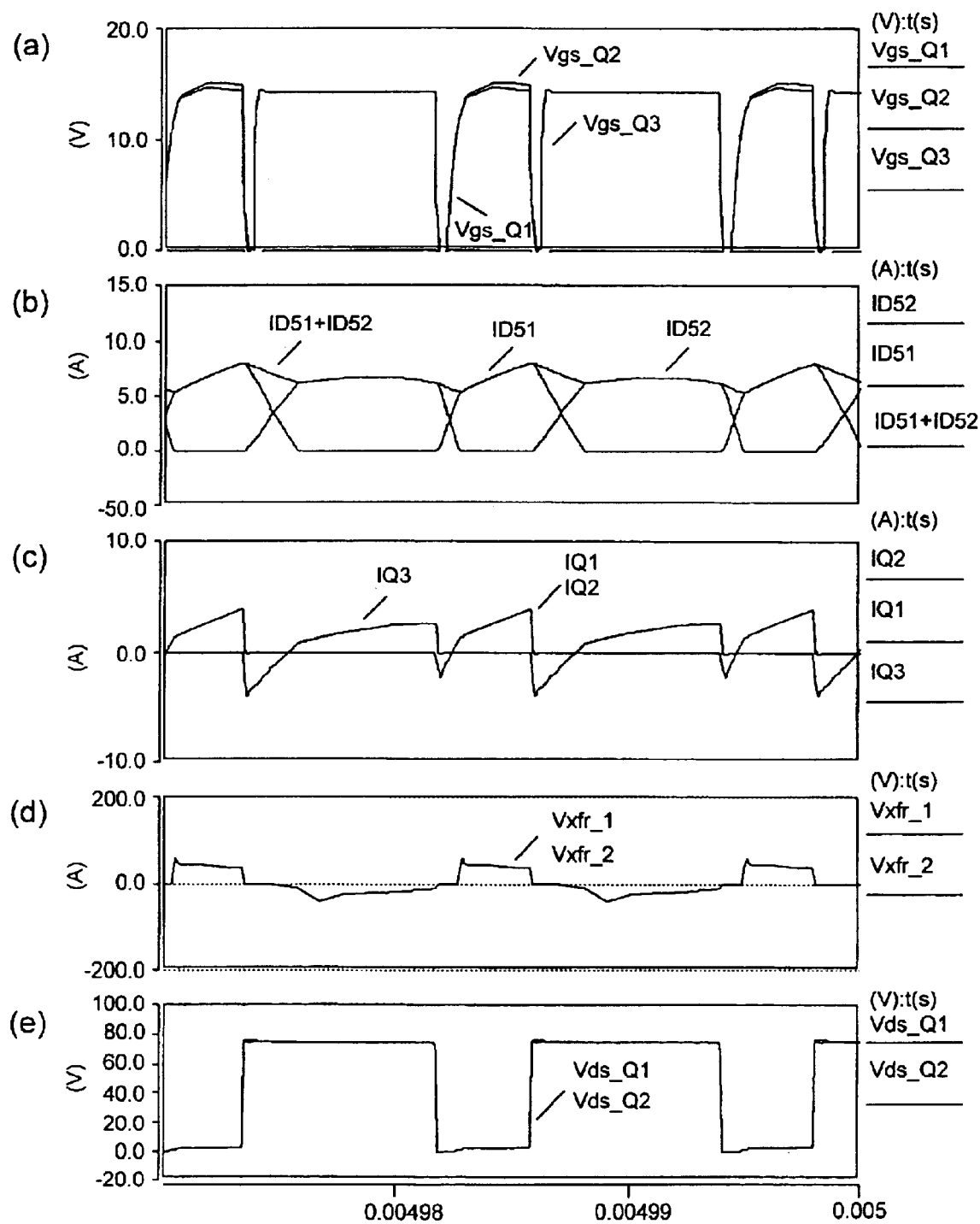
FIG. 26 shows operating waveforms of respective parts in the embodiment of FIG. 25.

FIG. 26 shows operating waveforms of the respective parts in the embodiment of FIG. 25. The operation in the embodiment of FIG. 25 will now be described with reference to FIG. 26.

In (a) of FIG. 26, a voltage (Vgs_Q1) is a driving signal for the first main switch Q1. A voltage (Vgs_Q2) is a driving signal for the second main switch Q2. A voltage (Vgs_Q3) is a driving signal for the auxiliary switch Q3.

In (b) of FIG. 26, a current ID51 is a current of the diode D51. A current ID52 is a current of the diode D52. A current (ID51+ID52) is the sum of the current ID51 and the current ID52.

In (c) of FIG. 26, a current IQ1 is a current of the first main switch Q1. A current IQ2 is a current of the second main switch Q2. A current IQ3 is a current of the auxiliary switch Q3.

In (d) of FIG. 26, a voltage Vxfr_1 is a voltage generated in the first primary winding N19 and the first primary winding N1A. A voltage Vxfr_2 is a voltage generated in the second primary winding N1B and the second primary winding N1C.

In (e) of FIG. 26, a voltage Vds_Q1 is a voltage of the first main switch Q1 and a voltage Vds_Q2 is a voltage of the second main switch Q2.

When the first main switch Q1 and the second main switch Q2 are on and the auxiliary switch Q3 is off, the diode D51 is on and the diode D52 is off. In this case, the impedance of the first primary winding N1A and the second primary winding N1B falls but the impedance of the first primary winding N19 and the second primary winding N1C rises, thus restraining rise of the current IQ1.

On the other hand, when the first main switch Q1 and the second main switch Q2 are off and the auxiliary switch Q3 is on, the diode D51 is off and the diode D52 is on. In this case, the impedance of the first primary winding N19 and the second primary winding N1C falls but the impedance of the first primary winding N1A and the second primary winding N1B rises, thus restraining rise of the current IQ2.

In this manner, a preferable characteristic is provided that the current IQ1 and the current IQ2 have low peak values. Another preferable characteristic is provided that the voltage Vxfr_1 and the voltage Vxfr_2 are substantially coincident with each other while the voltage Vds_Q1 and the voltage Vds_Q2 are substantially coincident with each other. Still another preferable characteristic is provided that the current (ID51+ID52) has a small ripple. Therefore, the capacitor C1 can be miniaturized.

Moreover, in the embodiment of FIG. 25, when the transformer T54 and the transformer T55 are reduced in size and height, a preferable characteristic is provided. High output, low cost and high reliability can be achieved.

Furthermore, while the diode D51 and the diode D52 are connected to the capacitor C1 in the above-described embodiment, the diode D51 and the diode D52 may be connected to the capacitor C1 via inductors. The operation is similar to the operation in the above-described embodiment.

Figure 27:
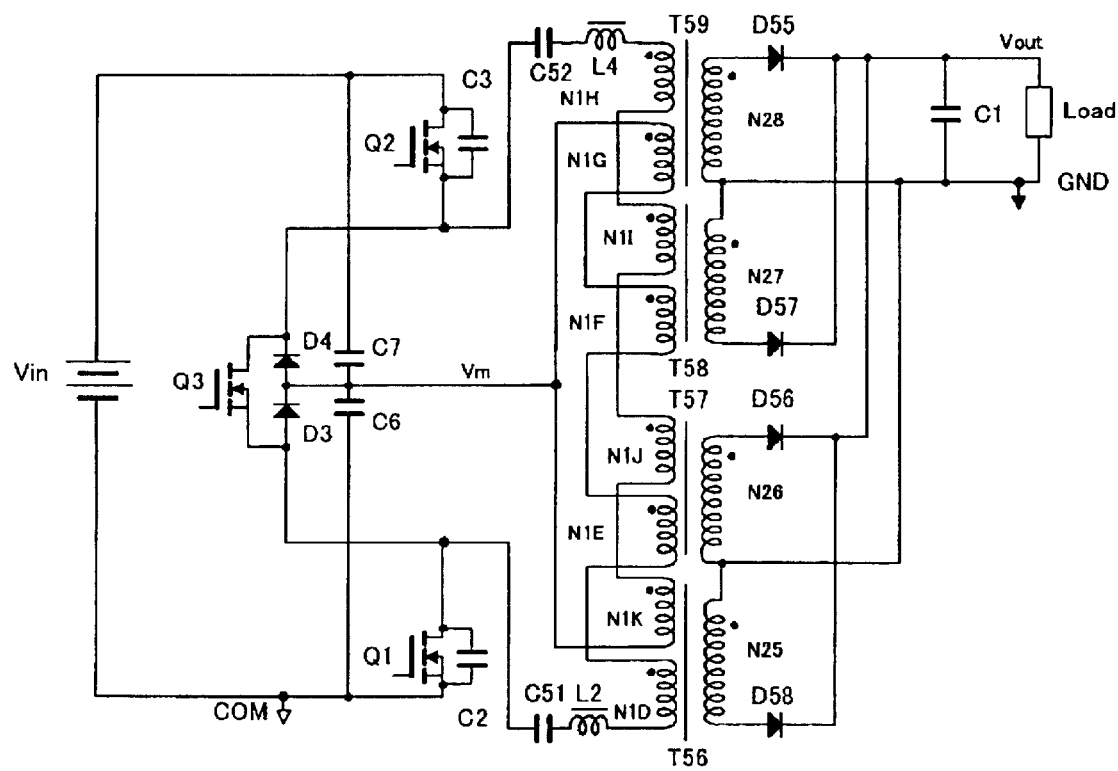
FIG. 27 is a structural view showing a twelfth embodiment of this invention.

FIG. 27 is a structural view showing a twelfth embodiment of the switching power supply according to this invention. The same elements as those of the embodiment shown in FIG. 25 are denoted by the same symbols and numerals and will not be described further in detail.

A characteristic feature of the embodiment of FIG. 27 is that a first magnetic element and a second magnetic element are formed using four transformers T56, T57, T58 and T59, extending the concept of FIG. 25.

Specifically, an inductor L2, a first primary winding N1D of the transformer T56, a first primary winding N1E of the transformer T57, a first primary winding N1F of the transformer T58 and a first primary winding N1G of the transformer T59 are connected in series to form a first series circuit (inductor L2, transformer T56, transformer T57, transformer T58 and transformer T59). An inductor L4, a second primary winding N1H of the transformer T59, a second primary winding N1I of the transformer T58, a second primary winding N1J of the transformer T57 and a second primary winding N1K of the transformer T56 are connected in series to form a second series circuit (inductor L4, transformer T59, transformer T58, transformer T57 and transformer T56).

This embodiment of FIG. 27 is suitable for an application where the whole switching power supply is reduced in thickness by reducing the thickness of the transformer T56, the transformer T57, the transformer T58 and the transformer T59.

The structure of essential parts of the embodiment shown in FIG. 27 is substantially the same as the structure of essential parts of the embodiment shown in FIG. 25.

Therefore, the operation in the embodiment of FIG. 27 is similar to the operation in the embodiment of FIG. 25.

The stress on a first main switch Q1, a second main switch Q2 and the like is suitably balanced by the action of a first diode D3, a second diode D4 and an auxiliary switch Q3.

Figure 28:
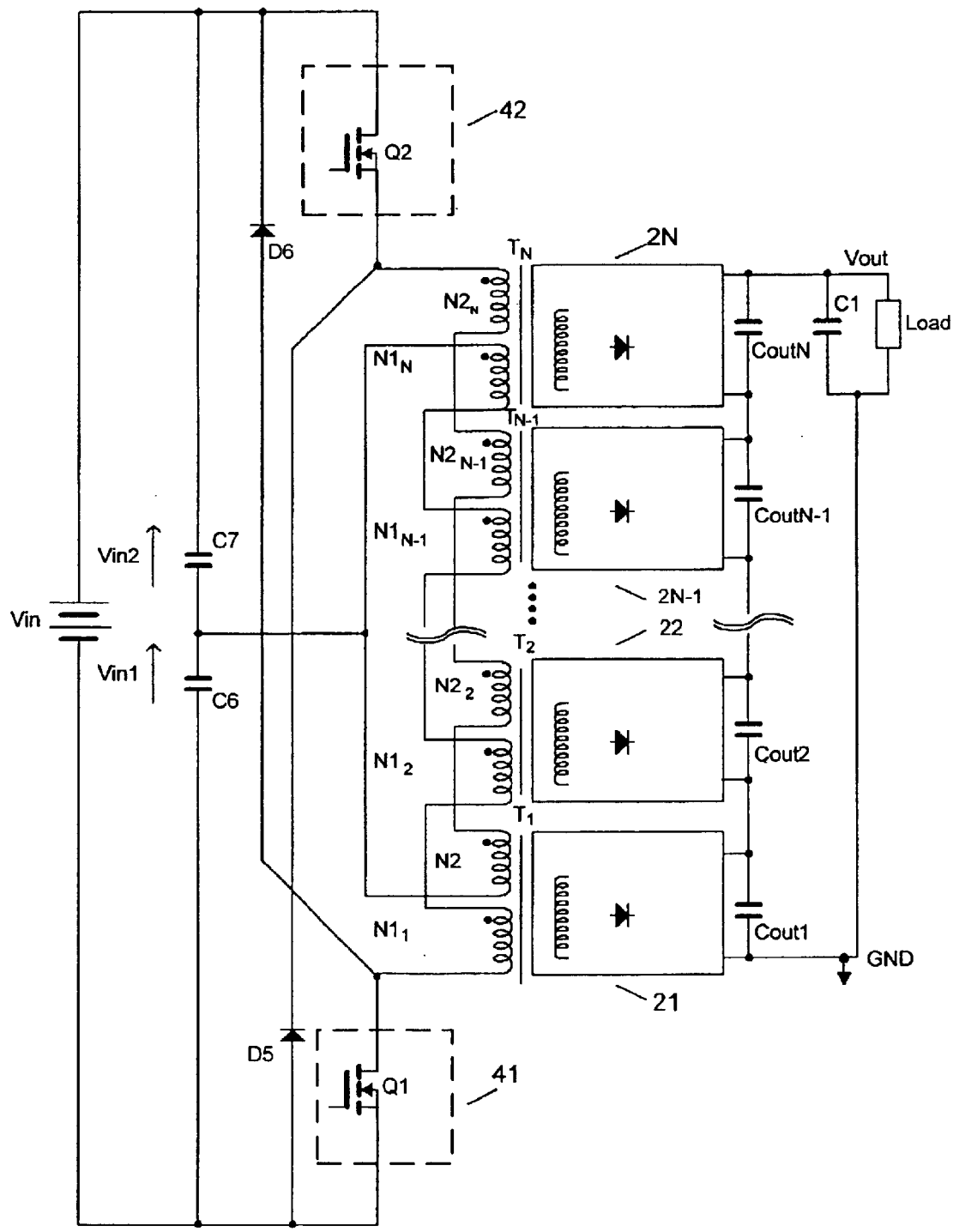
FIG. 28 is a structural view showing a thirteenth embodiment of this invention.

FIG. 28 is a structural view showing a thirteenth embodiment of the switching power supply according to this invention. The same elements as those of the embodiment shown in FIG. 25 are denoted by the same symbols and numerals and will not be described further in detail.

A characteristic feature of the embodiment of FIG. 28 is the structure of a transformer $T_1$, which is a first magnetic element, to a transformer $T_N$, which is an N-th magnetic element, extending the technical idea of the structure of the transformers in the embodiment of FIG. 25.

Specifically, a first main switch Q1 (first main switching circuit 41) has its one end connected with a negative electrode of an input voltage Vin. A second main switch Q2 (second main switching circuit 42) has its one end connected with a positive electrode of the input voltage Vin. An output circuit 21 for the transformer $T_1$, an output circuit 22 for the transformer $T_2$, . . . , an output circuit 2N–1 for the transformer $T_{N-1}$ and an output circuit 2N for the transformer $T_N$ induce a voltage to be an output by turning on/off of the first main switching circuit 41 and the second main switching circuit 42 and generate an output voltage Vout.

A first primary winding $N1_1$ of the transformer $T_1$, a first primary winding $N1_2$ of the transformer $T_2$, . . . , a first primary winding $N1_{N-1}$ of the transformer $T_{N-1}$ and a first primary winding $N1_N$ of the transformer $T_N$ are connected in series. A second primary winding $N2_1$ of the transformer $T_1$, a second primary winding $N2_2$ of the transformer $T_2$, . . . , a second primary winding $N2_{N-1}$ of the transformer $T_{N-1}$ and a second primary winding $N2_N$ of the transformer $T_N$ are connected in series.

A first series circuit (first primary winding $N1_1$, first primary winding $N1_2$, ..., first primary winding $N1_{N-1}$ and first primary winding $N1_N$), formed by the first primary winding $N1_1$, the first primary winding $N1_2$, ..., the first primary winding $N1_{N-1}$ and the first primary winding $N1_N$, has its one end connected with the first main switch Q1 (first main switching circuit 41). A second series circuit (second primary winding $N2_1$, second primary winding $N2_2$, second primary winding $N2_{N-1}$ and second primary winding $N2_N$), formed by the second primary winding $N2_1$, the second primary winding $N2_2$, ..., the second primary winding $N2_{N-1}$ and the second primary winding $N2_N$, has its one end connected with the second main switch Q2 (second main switching circuit 42).

The other end of the first series circuit (first primary winding $N1_1$, first primary winding $N1_2$, ..., first primarywinding $N1_{N-1}$ and first primary winding $N1_N$) and the other end of the second series circuit (second primary winding $N2_1$, second primary winding $N2_2$, second primary winding $N2_{N-1}$ and second primary winding $N2_N$) are connected to the input voltage Vin via a bulk capacitor C6 and a bulk capacitor C7, respectively.

In order to restrain a surge in the first main switch Q1 and the second main switch Q2 and to reset magnetic fluxes from the transformer $T_1$ to the transformer $T_N$, a diode D5 and a diode D6 are provided.

The bulk capacitor C6 and the bulk capacitor C7 may have a first input voltage Vin1 and a second input voltage Vin2, as in the embodiment of FIG. 17.

In this embodiment of FIG. 28, the stress on the plural transformers can be suitably balanced and the peak value of stress at each element can be restrained, as in the embodiment of FIG. 25. Therefore, this embodiment is suitable for an application where the whole switching power supply is reduced in thickness.

Figure 29:
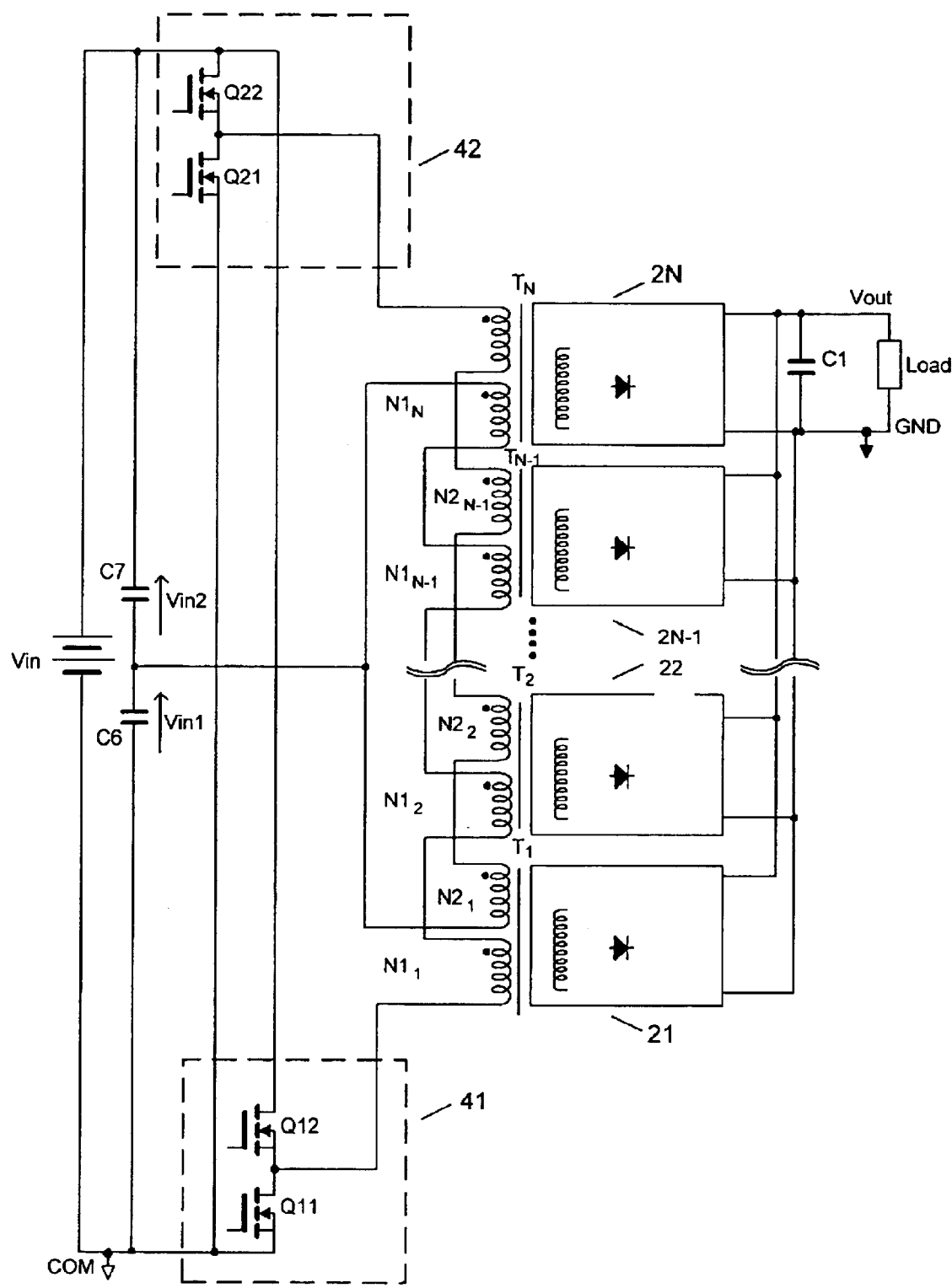
FIG. 29 is a structural view showing a fourteenth embodiment of this invention.

FIG. 29 is a structural view showing a fourteenth embodiment of the switching power supply according to this invention. The same elements as those of the embodiment shown in FIG. 28 are denoted by the same symbols and numerals and will not be described further in detail.

A characteristic feature of the embodiment of FIG. 29 is that a first switching circuit 41 is formed by a switch Q11 and a switch Q12 while a second switching circuit 42 is formed by a switch Q21 and a switch Q22. That is, in the embodiment of FIG. 29, a full bridge circuit is formed. For example, the switch Q11 and the switch Q22 are turned on/off in phase, and the switch Q21 and the switch Q12 are turned on/off in phase. The switch Q11 and the switch Q22, and the switch Q21 and the switch Q12, are turned on/off in opposite phases.

In this embodiment of FIG. 29, the stress on the plural transformers can be suitably balanced and the peak value of stress at each element can be restrained, as in the embodiment of FIG. 25. Therefore, this embodiment is suitable for an application where the whole switching power supply is reduced in thickness.

As is clear from the above description, according to this invention, a switching power supply can be provided that suitably restrains the stress on a first magnetic element and a second magnetic element and the stress on a first main switch and a second main switch, and that can be made at a low cost and can be easily miniaturized.

Moreover, a switching power supply can be provided in which the voltage stress on a first main switch Q1 and a second main switch Q2 has little variation due to parasitic elements in a very small circuit and resistance based on current detection in the circuit.

Since one auxiliary switch is enough, a switching power supply can be provided that can be made at a low cost and can be easily miniaturized.

Moreover, the stress on plural transformers is suitably balanced and the peak value of stress at each element is restrained.

Furthermore, a switching power supply can be provided that has a small loss at the time of switching, has low noise, enables setting of duty factors in a broad range and is suitable for reduction in thickness.

What is claimed is:

1. A switching power supply having
   a first main switch having its one end connected with a negative electrode of an input voltage,
   a second main switch having its one end connected with a positive electrode of the input voltage,
   a first magnetic element having its one end connected with the other end of the first main switch and inducing a voltage to be an output by turning on/off of the first main switch and the second main switch, and
   a second magnetic element having its one end connected with the other end of the second main switch and having its other end connected with the other end of the first magnetic element, the second magnetic element inducing a voltage to be an output by turning on/off of the first main switch and the second main switch,
   the switching power supply comprising:
   a first diode having its anode connected to the first magnetic element via a first capacitor and having its cathode connected to a connection point between the first magnetic element and the second magnetic element;
   a second diode having its anode connected to the cathode of the first diode and having its cathode connected to the second magnetic element via a second capacitor; and
   an auxiliary switch arranged between the cathode of the second diode and the anode of the first diode and turned on when both the first main switch and the second main switch are off.

2. The switching of claim 1, wherein a bulk capacitor is arranged between a connection point between the cathode of the first diode and the anode of the second diode, and the input voltage.

3. The switching power supply of claim 1, wherein an output of the first magnetic element and an output of the second magnetic element are connected in parallel.

4. The switching power supply of claim 1, wherein an output of the first magnetic element and an output of the second magnetic element are connected in series.

5. The switching power supply of claim 1, wherein the first magnetic element and the second magnetic element are magnetically coupled.

6. The switching power supply of claim 1, wherein the first main switch and the second main switch are turned on/off in phase.

7. The switching power supply of claim 1, wherein the first main switch and the auxiliary switch are turned on/off in a complementary manner via a period when both the first main switch and the auxiliary switch are off; and the second main switch and the auxiliary switch are turned on/off in a complementary manner via a period when both the second main switch and the auxiliary switch are off.

8. The switching power supply of claim 1, wherein the first magnetic element or the second magnetic element is formed by a series circuit including an inductor and a transformer.

9. The switching power supply of claim 1, wherein a capacitor is provided parallel to the first main switch, the second main switch, the auxiliary switch, the first magnetic element, or the second magnetic element.

10. The switching power supply of claim 1, wherein a voltage induced at the first magnetic element or the second magnetic element is rectified by a switch.

11. The switching power supply of claim 1, wherein the first diode or the second diode is formed by a body diode of MOSFET.

12. A switching power supply having
   a first main switch having its one end connected with a negative electrode of an input voltage,
   a second main switch having its one end connected with a positive electrode of the input voltage, and
   a magnetic element having a first primary winding with its one end connected with the other end of the first main switch and a second primary winding with its one end connected with the other end of the second main switch and with its the other end connected with the other end of the first primary winding, the magnetic element inducing a voltage to be an output by turning on/off of the first main switch and the second main switch,
   the switching power supply comprising:
   a first diode having its anode connected to the first primary winding via a first capacitor and having its cathode connected to a connection point between the first primary winding and the second primary winding;
   a second diode having its anode connected to the cathode of the first diode and having its cathode connected to the second primary winding via a second capacitor; and
   an auxiliary switch arranged between the cathode of the second diode and the anode of the first diode and turned on when both the first main switch and the second main switch are off.

13. A switching power supply comprising
   a first main switching circuit having its one end connected with a negative electrode of an input voltage,
   a second main switching circuit having its one end connected with a positive electrode of the input voltage, and
   a first magnetic element and a second magnetic element which induce a voltage to be an output by turning on/off of the first main switching circuit and the second main switching circuit,
   wherein one end of a first series circuit including a first primary winding of the first magnetic element and a first primary winding of the second magnetic element is connected with the other end of the first main switching circuit, and one end of a second series circuit including a second primary winding of the first magnetic element and a second primary winding of the second magnetic element is connected with the other end of the second main switching circuit, the other end of the first series circuit and the other end of the second series circuit being connected to the input voltage via bulk capacitors, respectively.

14. The switching power supply of claim 1, wherein a voltage doubler rectification of an AC input voltage generate a input voltage.

15. The switching power supply of claim 12, wherein a voltage doubler rectification of an AC input voltage generate a input voltage.

16. The switching power supply of claim 13, wherein a voltage doubler rectification of an AC input voltage generate a input voltage.

* * * * *